United States Patent
Takaku et al.

(10) Patent No.: US 7,736,533 B2
(45) Date of Patent: Jun. 15, 2010

(54) LIQUID CRYSTAL COMPOSITION, LIQUID CRYSTAL DEVICE, REFLECTIVE DISPLAY MATERIAL AND LIGHT MODULATING MATERIAL

(75) Inventors: Koji Takaku, Ashigarakami-gun (JP); Katsuyuki Yofu, Ashigarakami-gun (JP); Naoyuki Hayashi, Ashigarakami-gun (JP); Takashi Kato, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/285,439

(22) Filed: Oct. 6, 2008

(65) Prior Publication Data
US 2009/0098314 A1    Apr. 16, 2009

(30) Foreign Application Priority Data
Oct. 10, 2007  (JP) .............................. 2007-264254
May 9, 2008    (JP) .............................. 2008-124044

(51) Int. Cl.
C09K 19/00    (2006.01)
C09K 19/06    (2006.01)
C09K 19/52    (2006.01)

(52) U.S. Cl. .............................. 252/299.01; 252/299.6; 430/20; 428/1.1; 349/56

(58) Field of Classification Search ............ 252/299.01, 252/299.6; 430/20; 428/1.1; 349/56
See application file for complete search history.

(56) References Cited

U.S. PATENT DOCUMENTS

| 7,316,829 B2 * | 1/2008 | Kato et al. ................ 428/1.1 |
| 7,348,044 B2 * | 3/2008 | Takaku et al. ............. 428/1.1 |
| 2008/0152843 A1 * | 6/2008 | Kato et al. ................ 428/1.4 |

FOREIGN PATENT DOCUMENTS

| JP | A 58-57488 | 4/1983 |
| JP | A 62-277471 | 12/1987 |
| JP | A 2000-336366 | 12/2000 |
| JP | A 2003-113378 | 4/2003 |

OTHER PUBLICATIONS

"Handbook of Liquid Crystals", vol. 2A, Chapters 3 and 4, pp. 257-302, written by B. Bahadur, edited by D. Demus, J. Goodby, G. W. Gray, H. W. Spiess, and V. Vill, published by Wiley-VCH (1998).

* cited by examiner

*Primary Examiner*—Geraldina Visconti
(74) *Attorney, Agent, or Firm*—Solaris Intellectual Property Group, PLLC

(57) ABSTRACT

A liquid crystal composition including a liquid crystal and at least three anthraquinone dyes, at least two of the anthraquinone dyes having a substituent represented by the following Formula (I):

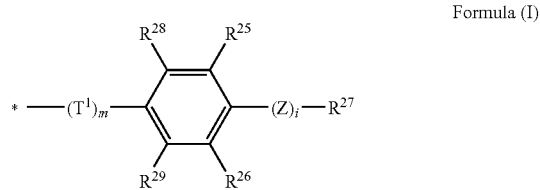

Formula (I)

wherein in Formula (I), * represents a linking position; $R^{25}$ and $R^{26}$ each independently represent an alkyl group, a halogen atom or an alkoxy group; $R^{27}$ represents an alkyl group, an acyl group or an alkoxy group; $R^{28}$ and $R^{29}$ each independently represent a hydrogen atom or a substitutent; $T^1$ represents an arylene group or a heteroarylene group; Z represents an oxygen atom, a sulfur atom or a carbonyl group; m represents an integer of 0 to 2; and i represents 0 or 1, wherein when i is 1 and Z is an oxygen atom or a sulfur atom, $R^{27}$ is not an alkoxy group, and when i is 1 and Z is a carbonyl group, $R^{27}$ is not an acyl group.

16 Claims, 1 Drawing Sheet

LIQUID CRYSTAL COMPOSITION, LIQUID CRYSTAL DEVICE, REFLECTIVE DISPLAY MATERIAL AND LIGHT MODULATING MATERIAL

CROSS-REFERENCE TO RELATED APPLICATION

This application claims priority under 35 USC 119 from Japanese Patent Application Nos. 2007-264254 and 2008-124044, the disclosure of which is incorporated by reference herein.

BACKGROUND OF THE INVENTION

1. Field of the Invention

The present invention relates to a liquid crystal composition, a liquid crystal device, a reflective display material and a light modulating material, and particularly to a liquid crystal composition, a liquid crystal device, a reflective display material and a light modulating material which can be suitably used for a guest-host system.

2. Description of the Related Art

In a liquid crystal device of a guest-host system, images are displayed by changing the light absorption state of the liquid crystal, based on the change in orientation of a dichroic dye dissolved in the liquid crystal in response to the movement of the liquid crystal due to an electric field. Therefore, the liquid crystal device of a guest-host system is expected to achieve a high-speed response and an excellent contrast ratio.

The guest-host system has been discussed in various literature (for example, refer to "Handbook of Liquid Crystals", Vol. 2A, Chapters 3 and 4, pp. 257-302, written by B. Bahadur, edited by D. Demus, J. Goodby, G. W. Gray, H. W. Spiess, and V. Vill, published by Wiley-VCH (1998)). There has been a demand that dichroic dyes used in a guest-host liquid crystal device have a proper absorption property, a high order parameter, and a high degree pf solubility in a host liquid crystal, and there have been reports on azo dyes, anthraquinone dyes and the like. Among these, from the viewpoint of the resistance to heat and light, anthraquinone dyes have been intensely studied.

However, due to the low degree of molar absorption coefficient thereof, anthraquinone dyes have to be dissolved in a liquid crystal in an extremely large amount in order to increase color density, thereby requiring a high degree of solubility in the host liquid crystal. In order to overcome the above problems, methods of improving the solubility of a dichroic dye have been reported, in which the dichroic dye is provided with a substituent including a cyclohexane ring and having a structure similar to a host liquid crystal (for example, see Japanese Patent Application Laid-Open (JP-A) Nos. 58-57488 and 2003-113378).

Further, in order to exhibit a highly pure black color, it is necessary to mix at least three kinds of dyes having different light absorption wavelengths, and it is also necessary to control the maximum absorption wavelength and the absorption waveform of these dyes, so the structure of the dyes is largely restricted. Consequently, very few dyes have been known which can meet the above requirements when combined with other dyes, even if they can satisfy requirements such as order parameter, light fastness and solubility in a liquid crystal, when used for a single color (for example, see JP-A Nos. 2000-336366 and 62-277471).

It is generally known that when a substituent that causes steric hindrance is introduced into a dye molecule for the purpose of enhancing the solubility, the order parameter is lowered. However, the present inventors have found that by mixing plural kinds of dyes having a specific substituent, such an unexpected result as an increase in the order parameter can be achieved.

SUMMARY OF THE INVENTION

The present invention provides a liquid crystal composition containing a liquid crystal, at least two of the anthraquinone dyes having a substituent represented by the following formula (I):

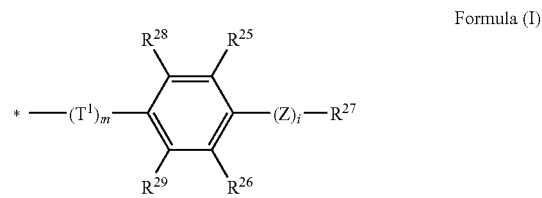

Formula (I)

wherein in formula (I), * represents a linking position, $R^{25}$ and $R^{26}$ each independently represent an alkyl group, a halogen atom, or an alkoxy group; $R^{27}$ represents an alkyl group, an acyl group, or an alkoxy group; $R^{28}$ and $R^{29}$ each independently represent a hydrogen atom or a substituent; $T^1$ represents an arylene group or a heteroarylene group; Z represents an oxygen atom, a sulfur atom, or a carbonyl group; m represents an integer of from 0 to 2; and i represents 0 or 1; wherein when i represents 1 and Z is an oxygen atom or a sulfur atom, $R^{27}$ is not an alkoxy group; and when i is 1 and Z is a carbonyl group, $R^{27}$ is not an acyl group.

BRIEF DESCRIPTION OF THE DRAWINGS

Exemplary embodiments of the present invention will be described in detail based on the following figures, wherein.

DETAILED DESCRIPTION OF THE INVENTION

Figure 1:
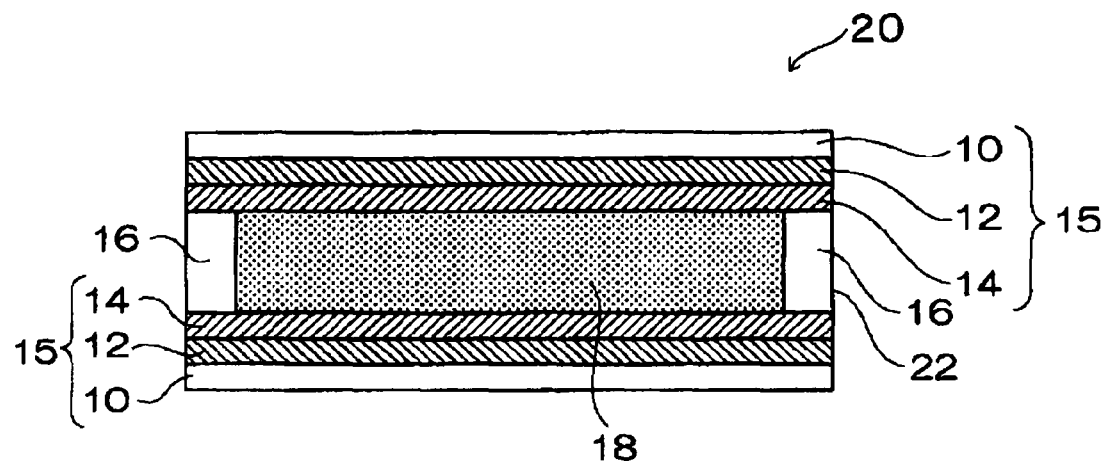
FIG. 1 is a schematic drawing showing an example of a transmissive liquid crystal device according the present invention.

Hereinafter, the present invention will be described in detail.

The liquid crystal composition of the present invention contains two or more kinds of anthraquinone dyes, preferably three or more kinds, and more preferably four or more kinds. The liquid crystal composition of the present invention may further contain other additives.

Hereinafter, the substituent represented by formula (1) and the anthraquinone dyes according to the present invention will be described <Substituent Represented by Formula (I)>

The liquid crystal composition of the present invention contains two or more kinds of anthraquinone dyes having a substituent represented by the following Formula (I).

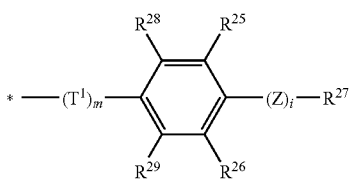

Formula (I)

In Formula (I), * represents a linking position; $R^{25}$ and $R^{26}$ each independently represent an alkyl group, a halogen atom, or an alkoxy group; $R^{27}$ represents an alkyl group, an acyl group, or an alkoxy group; $R^{28}$ and $R^{29}$ each independently represent a hydrogen atom or a substituent; $T^1$ represents an arylene group or a heteroarylene group; Z represents an oxygen atom, a sulfur atom or a carbonyl group; m represents an integer of from 0 to 2; and i represents 0 or 1, wherein when i represents 1 and Z represents an oxygen atom or a sulfur atom, $R^{27}$ is not an alkoxy group, and when i is 1 and Z represents a carbonyl group, $R^{27}$ is not an acyl group.

Since the substituent represented by Formula (I) forms a bulkiness at a suitable distance from a chromophore, the anthraquinone dye having the substituent represented by Formula (I) causes steric hindrance. It is considered that by using two or more kinds of such anthraquinone dyes in combination, solubility of the dyes will remarkably increase and, as a result, the solid concentration will increase and a degree of the order of the host liquid crystal will improve, thereby enhancing the order parameter. However, the mechanism that exerts such an effect is not clear, and the present invention is not limited by such a presumption as above.

In particular, when three or more kinds, or four or more kinds, of the anthraquinone dyes having a substituent represented by Formula (I) are used in combination to form a liquid crystal composition which assumes a black color, the ratio of the substituent represented by Formula (I) with respect to a specific chromophore is increased to effectively suppress association among the dyes. Therefore, there is an advantage that even if the concentration of the dyes is increased, changes in the maximum absorption wavelength and the absorption waveform of the dyes remain small, making it easy to control the color phase. The effect attained when three or more kinds of dyes are used in combination is brought by a behavior of the dyes that is different from the behavior of the dyes when two kinds thereof are used in combination.

In the present invention, the "black color" refers to a color in which the difference between the maximum transmittance and the minimum transmittance among the transmittances at wavelengths of 450 nm, 500 nm, 550 nm and 600 nm is 20% or less, preferably 15% or less, and particularly preferably 10% or less. In a guest-host liquid crystal display device, the transmittance refers to a transmittance at a time when developing a color.

In Formula (I), $R^{25}$ and $R^{26}$ each independently represent an alkyl group, a halogen atom, and an alkoxy group.

The alkyl groups represented by $R^{25}$ and $R^{26}$ are preferably an alkyl group having 1 to 8 carbon atoms, more preferably an alkyl group having 1 to 6 carbon atoms, and furthermore preferably an alkyl group having 1 to 4 carbon atoms. The alkyl group includes, for example, a methyl group, an n-propyl group, an n-butyl group, an n-pentyl group, an n-hexyl group, a hydroxymethyl group, a trifluoromethyl group, a benzyl group, a carboxyethyl group, an ethoxycarbonyl methyl group, and an acetylamino methyl group.

The halogen atoms represented by $R^{25}$ and $R^{26}$ are preferably a fluorine atom and a chlorine atom.

The alkoxy groups represented by $R^{25}$ and $R^{26}$ are preferably an alkoxy group having 1 to 8 carbon atoms, more preferably 1 to 6 carbon atoms, furthermore preferably an alkyl group having 1 to 4 carbon atoms. The alkoxy group includes, for example, a methoxy group, an n-propyloxy group, an n-butoxy group, an n-pentyloxy group, an n-hexyloxy group, a trifluoromethoxy group and a benzyloxy group.

In Formula (I), $R^{27}$ represents an alkyl group, an acyl group, or an alkoxy group.

The alkyl group represented by $R^{27}$ is preferably an alkyl group having 1 to 24 carbon atoms, more preferably 2 to 20 carbon atoms, and still more preferably 3 to 18 carbon atoms.

The alkyl groups represented by $R^{27}$ may be a linear alkyl group, a branched alkyl group or a cyclic alkyl group, or may be a combination thereof. The cyclic alkyl group is preferably a cyclohexyl group from the viewpoint of increasing the order parameter, and more preferably a trans-type cyclohexyl group form the viewpoint of increasing the linearity to increase the order parameter. Moreover, the cyclohexyl group preferably has linking positions at 1- and 4-positions thereof, from the viewpoint of increasing the order parameter by increasing the linearity of the entire structure of the molecule.

Specific examples of the alkyl group represented by $R^{27}$ include, for example, an n-butyl group, an n-pentyl group, an n-hexyl group, a 4-hydroxybutyl group, a 4-pentylcyclohexyl methyl group, a 4'-butylbicyclohexyl-4-methyl group and an ethoxycarbonyl methyl group.

The alkyl group represented by $R^{27}$ is preferably an acyl group having 2 to 25 carbon atoms, more preferably 3 to 21 carbon atoms, and still more preferably 4 to 19 carbon atoms.

Specific examples of the acyl group represented by $R^{27}$ include, for example, an n-butyryl group, an n-pentanoyl group, an n-hexanoyl group, a 4-pentylcyclohexane carbonyl group, and a 4'-butylbicyclohexyl-4-carbonyl group.

The alkoxy group represented by $R^{27}$ is preferably an alkoxy group having 1 to 24 carbon atoms, more preferably 2 to 20 carbon atoms, and still more preferably 3 to 18 carbon atoms, such as an n-buthoxy group, an n-pentyloxy group, an n-hexyloxy group, a benzyloxy group, a 4-pentyl cyclohexyloxy group and a 4'-butylbicyclohexyl-4-oxy group.

In formula (I), $R^{28}$ and $R^{29}$ each independently represent a hydrogen atom or a substituent group, including the substituents shown in the following Substituent Group V.

Substituent Group V

The substituent group includes a halogen atom (for example, chlorine and fluorine), a mercapto group, a cyano group, a sulfo group, a hydroxyl group; a carbamoyl group having 1 to 10 carbon atoms, preferably having 2 to 8 carbon atoms, and more preferably having 2 to 5 carbon atoms (for example, a methylcarbamoyl group, an ethyl carbamoyl group, a morpholino carbonyl group); a sulfamoyl group having 0 to 10 carbon atoms, preferably having 2 to 8 carbon atoms, and more preferably having 2 to 5 carbon atoms (for example, a methylsulfamoyl group, an ethylsulfamoyl group, a piperydinosulfonyl group); a nitro group; an alkoxy group having 1 to 20 carbon atoms, preferably having 1 to 10 carbon atoms, and more preferably having 1 to 8 carbon atoms (for example, a methoxy group, an ethoxy group, 2-methoxyethoxy group and 2-phenylethoxy group); an aryloxy group having 6 to 20 carbon atoms, preferably having 6 to 12 carbon atoms, and more preferably having 6 to 10 carbon atoms (for example, a phenoxy group, a p-methylphenoxy group, a p-chlorophenoxy group and a naththoxy group); an acyl group having 1 to 20 carbon atoms, preferably having 2 to 12 carbon atoms, and more preferably having 2 to 8 carbon atoms (for example, an acetyl group, a benzoyl group and a trichloroacetyl group); an acyloxy group having 1 to 20 carbon atoms, preferably having 2 to 12 carbon atoms, and more preferably having 2 to 8 carbon atoms (for example, an acetyloxy group and a benzoyloxy group); an acylamino group having 1 to 20 carbon atoms, preferably having 2 to 12 carbon atoms, and more preferably having 2 to 8 carbon atoms (for example, an acetylamino group); a sulfonyl group having 1 to 20 carbon atoms, preferably having 1 to 10 carbon atoms, and more preferably having 1 to 8 carbon atoms (for example, a methane sulfonyl group, an ethane sulfonyl group and a benzene sulfonyl group); a sulfinyl group having 1 to 20 carbon atoms, preferably having 1 to 10 carbon atoms, and more preferably having 1 to 8 carbon atoms (for example, a methane sulfinyl group, an ethane sulfinyl group and a benzene sulfinyl group); a substituted or non-substituted amino group having 1 to 20 carbon atoms, preferably having 1 to 12 carbon atoms, and more preferably having 1 to 8 carbon atoms (for example, an anilino group, a diphenylamino group, a 4-methylphenylamino group, a 4-ethylphenylamino group, a 3-n-propyphenylamino group, a 4-n-propylphenylamino group, a 3-n-butylphenylamino group, a 4-n-butylphenylamino group, a 3-n-pentylphenylamino group, a 4-n-pentylphenylamino group, a 3-trifluoromethyl phenylamino group, a 4-trifluoromethyl phenylamino group, a 2-pyridylamino group, a 3-pyridylamino group, a 2-thiazolylamino group, a 2-oxazolylamino group, an N, N-methyphenylamino group and an N,N-ethylphenylamino group; a ureido group having 1 to 15 carbon atoms, preferably having 1 to 10 carbon atoms, and more preferably having 1 to 6 carbon atoms (for example, a ureido group and an N,N-dimethyl ureido group); an imide group having 1 to 15 carbon atoms, preferably having 1 to 10 carbon atoms, and more preferably having 1 to 6 carbon atoms (for example, a succinimide group); an alkylthio group having 1 to 20 carbon atoms, preferably having 1 to 12 carbon atoms, and more preferably having 1 to 8 carbon atoms (for example, a methylthio group, an ethylthio group and a propylthio group); an arylthio group having 6 to 80 carbon atoms, preferably having 6 to 40 carbon atoms, and more preferably having 6 to 30 carbon atoms (for example, a phenylthio group, a p-methylphenylthio group, a p-chlorophenylthio group, a 2-pyridylthio group, a 1-naphthylthio group, a 2-naphthylthio group, a 4-propylcyclohexyl-4'-biphenylthio group, a 4-butylcyclohexyl-4'-biphenylthio1'group, a 4-pentylcyclohexyl-4'-biphenylthio group and a 4-propylphenyl-2-ethynyl-4'-biphenylthio group); a heteroarylthio group having 1 to 80 carbon atoms, preferably having 1 to 40 carbon atoms, and more preferably having 1 to 30 carbon atoms (for example, a 2-pyridylthio group, a 3-pyridylthio group, a 4-pyridylthio group), a 2-quinolylthio group, a 2-furylthio group and a 2-pyrrolylthio group); an alkoxycarbonyl group having 2 to 20 carbon atoms, preferably having 2 to 12 carbon atoms, and more preferably having 2 to 8 carbon atoms (for example, a methoxy carbonyl group, an ethoxy carbonyl group and a 2-benzyloxy carbonyl group); an aryloxycarbonyl group having 6 to 20 carbon atoms, preferably having 6 to 12 carbon atoms, and more preferably having 6 to 10 carbon atoms (for example, a phenoxy carbonyl group); an unsubstituted alkyl group having 1 to 18 carbon atoms, preferably having 1 to 10 carbon atoms, and more preferably having 1 to 5 carbon atoms (for example, a methyl group, an ethyl group, a propyl group and a butyl group); a substituted alkyl group having 1 to 18 carbon atoms, preferably having 1 to 10 carbon atoms, and more preferably having 1 to 5 carbon atoms (for example, a hydroxymethyl group, a trifluoromethyl group, a benzyl group, a carboxyethyl group and an ethoxy carbonylmethyl group, wherein the substituted alkyl groups here also include an unsaturated hydrocarbon group having 2 to 18 carbon atoms, preferably having 3 to 10 carbon atoms, and more preferably having 3 to 5 carbon atoms (for example, a vinyl group, an ethynyl group, a 1-cyclohexenyl group, a benzylidyne group and a benzylidene group); an aryl group having 6 to 20 carbon atoms, preferably having 6 to 15 carbon atoms, and more preferably having 6 to 10 carbon atoms (for example, a phenyl group, a naphthyl group, a p-carboxyphenyl group, a p-nitrophenyl group, a 3,5-dichlorophenyl group, a p-cyanophenyl group, an m-fluorophenyl group, a p-tolyl group, a 4-propylcyclohexyl-4'-biphenyl group, a 4-butylcyclohexyl-4'-biphenyl group, a 4-pentylcyclohexyl-4'-biphenyl group, and a 4-propylphenyl-2-ethynyl-4'-biphenyl group); a heteroaryl group having 1 to 20 carbon atoms, preferably having 2 to 10 carbon atoms, and more preferably having 4 to 6 carbon atoms (for example, a pyridyl group, a 5-methylpyridyl group, a thienyl group, a furyl group, a morpholino group, and a tetrahydrofuryl group).

These substituents described in Substituent Group V may form a structure in which a benzene ring or a naphthalene ring is condensed. Further, the above substituents may further have a substituent as described in the above Substituent Group V.

$T^1$ in Formula (I) represents an arylene group or a heteroarylene group. The arylene group represented by $T^1$ is preferably an arylene group having 6 to 18 carbon atoms, and more preferably having 6 to 12 carbon atoms. Preferable examples of the arylene group include a phenylene group and a naphthylene group.

When the arylene group represented by $T^1$ is a phenylene group, the linking positions thereof are preferably 1- and 4-positions from the viewpoint of increasing the linearity to improve the order parameter.

The arylene group represented by $T^1$ may have a substituent that may be a substituent described in the above-mentioned Substituent Group V, preferably an alkyl group and a halogen atom, and more preferably an alkyl group having 1 to 3 carbon atoms.

Specific examples of the arylene group represented by $T^1$ include a 1,4-phenylene group, a naphthalene-2,6-diyl group and a tetrahydronaphthalene-2,6-diyl group.

The heteroarylene group represented by $T^1$ is preferably a heteroarylene group having 1 to 20 carbon atoms, more preferably 2 to 9 carbon atoms.

Preferable examples of the heteroarylene group include a group formed from a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, and a triazole ring, and a heteroarylene group obtained by removing a hydrogen atom each from two carbon atoms of a condensed ring formed by condensing these groups, respectively.

The heteroarylene group represented by $T^1$ may have a substituent which may be a substituent described in the above-mentioned Substituent Group V.

Z in Formula (I) represents an oxygen atom, a sulfur atom, or a carbonyl group.

m in Formula (I) represents an integer of from 0 to 2, preferably 0 or 1.

i in Formula (I) represents 0 or 1.

When i is 1 and Z is an oxygen atom or a sulfur atom, $R^{27}$ is not an alkoxy group, and when i is 1 and Z is a carbonyl group, $R^{27}$ is not an acyl group.

The asterisk (*) in Formula (I) represents a linking position at which the substituent is directly linked to the mother nucleus of the anthraquinone dye, or to a hetero atom (N, S)

or a linking group (ester) that is linked to the mother nucleus of the anthraquinone dye. For example, * in Formula (I) represents a linking position at which a substituent represented by $R^1$ to $R^{24}$ in Formulae (II)-(XI), which will be described layer, is bonded to an atom of the anthraquinone dye.

The substituent group represented by Formula (I) preferably has two or more rings in total, from the viewpoint of increasing the linearity of the substituent to improve the order parameter, and more preferably three or more rings from the viewpoint of further increasing the linearity.

The following are examples of the substituent group represented by Formula (I), but the present invention is not limited thereto. In the following, * represents a linking position at which the substituent is directly linked to the mother nucleus of the anthraquinone dye, or linked via a hetero atom (N, S) or a linking group (ester) that is bonded to the mother nucleus of the anthraquinone dye.

(1)

(2)

(3)

(4)

(5)

(6)

-continued

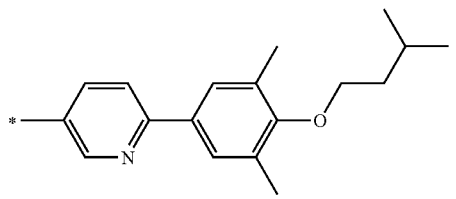

(7)

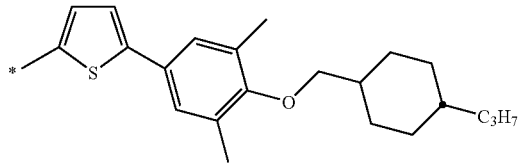

(8)

(9)

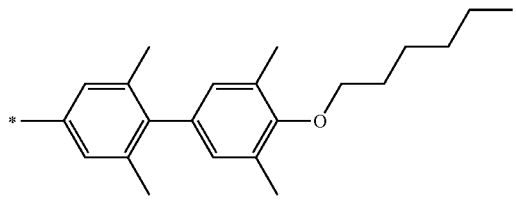

(10)

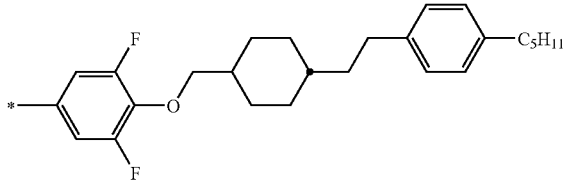

(11)

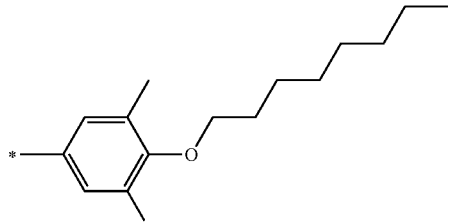

(12)

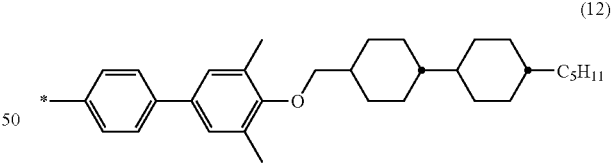

(13)

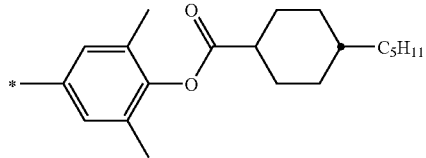

(14)

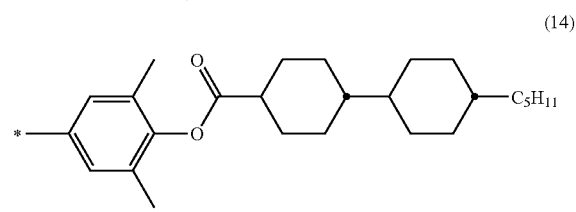

-continued

(15)
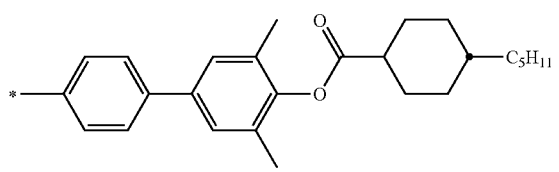

(16)
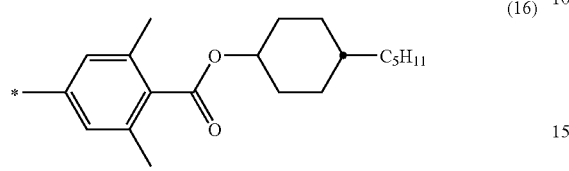

(17)
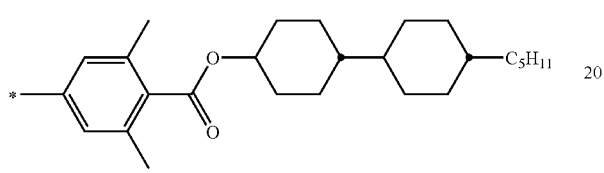

(18)
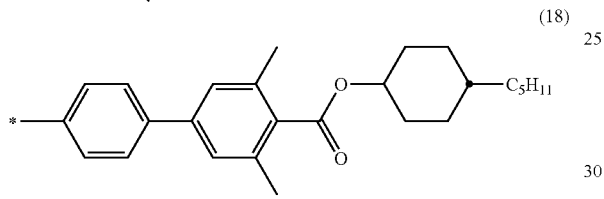

(19)
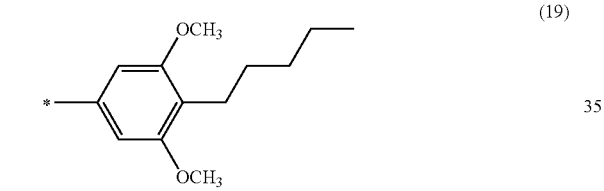

(20)
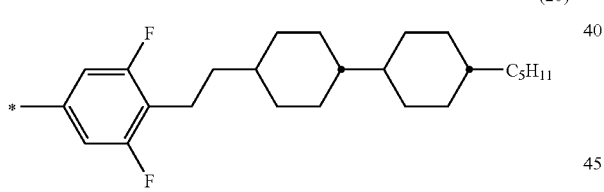

(21)
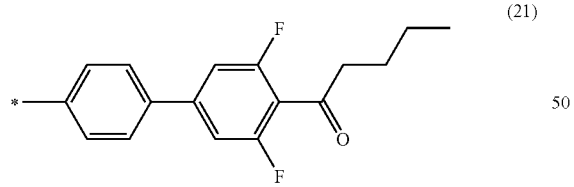

<Anthraquinone Dye>

The liquid crystal composition of the present invention contains three or more kinds of anthraquinone dyes, and at least two kinds thereof have a substituent represented by the above Formula (I). The liquid crystal composition of the present invention preferably contains three or more kinds of the anthraquinone dyes having a substituent represented by Formula (I), and more preferably four or more kinds of the anthraquinone dyes having a substituent represented by Formula (I). The mother nucleus of the anthraquinone dye is not particularly limited as long as a substituent represented by Formula (I) is contained.

In a preferable embodiment, the liquid crystal composition of the present invention contains at least one anthraquinone dyes selected from each of the following Dye Groups A to D, respectively. In this case, at least two of the anthraquinone dyes should have a substituent represented by Formula (I).

Dye Group A

Formula (II)
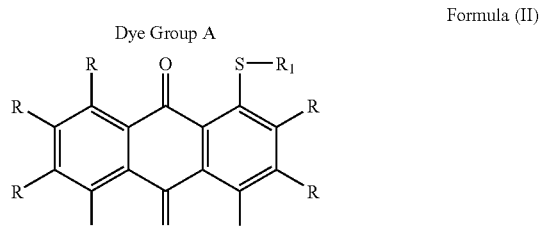

Dye Group B

Formula (III)
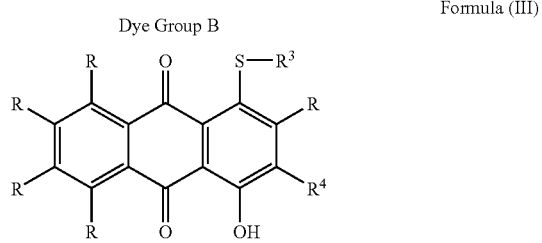

Formula (IV)
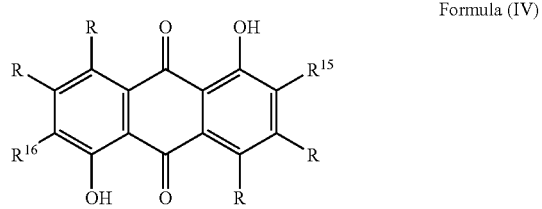

Formula (V)
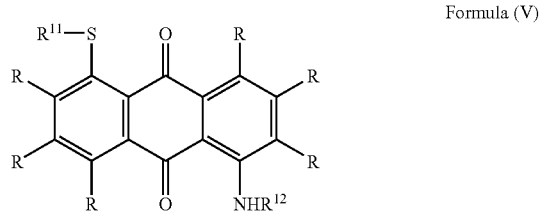

Dye Group C

Formula (VI)
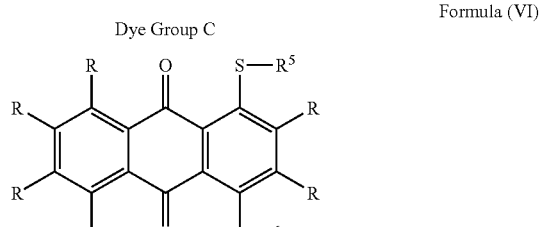

Formula (VII)
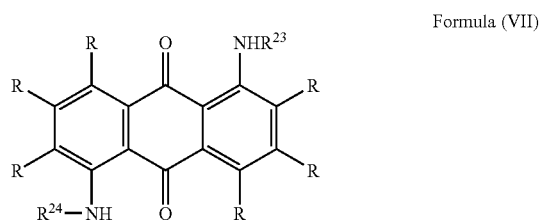

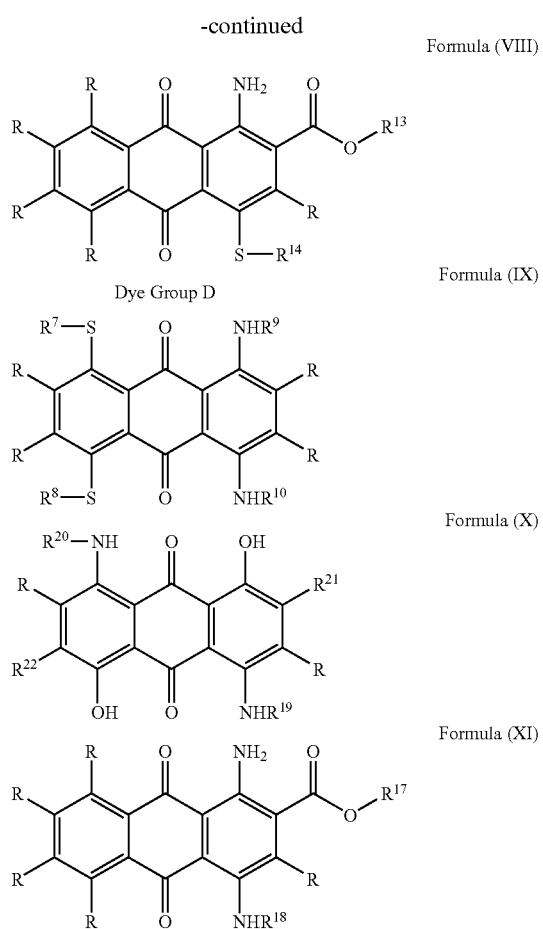

Formula (VIII)

Dye Group D

Formula (IX)

Formula (X)

Formula (XI)

In Formulae (II) to (XI), $R^1$ to $R^3$, $R^5$ to $R^{12}$, $R^{14}$ to $R^{16}$, $R^{19}$, $R^{23}$ and $R^{24}$ each independently represent an aryl group or a heteroaryl group; and $R^{18}$ and $R^{20}$ each independently represent a hydrogen atom, an alkyl group, an aryl group or a heteroaryl group; $R^{13}$ and $R^{17}$ each independently represent an alkyl group or an aryl group; $R^4$, $R^{21}$ and $R^{22}$ each independently represent a hydrogen atom, an alkyl group, an alkoxy group, an aryl group, an aryloxy group or a heteroaryl group; and each R independently represent a hydrogen atom or a substituent.

Here, an aryl group or a heteroaryl group represented by $R^1$ to $R^{12}$, $R^{14}$ to $R^{16}$ and $R^{18}$ to $R^{24}$, and an aryl group represented by $R^{13}$ and $R^{17}$ may further have a substituent to form a substituent represented by Formula (I), or a mesogenic group.

It is preferable that the aryl group or heteroaryl group represented by $R^1$ to $R^{12}$, $R^{14}$ to $R^{16}$ and $R^{18}$ to $R^{24}$, and the aryl group represented by $R^{13}$ and $R^{17}$ are preferably a substituent represented by Formula (I) or a mesogenic group, and more preferably a substituent represented by Formula (I).

The mesogenic group mentioned above refers to a substituent having two or more cyclic structures such as a cyclohexane ring or a benzene ring, namely, a substituent having a similar skeleton to a compound that exhibits liquid crystallinity. Compounds that exhibit liquid crystallinity include liquid crystal compounds that exhibit a nematic phase or a smectic phase, such as an azomethine compound, a cyanobiphenyl compound, a cyanophenyl ester, a fluorine-substituted phenyl ester, a phenyl cyclohexane carboxylate, a fluorine-substituted phenyl cyclohexane carboxylate, a cyanophenyl cyclohexane, a fluorine-substituted phenyl cyclohexane, a cyano-substituted phenyl pyrimidine, a fluorine-substituted phenyl pyrimidine, an alkoxy-substituted phenyl pyrimidine, a fluorine-substituted alkoxy-substituted phenyl pyrimidine, phenyldioxane, a tolan-based compound, a fluorine-substituted tolan-based compound, and an alkenyl cyclohexyl benzonitrile. These compounds are described in detail on pages 154 to 192 and pages 715 to 722 of "Liquid Crystal Device Handbook", edited by the 142nd Committee of Japan Society for the Promotion of Science, published by Nikkan Kogyo Shimbun, 1989. Specific structure of the mesogenic group will be described later.

Hereinafter, Formulae (II) to (XI) will be individually explained.

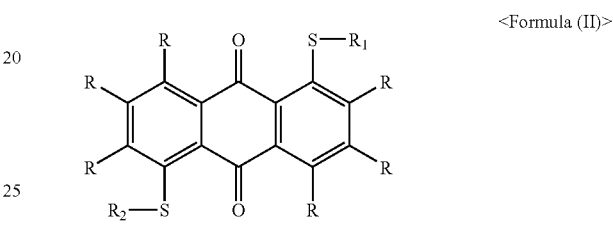

<Formula (II)>

In Formula (II) of Dye Group A, $R^1$ and $R^2$ each independently represent an aryl group or a heteroaryl group, and each R independently represents a hydrogen atom or a substituent.

The aryl groups represented by $R^1$ and $R^2$ are preferably an aryl group having 6 to 18 carbon atoms, more preferably 6 to 12 carbon atoms. These aryl groups may have a substituent, such as those described in Substituent Group V.

The heteroaryl groups represented by $R^1$ and $R^2$ are preferably a heteroaryl group having 2 to 18 carbon atoms, more preferably 2 to 12 carbon atoms, and examples thereof include pyridyl, quinolinyl, pyrimidinyl, pyrazinyl, thiophenyl, furanyl, oxazolyl, thiazolyl, imidazolyl, pyrazolyl, oxadiazolyl and thiadiazolyl groups. These groups may have a substituent, such as those described in Substituent Group V.

The aryl group and the heteroaryl group represented by $R^1$ and $R^2$ preferably have a substituent, more preferably a substitutent represented by Formula (I) or a mesogenic group, and further preferably a substituent represented by Formula (I).

When the anthraquinone dye represented by Formula (II) has a substituent represented by formula (I), both or only one of $R^1$ and $R^2$ may be a substituent represented by Formula (I), but it is desirable that only one of $R^1$ and $R^2$ is a substituent represented by Formula (I).

When the aryl group represented by $R^1$ and $R^2$ is not a substituent represented by Formula (I), the aryl group represented by $R^1$ and $R^2$ is preferably a phenyl group having a substituent at a para-position or a meta-position. In this case, the substituent is preferably a halogen atom (a chlorine atom or a fluorine atom), an aryl group, or an alkyl group. The alkyl group is preferably those having 3 to 10 carbon atoms, such as a t-butyl group, an n-hexyl group and an n-octyl group.

Further, when the aryl group represented by $R^1$ and $R^2$ is not a substituent represented by Formula (I), the aryl group preferably has two or more rings and has a substitutent, from the viewpoint of forming a structure similar to that of a host liquid crystal in order to increase the solubility and the order parameter, and the aryl group is more preferably a mesogenic group. The following are specific structures of the mesogenic group, but the present invention is not limited to these structures.

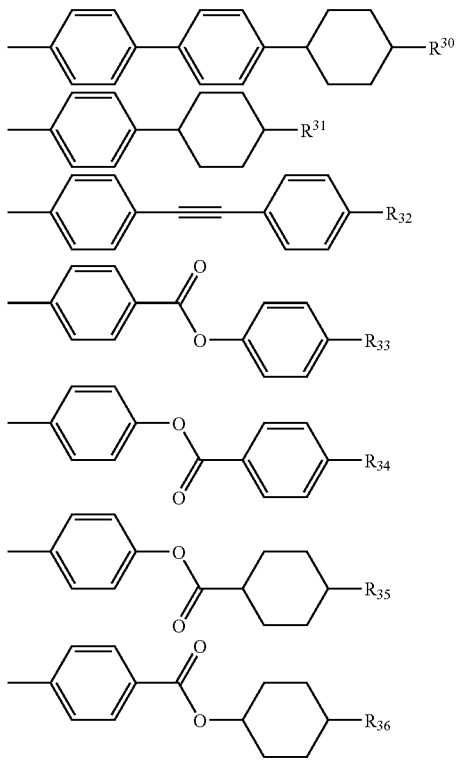

In the above structural formulae, $R^{30}$ to $R^{36}$ are preferably an alkyl group, more preferably an alkyl group having 3 to 14 carbon atoms.

When the aryl groups represented by $R^1$ and $R^2$ are not a substituent represented by Formula (I) or a mesogenic group, the aryl groups represented by $R^1$ and $R^2$ are preferably a p-t-butylphenyl group, a p-cyanophenyl group, a p-fluorophenyl group, an m-chlorophenyl group, a p-alkylphenyl group, or a p-alkoxyphenyl group.

In Formula (II), each R independently represent a hydrogen atom or a substituent, such as those described in Substituent Group V, and desirable substituents are also those described in Substituent Group V.

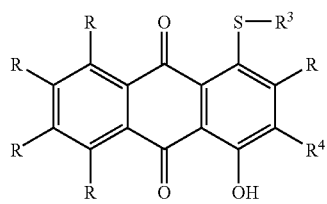

<Formula (III)>

In Formula (III) of Dye Group B, $R^3$ represents an aryl group or a heteroaryl group, $R^4$ represents a hydrogen atom, an alkyl group, an alkoxy group, an aryl group, an aryloxy group or a heteroaryl group, and each R independently represents a hydrogen atom or a substituent.

The aryl group and the heteroaryl group represented by $R^3$ and $R^4$ are defined in the same manner as the aryl group and the heteroaryl group as described in the above section concerning $R^1$ and $R^2$ in formula (II), respectively, and preferable examples thereof are also the same.

The alkyl group represented by $R^4$ is preferably an alkyl group having 1 to 24 carbon atoms, more preferably 2 to 20 carbon atoms, and still more preferably 3 to 18 carbon atoms. The alkyl groups include, for example, an n-butyl group, an n-pentyl group, an n-hexyl group, a 4-butylcyclohexyl group, a 4-hydroxybutyl group, a 4-pentylcyclohexylmethyl group, a 4'-butylbicyclohexyl-4-methyl group, an ethoxycarbonyl methyl group, a 4-(4-butylcyclohexyloxycarbonyl)-cyclohexyl group.

The alkoxy group represented by $R^4$ is preferably an alkoxy group having 1 to 24 carbon atoms, more preferably 2 to 20 carbon atoms, and still more preferably 3 to 18 carbon atoms. The alkoxy groups include, for example, an n-buthoxy group, an n-pentyloxy group, an n-hexyloxy group, a 2-ethylhexyloxy group, a 4-hydroxybuthoxy group, a 4-pentylcyclohexylmethyloxy group, a 4'-butylbicyclohexyl-4-methyloxy group, an ethoxycarbonyl methyloxy group, and a 4-(4-butylcyclohexyloxycarbonyl)-cyclohexyloxy group. These groups may have a substituent or may not have a substituent.

The aryloxy group represented by $R^4$ is preferably an aryloxy group having 6 to 30 carbon atoms, more preferably 7 to 25 carbon atoms, and examples thereof include a p-butylphenoxy group, a p-pentyloxyphenoxy group, a p-fluorophenoxy group, a 4-(2-hexyloxyethoxy)-3-methylphenoxy group, and an m-chlorophenoxy group. These groups may have a substituent or may not have a substituent.

In Formula (III), each R independently represents a hydrogen atom or a substituent. In this case, the substituent may be those described in Substituent Group V, and desirable examples thereof are also those described in Substituent Group V.

When the anthraquinone dye represented by Formula (III) has a substituent represented by Formula (I), both or only one of the $R^3$ and $R^4$ may be the substituent represented by Formula (I).

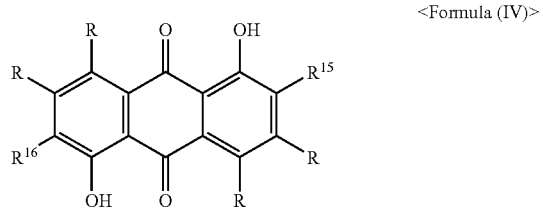

<Formula (IV)>

In Formula (IV) of Dye Group B, $R^{15}$ and $R^{16}$ each independently represent an aryl group or a heteroaryl group.

The aryl group and the heteroaryl group represented by $R^{15}$ and $R^{16}$ are defined in the same manner as the aryl group and the heteroaryl group as described in the section concerning $R^1$ and $R^2$ in Formula (II), respectively, and preferable examples thereof are also the same.

When the anthraquinone dye represented by Formula (IV) has a substituent represented by Formula (I), both or only one of the $R^{15}$ and $R^{16}$ may be the substituent represented by Formula (I), but it is desirable that only one of $R^{15}$ and $R^{16}$ is the substituent represented by Formula (I).

In Formula (IV), each R independently represents a hydrogen atom or a substituent, such as those described in Substituent Group V, and desirable substituents thereof are also those described in Substituent Group V.

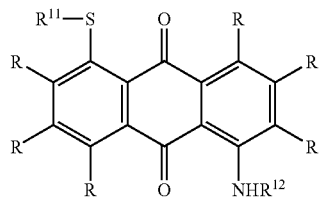

<Formula (V)>

In Formula (V) of Dye Group B, $R^{11}$ and $R^{12}$ each independently represent an aryl group or a heteroaryl group.

The aryl group and the heteroaryl group represented by $R^{11}$ and $R^{12}$ are defined in the same manner as the aryl group and the heteroaryl group as described in the section concerning the $R^1$ and $R^2$ in Formula (II), respectively, and the preferable examples thereof are also the same.

When the anthraquinone dye represented by Formula (V) has a substituent represented by Formula (I), both or only one of the $R^{11}$ and $R^{12}$ may be the substituent represented by Formula (I), but it is desirable that $R^{12}$ is a substituent represented by Formula (I).

In Formula (V), each R independently represents a hydrogen atom or a substituent, such as those described in Substituent Group V, and desirable substituents thereof are also those described in Substituent Group V.

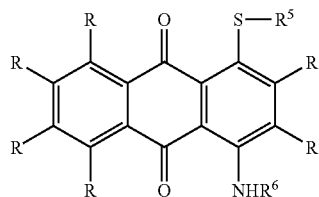

<Formula (VI)>

In Formula (VI) of Dye Group C, $R^5$ and $R^6$ each independently represent an aryl group or a heteroaryl group.

The aryl group and the heteroaryl group represented by $R^5$ and $R^6$ are defined in the same manner as the aryl group and the heteroaryl group as described in the section concerning the $R^1$ or $R^2$ in Formula (II), respectively, and the preferable examples thereof are also the same.

When the anthraquinone dye represented by Formula (VI) has a substituent represented by Formula (I), both or only one of $R^5$ and $R^6$ may be the substituent represented by Formula (I).

In Formula (VI), each R independently represents a hydrogen atom or a substituent, which may be those described in Substituent Group V, and desirable examples thereof are also those described in Substituent Group V.

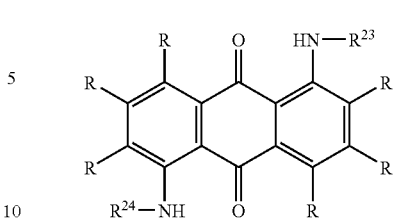

<Formula (VII)>

In Formula (VII) of Dye Group C, $R^{23}$ and $R^{24}$ each independently represent an aryl group or a heteroaryl group.

The aryl group and the heteroaryl group represented by $R^{23}$ and $R^{24}$ are defined in the same manner as the aryl group and the heteroaryl group as described in the section concerning the $R^1$ or $R^2$ in Formula (II), respectively, and the preferable examples thereof are also the same.

When the anthraquinone dye represented by Formula (VII) has a substituent represented by Formula (I), both or only one of the $R^{23}$ and $R^{24}$ may be the substituent represented by Formula (I).

In Formula (VII), each R independently represents a hydrogen atom or a substituent, such as those described in Substituent Group V, and desirable examples thereof are also those described in Substituent Group V.

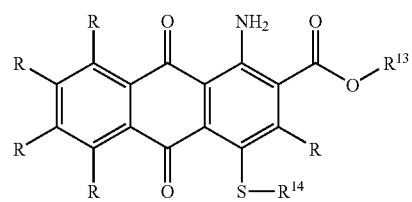

<Formula (VIII)>

In Formula (VIII) of Dye Group C, $R^{13}$ represents an alkyl group or an aryl group, $R^{14}$ represents an aryl group or a heteroaryl group, and each R independently represents a hydrogen atom or a substituent.

The alkyl group represented by $R^{13}$ is preferably an alkyl group having 1 to 24 carbon atoms, more preferably an alkyl group having 2 to 20, and still more preferably an alkyl group having 3 to 18 carbon atoms. The alkyl group represented by $R^{13}$ may have a substituent, which may be those described in Substituent Group V, and desirable examples thereof are also those described in Substituent Group V.

The alkyl groups represented by $R^{13}$ include, for example, an n-butyl group, an n-pentyl group, an n-hexyl group, a 4-butylcyclohexyl group, a 4-pentylcyclohexyl group, a 4-hydroxybutyl group, a 4-pentylcyclohexyl methyl group, a 4'-butylbicyclohexyl-4-methyl group, an ethoxycarbonyl methyl group, and a 4-(4-butylcyclohexyloxycarbonyl)-cyclohexyl group.

The aryl group represented by $R^{13}$ is defined in the same manner as the aryl group as described in the section concerning the $R^1$ and $R^2$ in Formula (II), respectively, and the suitable examples there of are also the same.

The aryl group and the heteroaryl group represented by $R^{14}$ are defined in the same manner as the aryl group and the heteroaryl group as described in the section concerning $R^1$ and $R^2$ in Formula (II), respectively, and the preferable examples are also the same.

In Formula (VIII), each R independently represents a hydrogen atom or a substituent, which may be those described in Substituent Group V, and desirable examples thereof are also those described in Substituent Group V.

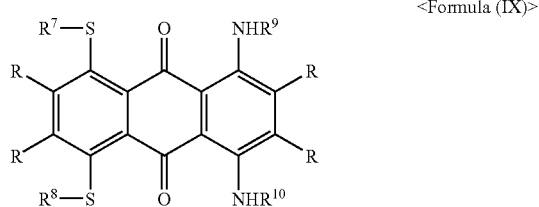

<Formula (IX)>

In Formula (IX) of Dye Group D, $R^7$, $R^8$, $R^9$ and $R^{10}$ each independently represent an aryl group or a heteroaryl group.

The aryl group and the heteroaryl group represented by $R^7$, $R^8$, $R^9$ and $R^{10}$ are defined in the same manner as the aryl group and the heteroaryl group as described in the section concerning the $R^1$ and $R^2$ in Formula (II), respectively, and the suitable examples thereof are also the same.

When the anthraquinone dye represented by Formula (IX) has a substituent represented by Formula (I), any one of $R^7$, $R^8$, $R^9$ and $R^{10}$ may be a substituent represented by Formula (I). It is preferable that one to four of $R^7$, $R^8$, $R^9$ and $R^{10}$ are the substituents represented by Formula (I), more preferably two or four of $R^7$, $R^8$, $R^9$ and $R^{10}$ are the substituents represented by Formula (I).

When the anthraquinone dye represented by Formula (IX) has two substituents represented by Formula (I), the two substituents may be any combination of $R^7$ and $R^8$, $R^9$ and $R^{10}$, and $R^7$ and $R^{10}$ (or a combination of $R^8$ and $R^9$).

In Formula (IX), each R independently represents a hydrogen atom or a substituent, which may be those described in Substituent Group V, and desirable examples thereof are also those described in Substituent Group V.

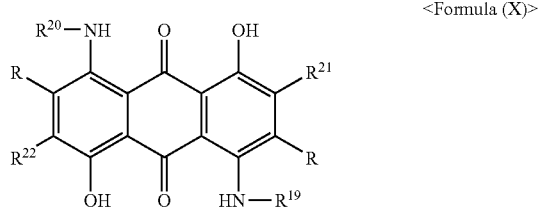

<Formula (X)>

In Formula (X) of Dye Group D, $R^{19}$ represents an aryl group or a heteroaryl group.

The aryl group and the heteroaryl group represented by $R^{19}$ are defined in the same manner as the aryl group and the heteroaryl group as described in the section concerning the $R^1$ and $R^2$ in Formula (II), respectively, and the suitable examples thereof are also the same.

$R^{20}$ represents a hydrogen atom, an alkyl group, an aryl group, or a heteroaryl group, preferably an aryl group or a heteroaryl group.

The aryl group and the heteroaryl group represented by $R^{20}$ are defined in the same manner as the aryl group and the heteroaryl groups described in the section concerning the $R^1$ and $R^2$ in Formula (II), respectively, and the suitable examples thereof are also the same.

In Formula (X), $R^{21}$ and $R^{22}$ each independently represent a hydrogen atom, an alkyl group, an alkoxy group, an aryl group, an aryloxy group, or a heteroaryl group.

$R^{21}$ and $R^{22}$ are defined in the same manner as $R^4$ in Formula (III), and the suitable examples thereof are also the same.

In Formula (X), each R independently represents a hydrogen atom or a substituent, such as those described in Substituent Group V, and desirable examples thereof are also those described in Substituent Group V.

When the anthraquinone dye represented by Formula (X) has a substituent represented by Formula (I), the aryl group or the heteroaryl group represented by $R^{19}$, $R^{20}$, $R^{21}$ and $R^{22}$ may further have a substituent to form a substituent represented by Formula (I). It is preferable that 0 to 3 of $R^{19}$, $R^{20}$, $R^{21}$ and $R^{22}$ are the substituents represented by Formula (I).

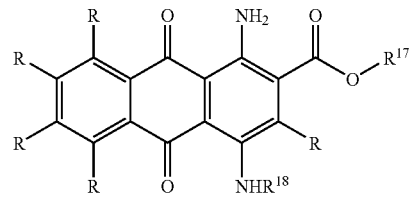

<Formula (XI)>

In Formula (XI), $R^{17}$ represents an alkyl group or an aryl group, and each R independently represents a hydrogen atom or a substituent.

$R^{17}$ is defined in the same manner as $R^{13}$ as described in Formula (VIII), and the suitable examples thereof are also the same.

$R^{18}$ represents a hydrogen atom, an alkyl group, an aryl group, or a heteroaryl group.

$R^{18}$ is defined in the same manner as $R^{20}$ as described in Formula (X), and the suitable examples thereof are also the same.

In Formula (XI), each R independently represents a hydrogen atom or a substituent, such as those described in Substituent Group V, and desirable examples thereof are also those described in Substituent Group V.

<Combination of Dyes>

The liquid crystal composition of the present invention contains three or more kinds of anthraquinone dyes, wherein at least two kinds of the anthraquinone dyes have a substituent represented by Formula (1), which anthraquinone dyes may have an anthraquinone skeleton represented by any of Formulae (II) to (XI). Accordingly, it is also possible to select at least three kinds of anthraquinone dyes from the anthraquinone dyes represented by any of Formulae (II) to (XI), irrespective of Dye Groups A to D, wherein at least two kinds of the anthraquinone dyes have a substituent represented by Formula (I).

Namely, it is preferable that at least two combinations selected from the following (a) to (j), more preferably three or more combinations, contain at least one substituent represented by Formula (1):

(a) $R^1$ and $R^2$ in Formula (II);
(b) $R^3$ and $R^4$ in Formula (III);
(c) $R^{15}$ and $R^{16}$ in Formula (IV);
(d) $R^{11}$ and $R^{12}$ in Formula (V);
(e) $R^5$ and $R^6$ in Formula (VI);
(f) $R^{23}$ and $R^{24}$ in Formula (VII);
(g) $R^{13}$ and $R^{14}$ in Formula (VIII);
(h) $R^7$ to $R^{10}$ in Formula (IX);
(i) $R^{19}$ to $R^{22}$ in Formula (X); and
(j) $R^{17}$ and $R^{18}$ in Formula (XI).

More preferably, the liquid crystal composition of the present invention includes at least one kind selected from the above Dye Group A (anthraquinone dye represented by formula (II)), at least one kind selected from the above Dye Group B (anthraquinone dye represented by formulae (III), (IV) and (V)), at least one kind selected from the above Dye Group C (anthraquinone dye represented by formulae (VI), (VII) and (VIII)), and at least one kind selected from the above Dye Group D (anthraquinone dye represented by formulae (IX), (X) and (XI)), from the viewpoint of improving the solubility of the dyes in a host liquid crystal, and improving the order parameter.

The anthraquinone dye included in Dye Group A has a structure in which a main absorption exists in a yellow region. The anthraquinone dye included in Dye Group B has a structure in which a main absorption exists in a red region. The anthraquinone dye included in Dye Group C has a structure in which a main absorption exists in a violet region. The anthraquinone dye included in Dye Group D has a structure in which a main absorption exists in a cyan region.

It is presumed that by selecting at least one dye from each of these dye groups and using them in combination, the ratio of the substituents represented by Formula (I) to a specific chromophore is increased and association among the dyes is suppressed to inhibit the changes in color hue, solubility of the dyes in a host liquid crystal is increased, and the order parameter is improved. However, the reason for the above effects is not clear, and the present invention is not limited to the above presumption.

In the liquid crystal composition of the present invention, at least two kinds of anthraquinone dyes out of the four or more kinds of anthraquinone dyes selected from each of Dye Groups A to D, preferably three or more, and more preferably four or more, have a substituent represented by Formula (I).

It is still more preferable that the liquid crystal composition of the present invention contains at least one anthraquinone dye represented by Formula (II), at least one anthraquinone dye represented by Formula (III), (IV) or (V), at least one anthraquinone dye represented by Formula (VI) or (VII), and at least one anthraquinone dye represented by formula (IX).

According to this combination, it is assumed that deactivation of a dye in an excited state can be effectively achieved, and excellent light fastness can be attained.

Also in this case, at least two kinds of anthraquinone dyes out of the four or more kinds of anthraquinone dyes, preferably three or more, and more preferably four or more, have a substituent represented by Formula (I).

Particularly preferable combination of the dyes for the liquid crystal composition is a combination of anthraquinone dyes represented by Formulae (II), (III), (VI) and (IX), a combination of anthraquinone dyes represented by Formulae (II), (IV), (VI) and (IX), and a combination of anthraquinone dyes represented by Formulae (II), (V), (VI) and (IX). According to these combinations, it is considered that the light fastness, the solubility in a host liquid crystal, and the order parameter will be even more improved.

In the following, specific examples of the anthraquinone dyes included in Dye Groups A to D and other dyes, which can be used in the present invention, but the present invention will not be limited thereto.

Dye Group A

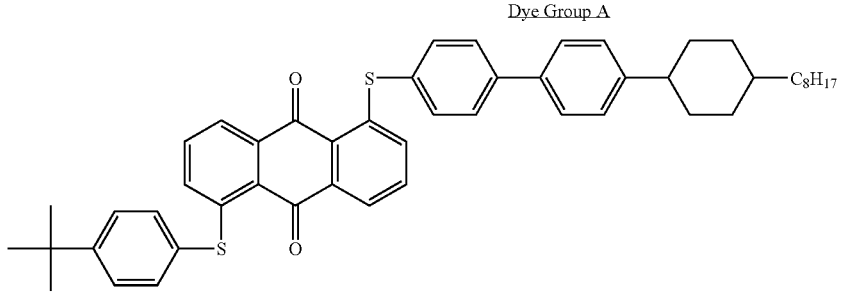

(A-1)

cis/trans = 25/75

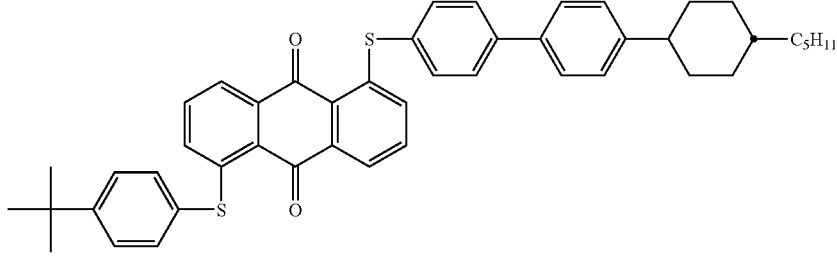

(A-2)

-continued
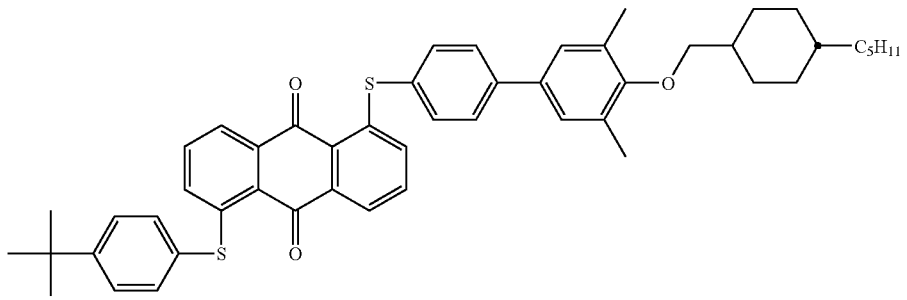
(A-3)
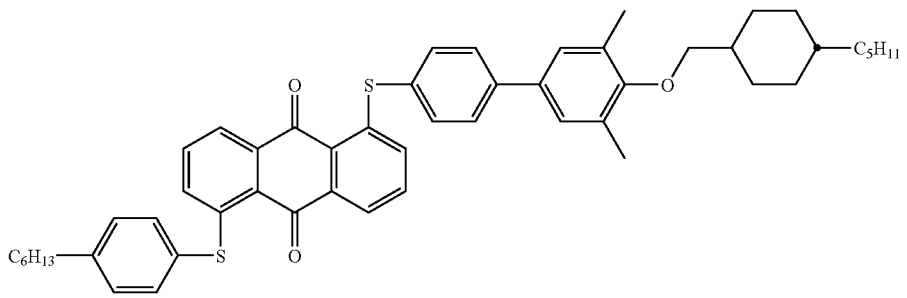
(A-4)
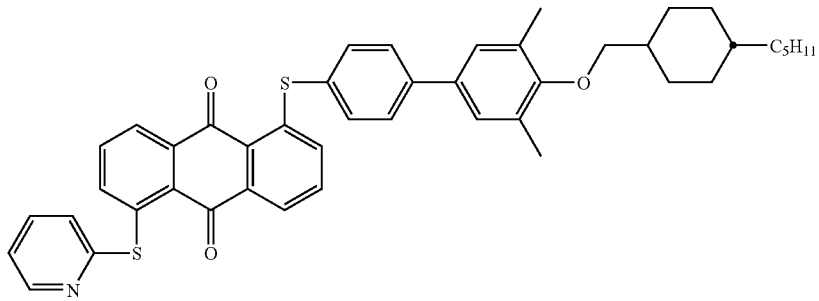
(A-5)
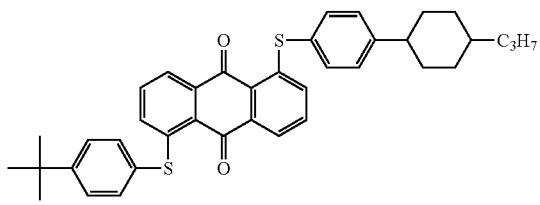
(A-6)
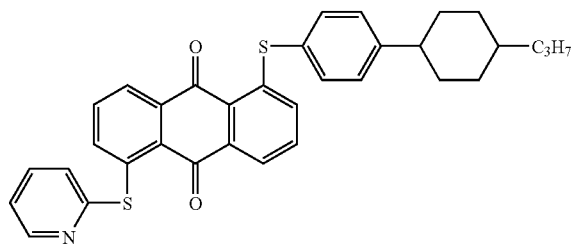
(A-7)
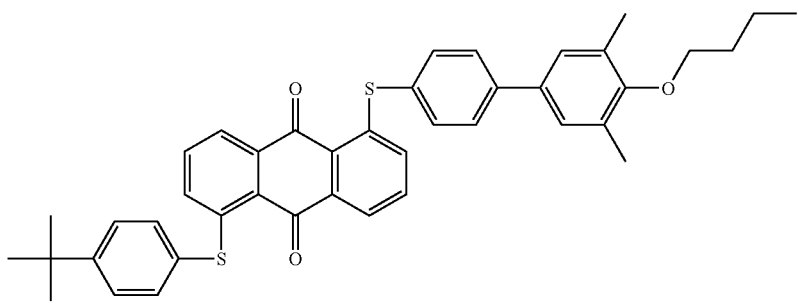
(A-8)

-continued
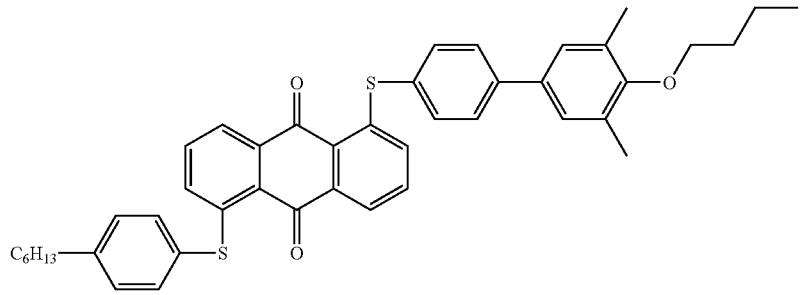
(A-9)
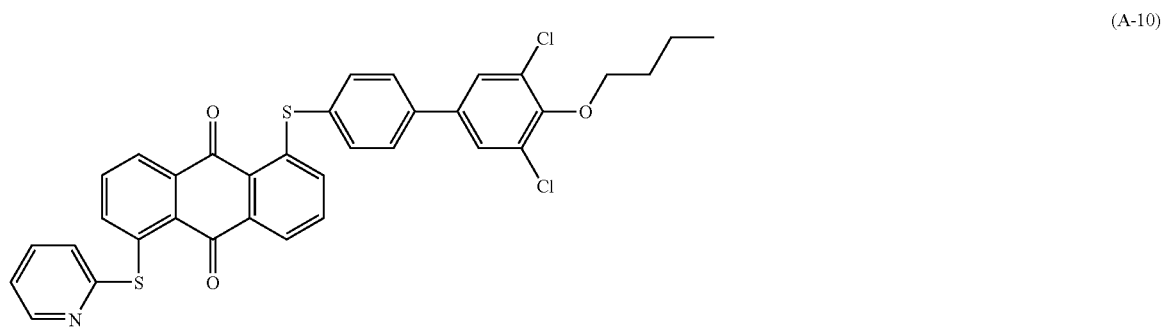
(A-10)
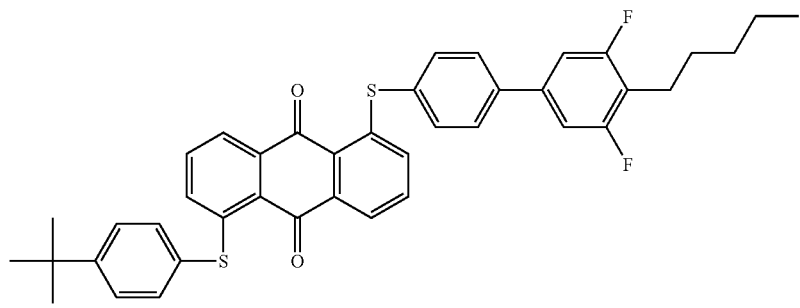
(A-11)
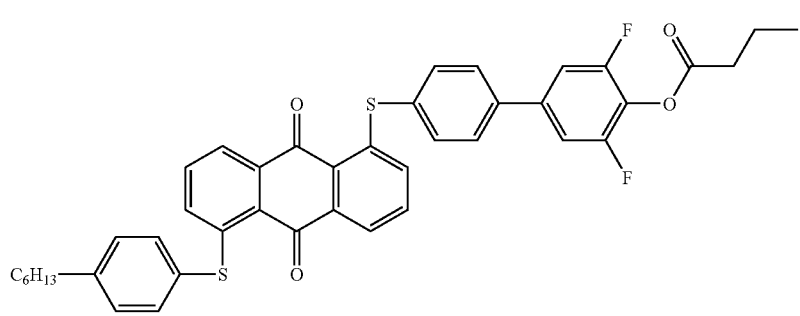
(A-12)

-continued
(A-13)
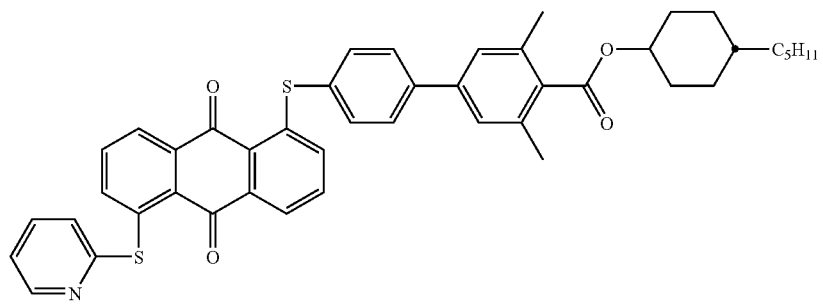
Dye Group B
(B-1)                                                           (B-2)
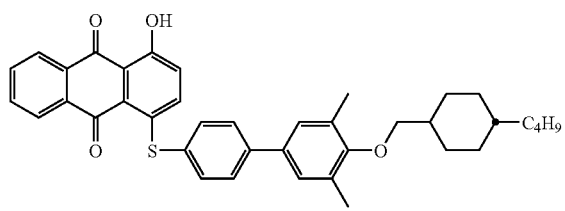                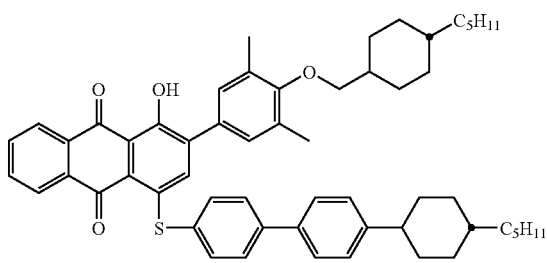
(B-3)                                                           (B-4)
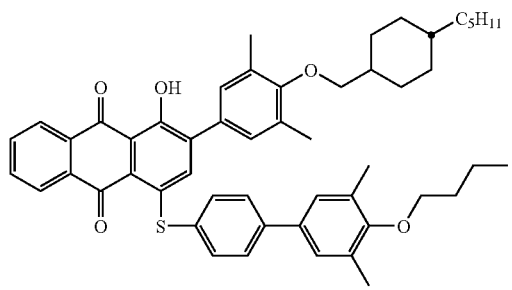                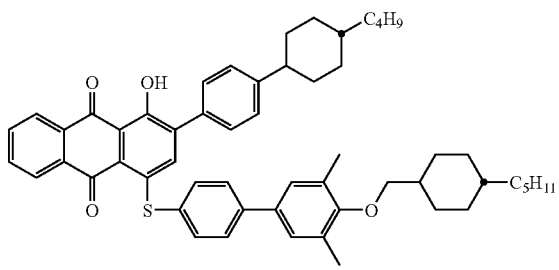
(B-5)                                                           (B-6)
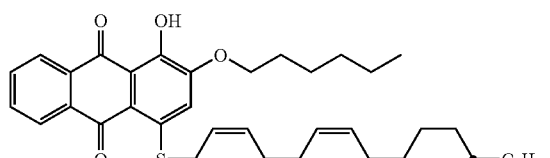                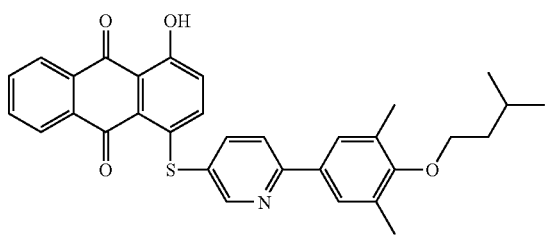
(B-7)
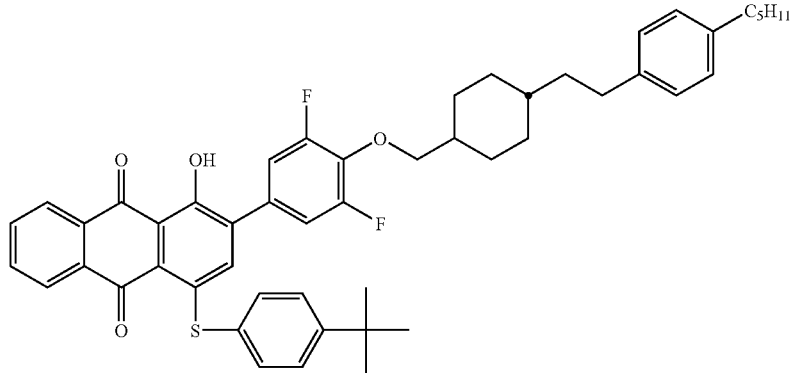

-continued
(B-8)
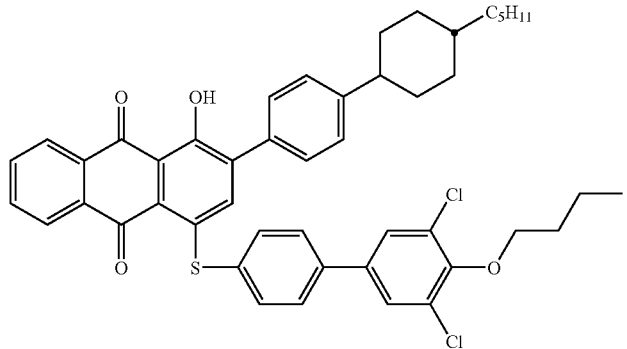
(B-9)
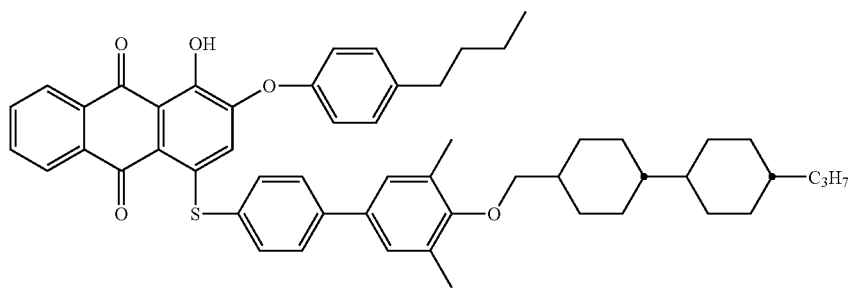
(B-10)
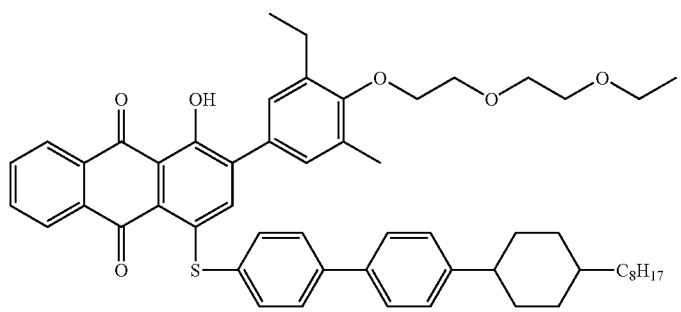
(B-11)
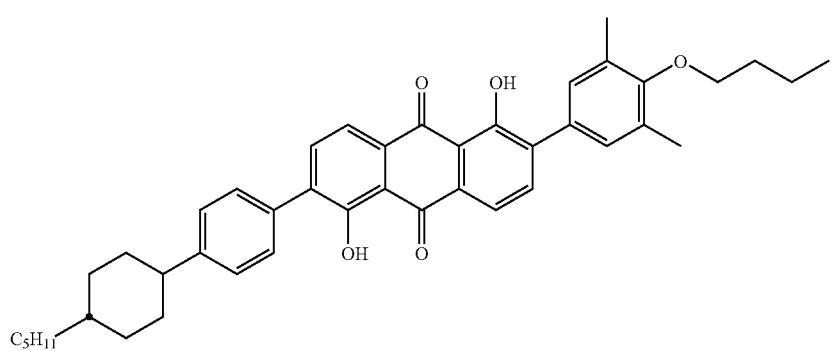

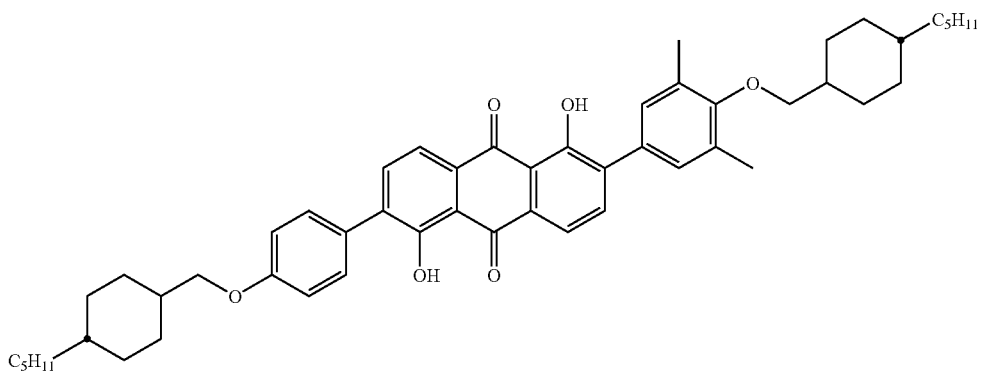
(B-12)
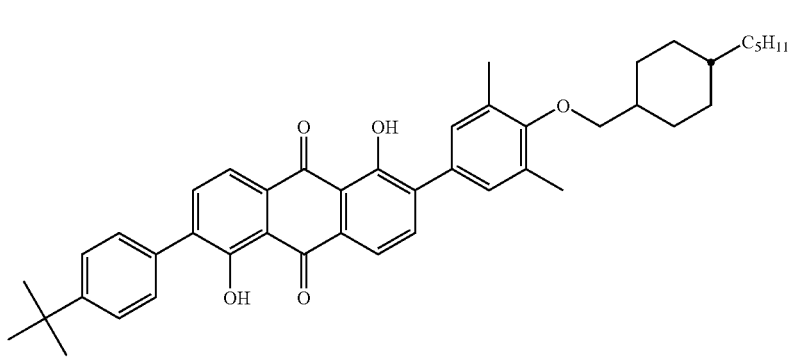
(B-13)
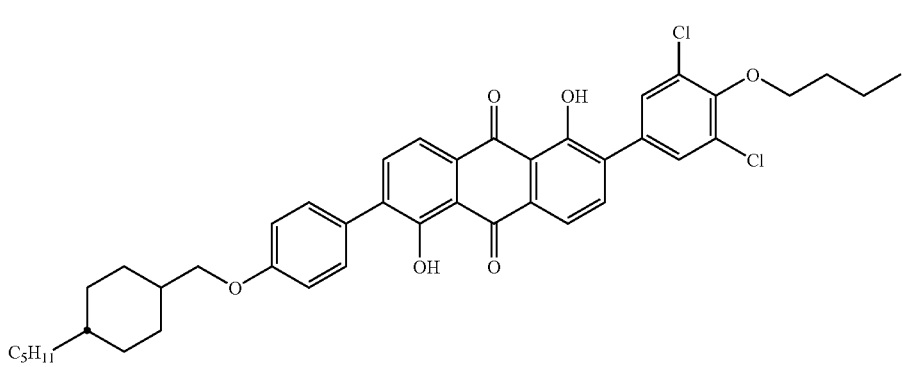
(B-14)
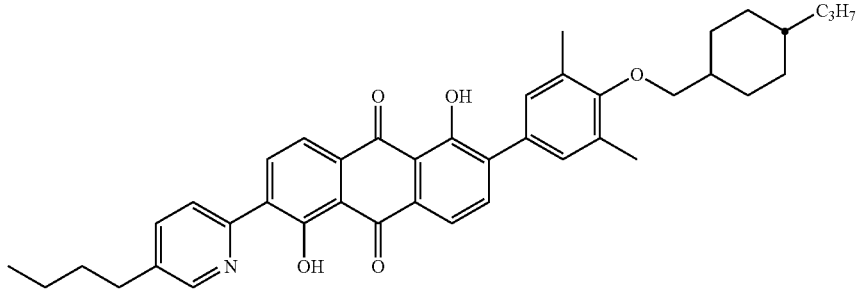
(B-15)

-continued
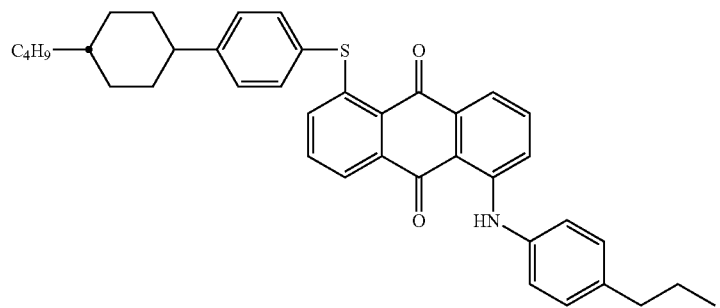
(B-16)
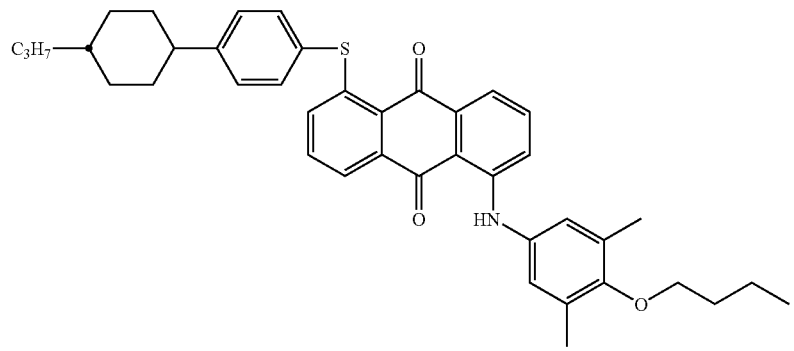
(B-17)
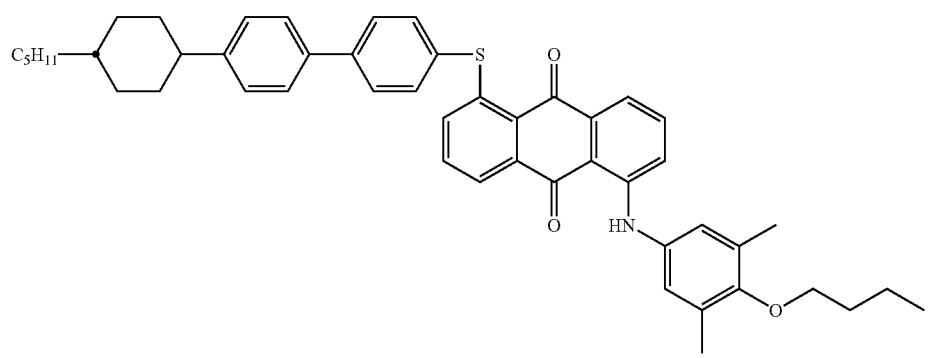
(B-18)
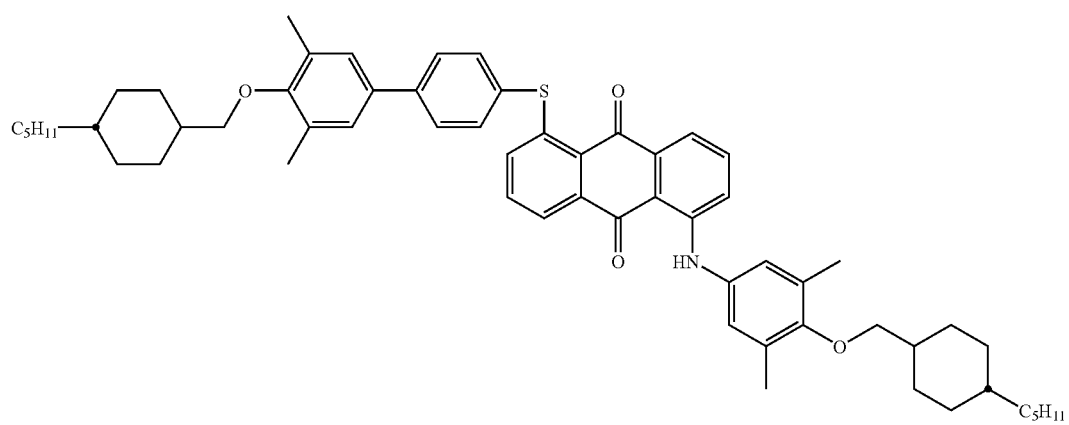
(B-19)

-continued
(B-20)
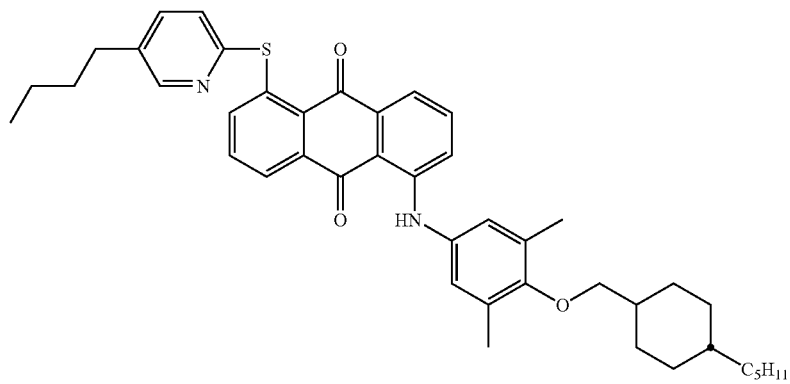
(B-21)
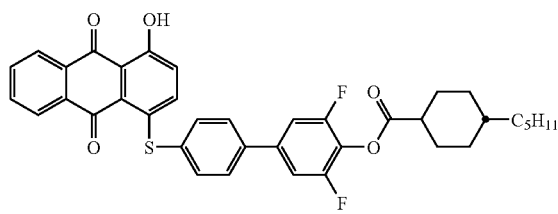
(B-22)
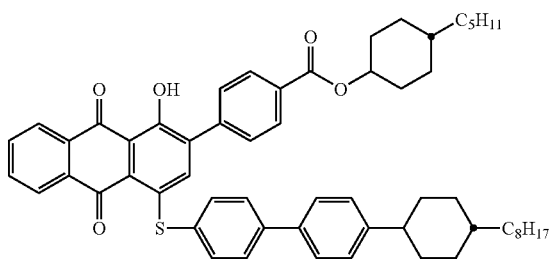
(B-23)
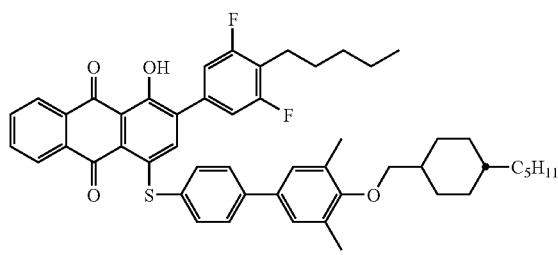
(B-24)
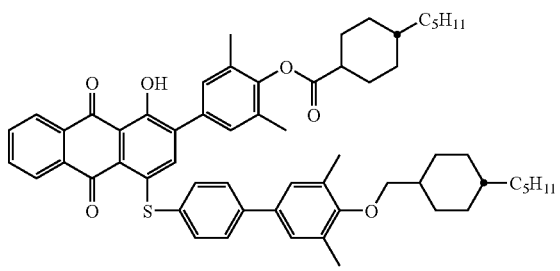
(B-25)
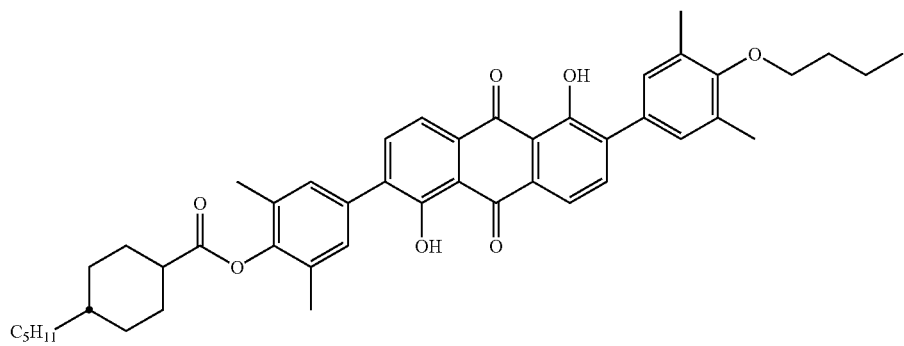
(B-26)
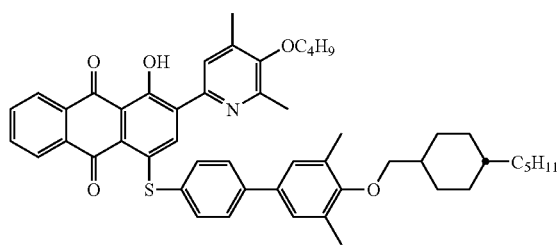
(B-27)
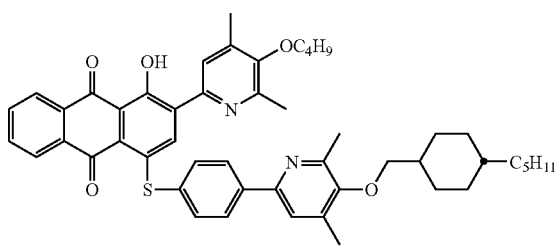

-continued
(B-28)
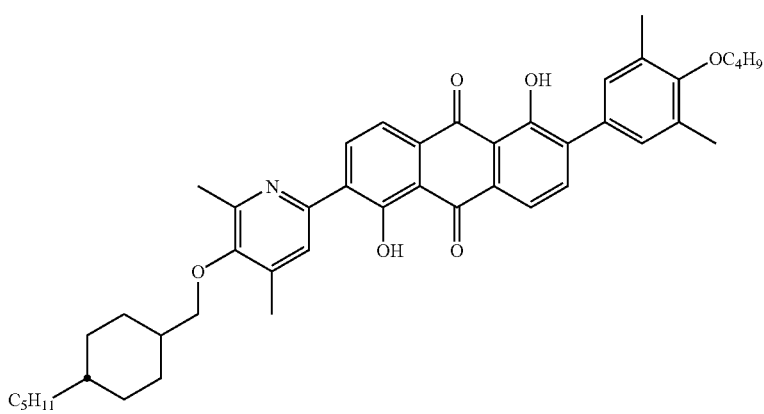
Dye Group C
(C-1)
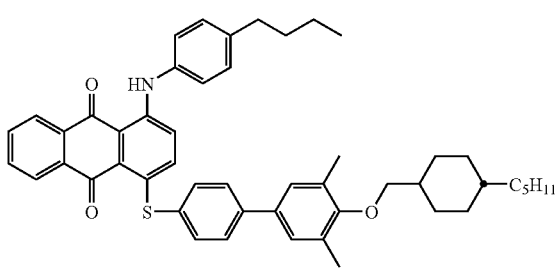
(C-2)
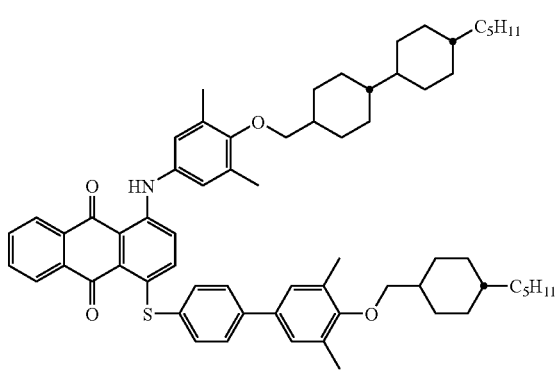
(C-3)
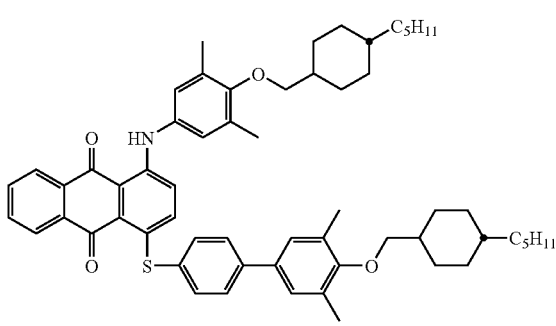
(C-4)
(C-5)
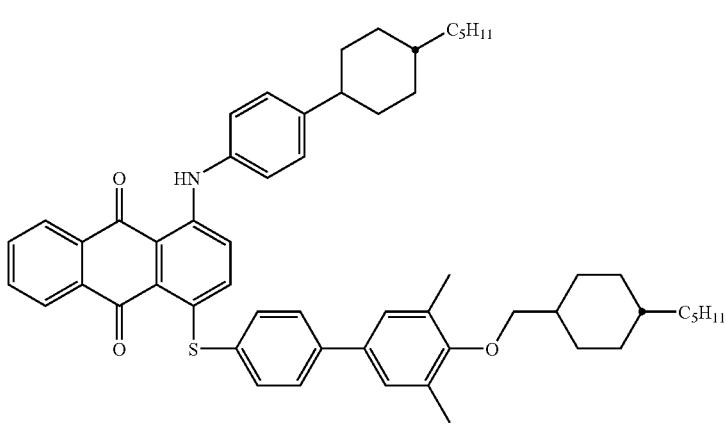

-continued
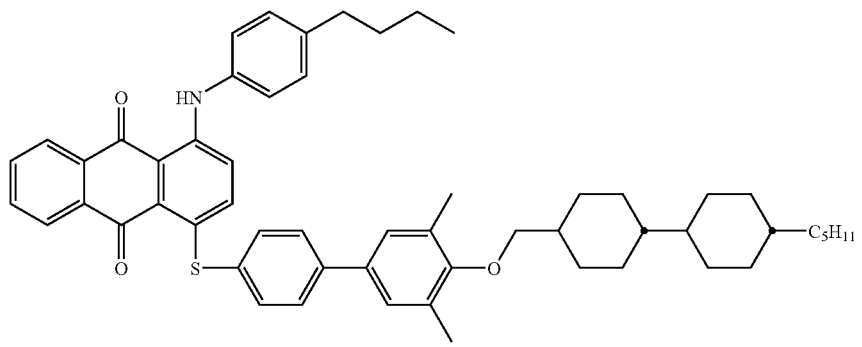
(C-6)
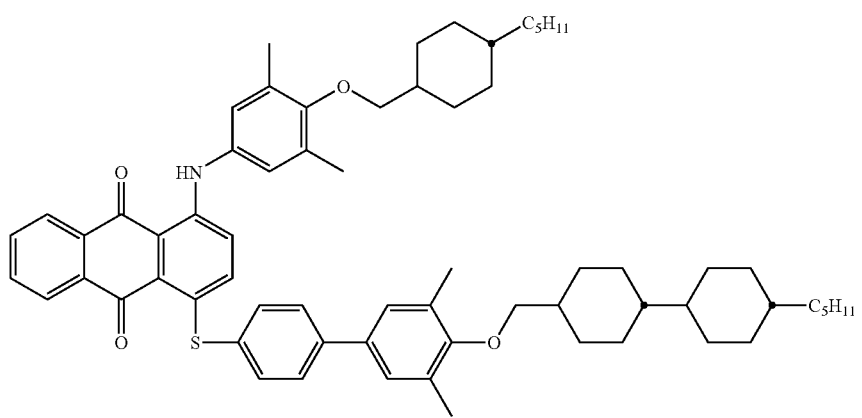
(C-7)
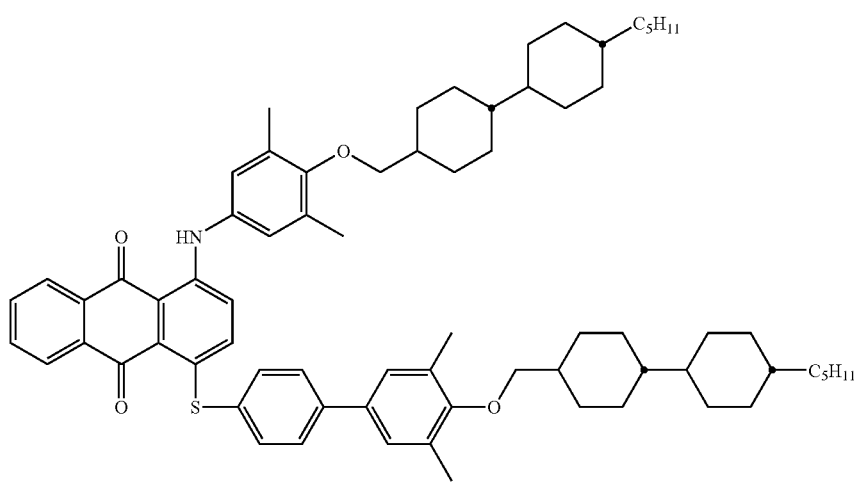
(C-8)

-continued
(C-9)
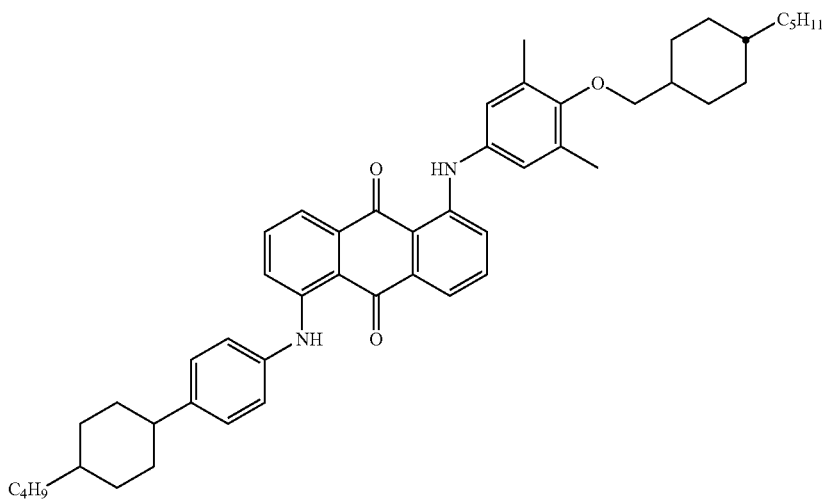
(C-10)
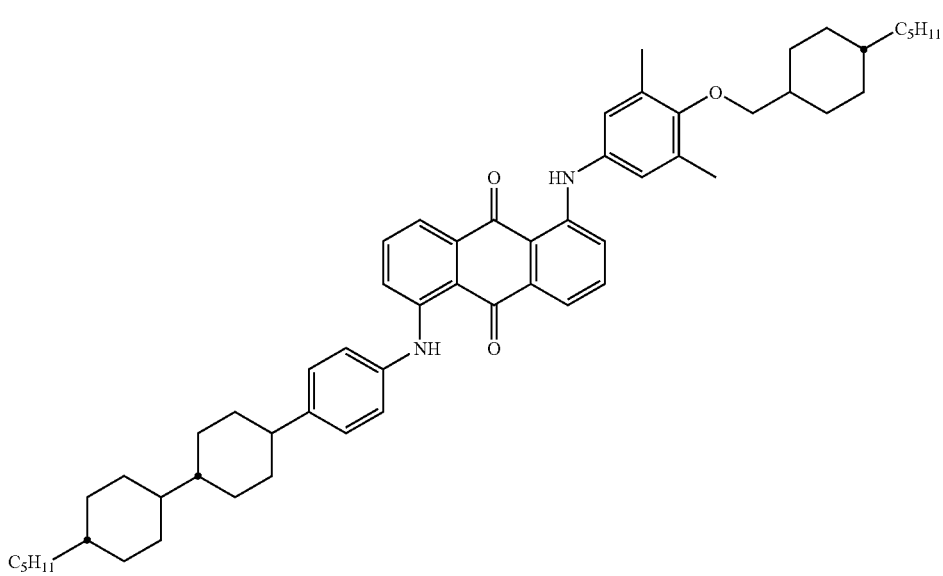
(C-11)
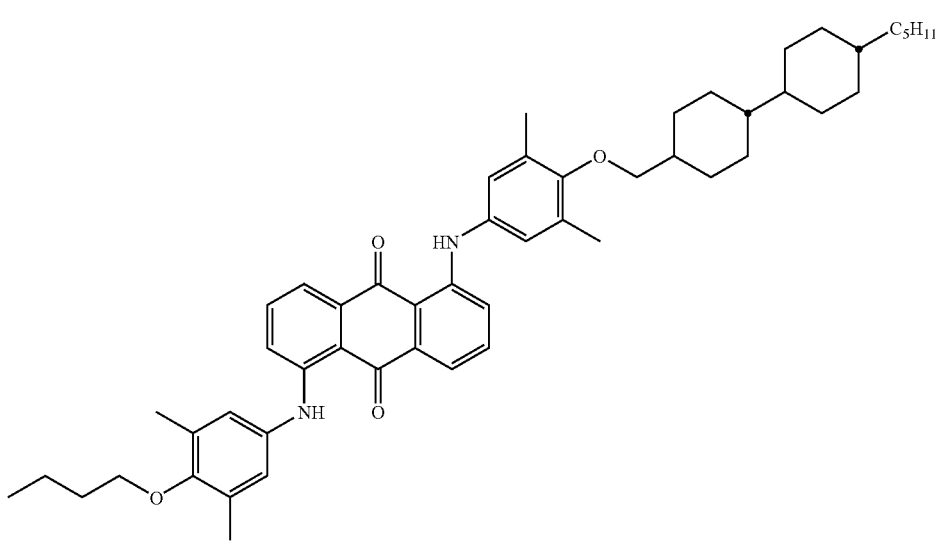

-continued
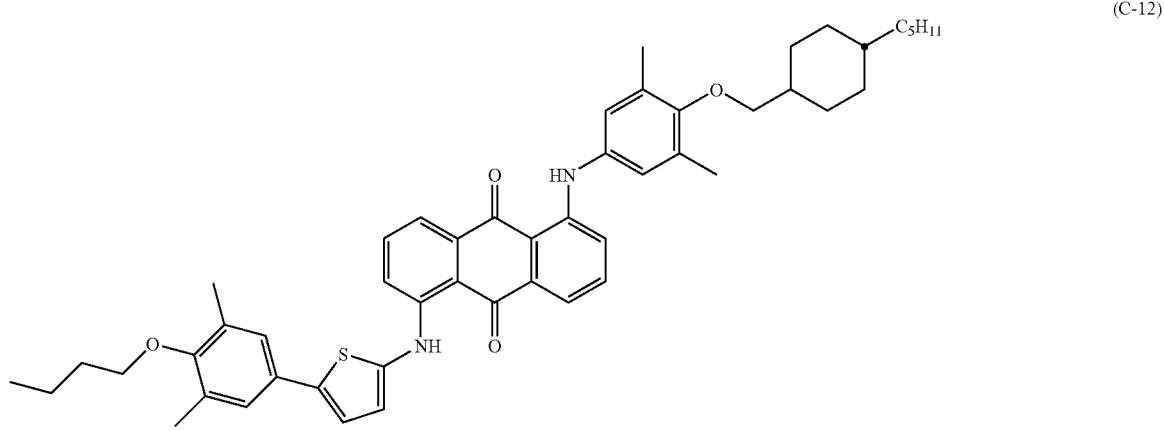
(C-12)
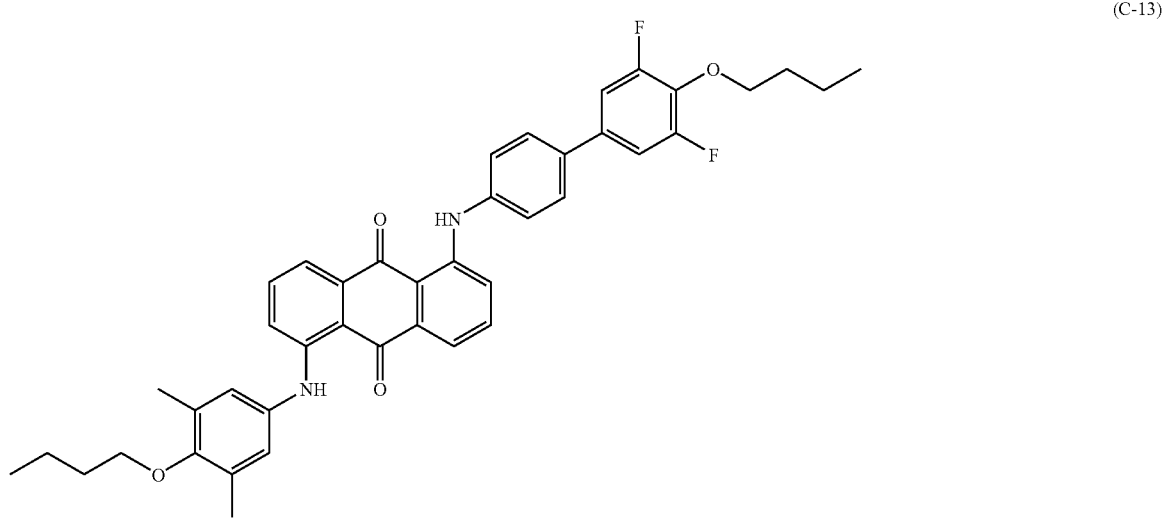
(C-13)
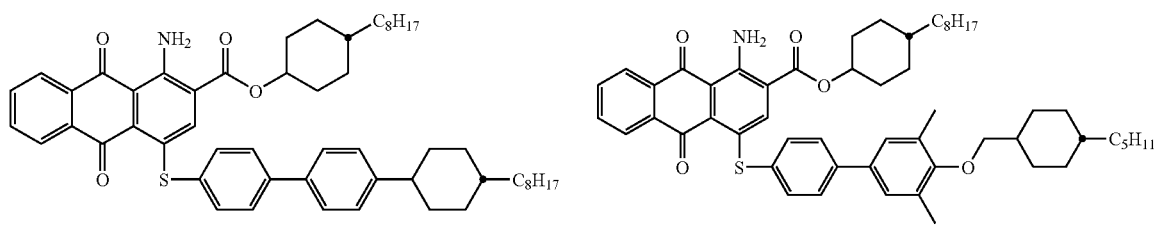
(C-14) (C-15)
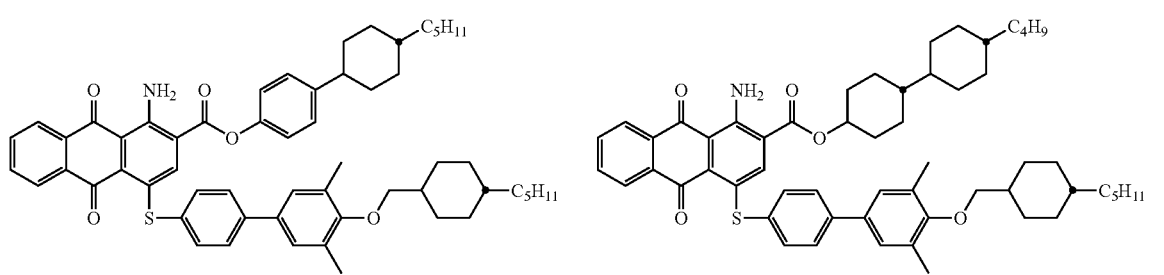
(C-16) (C-17)

-continued
(C-18)
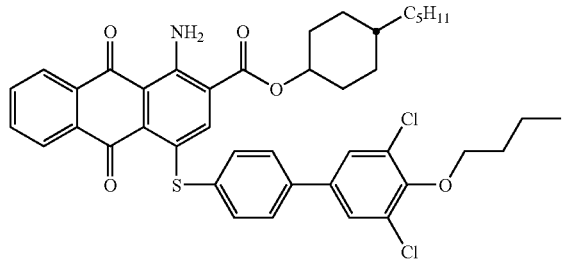
(C-19)
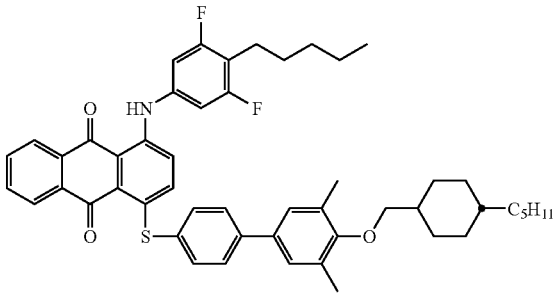
(C-20)
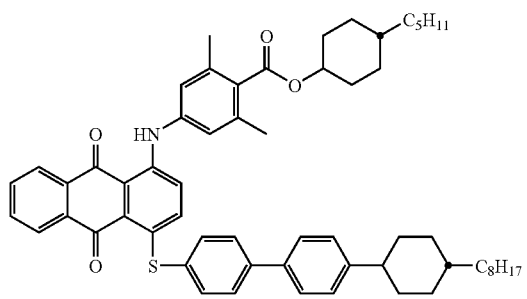
(C-21)
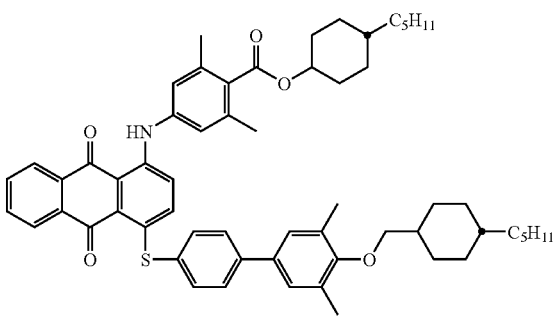
(C-22)
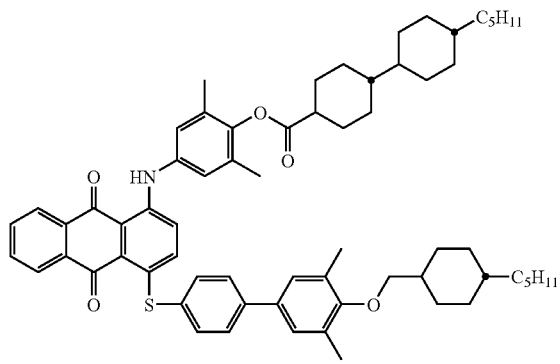
(C-23)
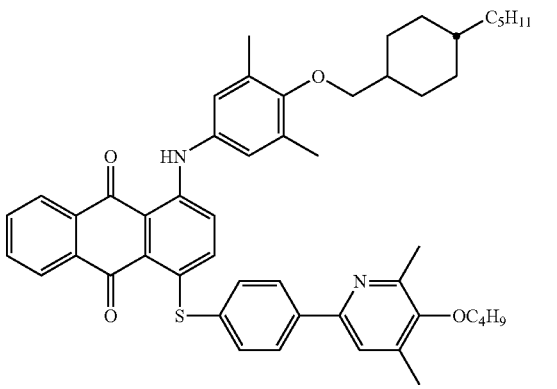
(C-24)
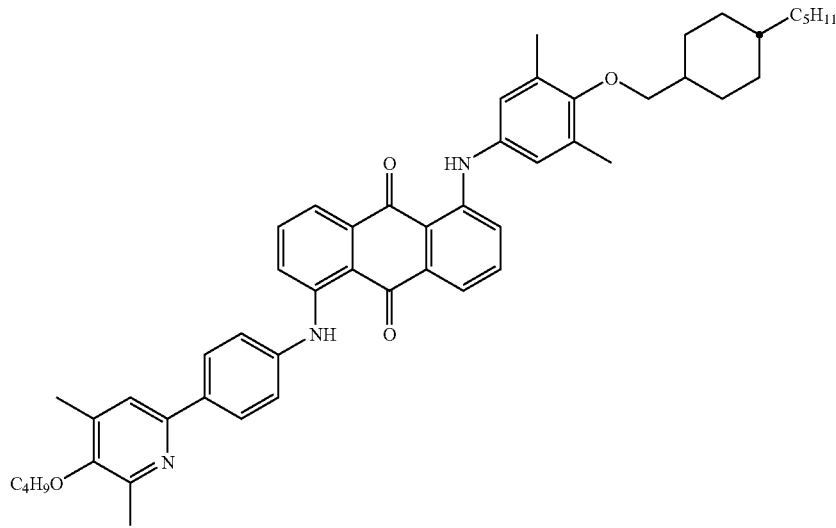

-continued
Dye Group D
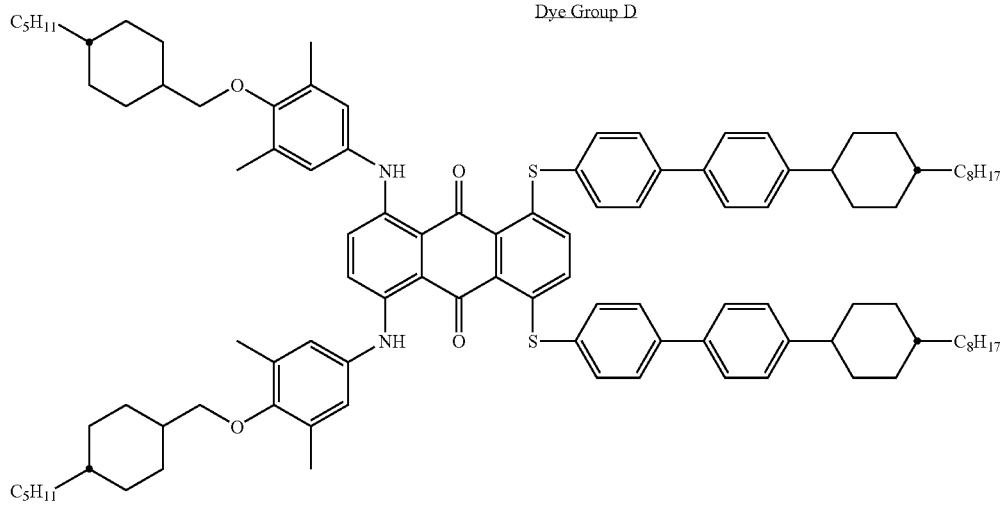
(D-1)
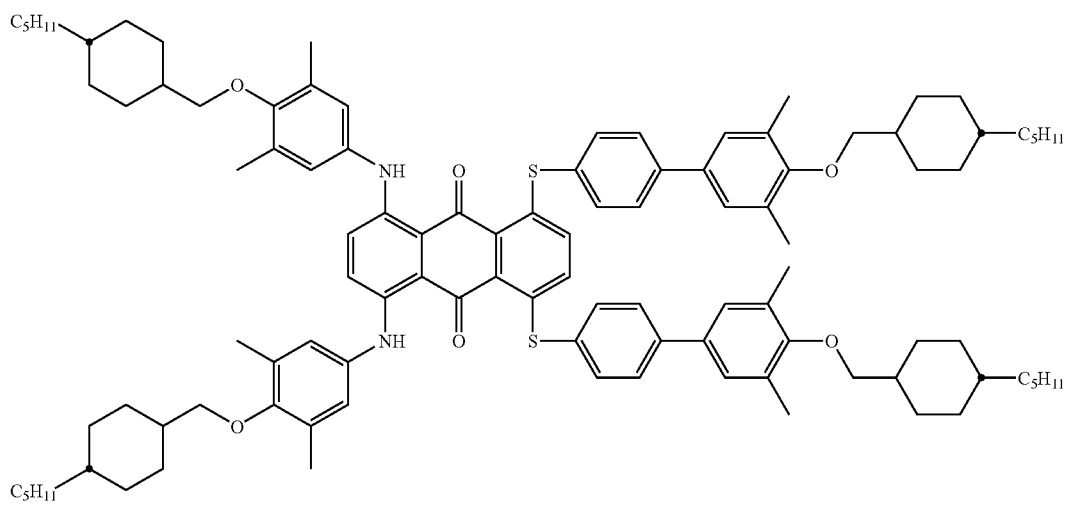
(D-2)
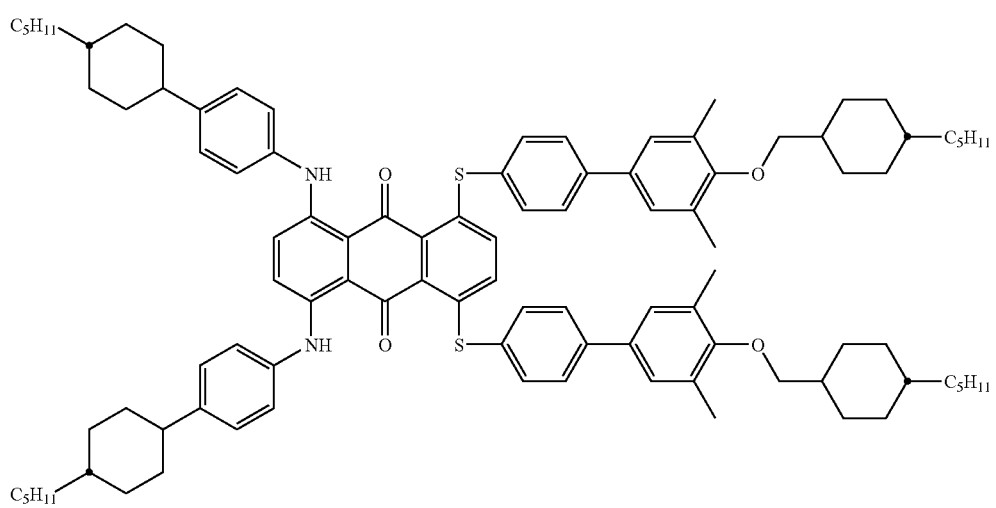
(D-3)

-continued
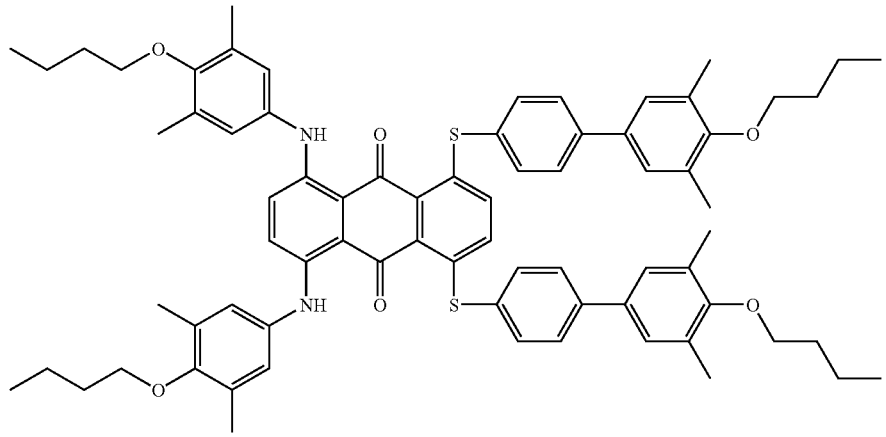
(D-4)
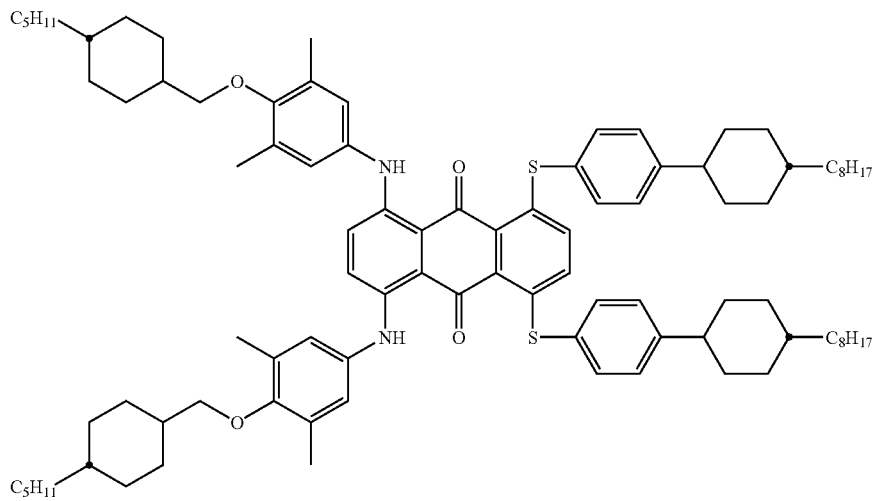
(D-5)
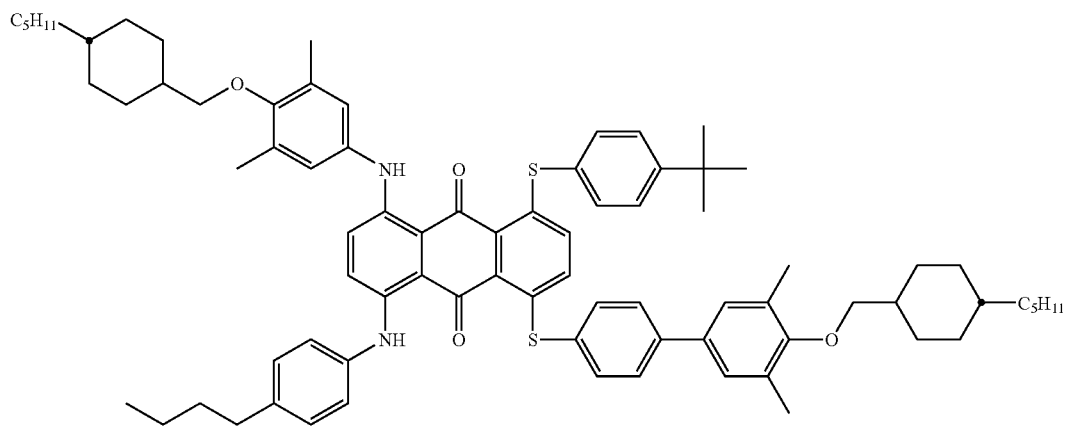
(D-6)

-continued
(D-7)
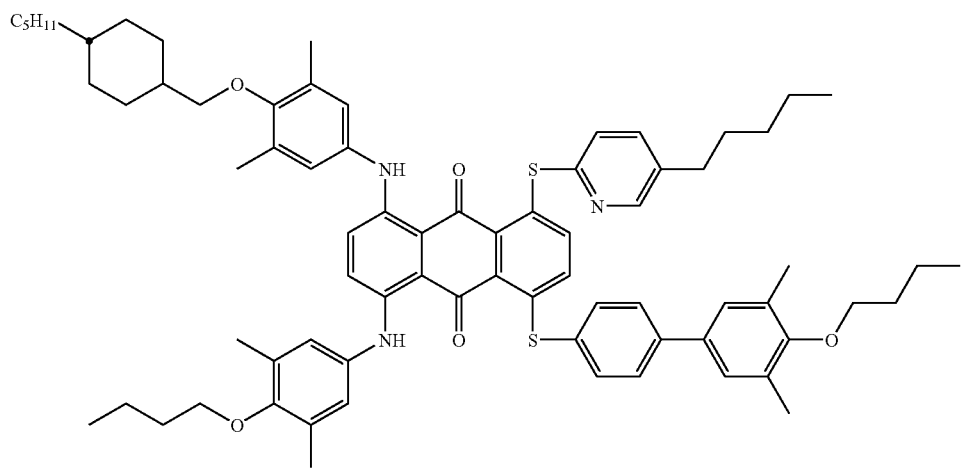
(D-8)
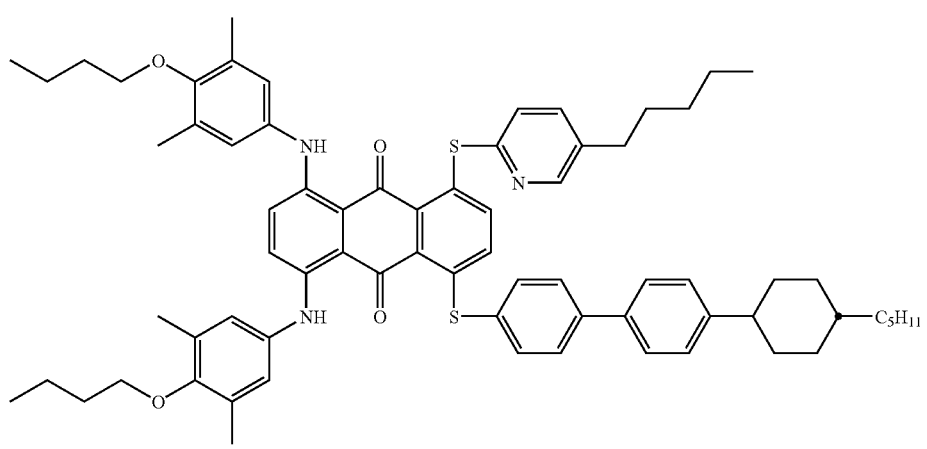
(D-9)
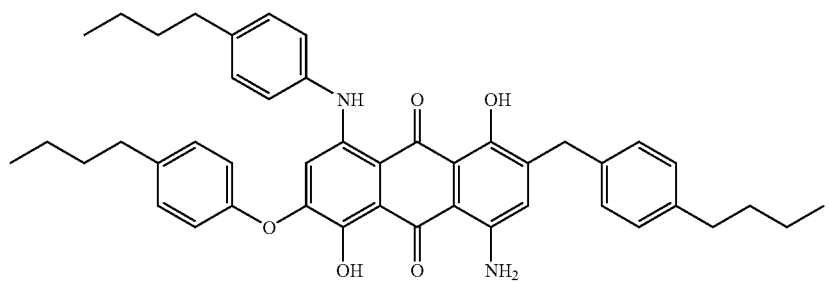
(D-10)
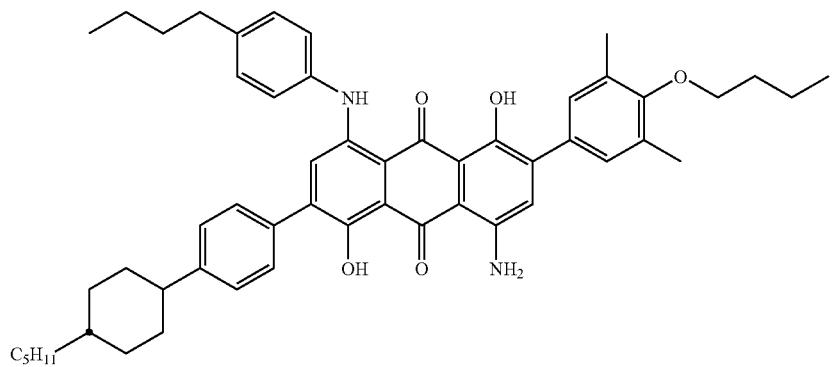

-continued
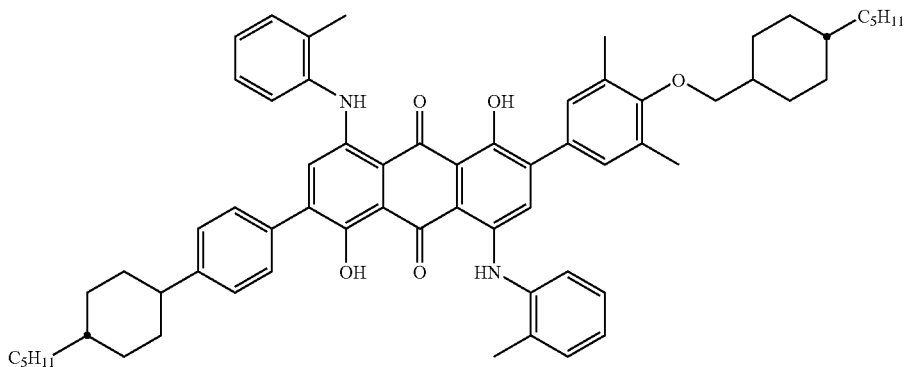
(D-11)
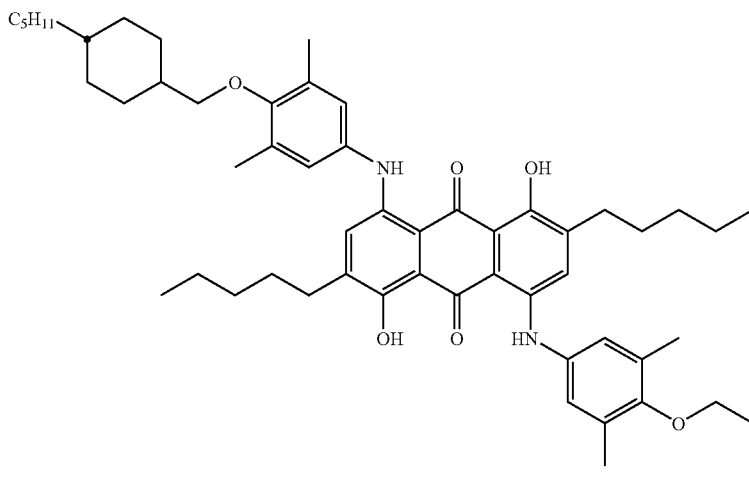
(D-12)
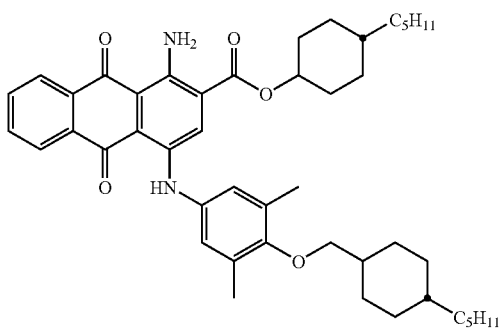
(D-13)
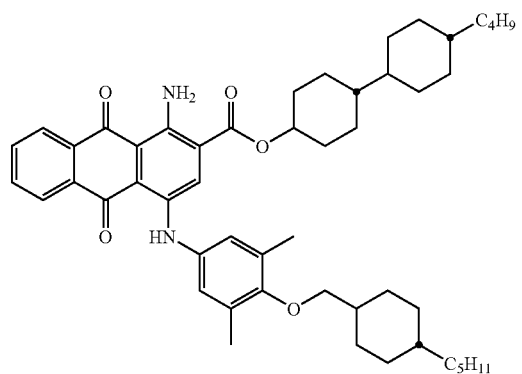
(D-14)
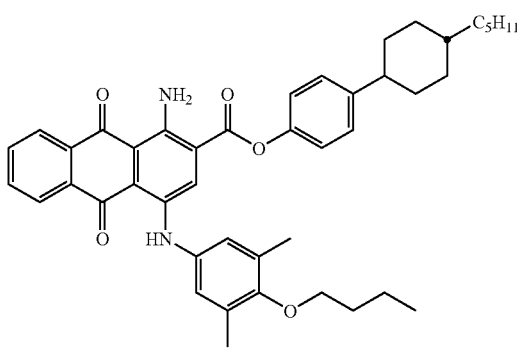
(D-15)
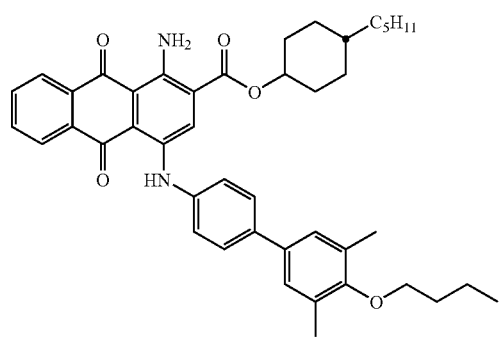
(D-16)

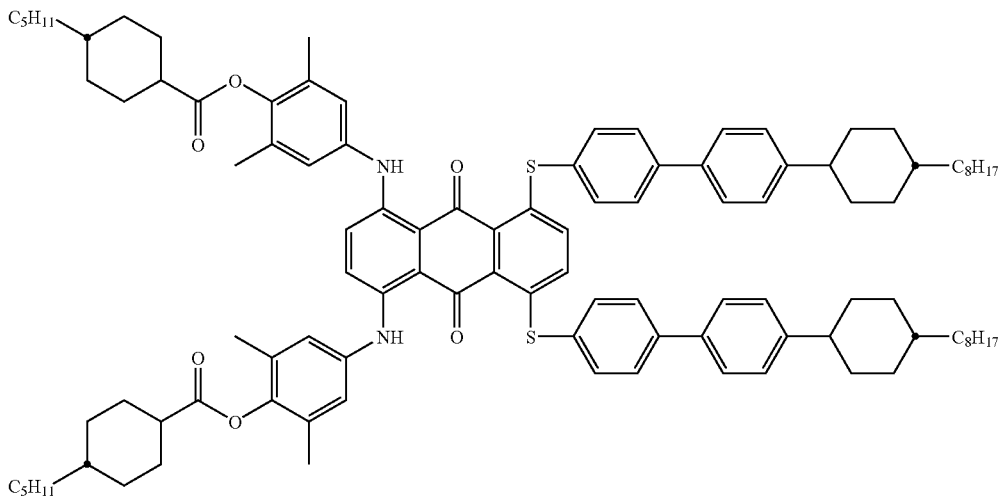
(D-17)
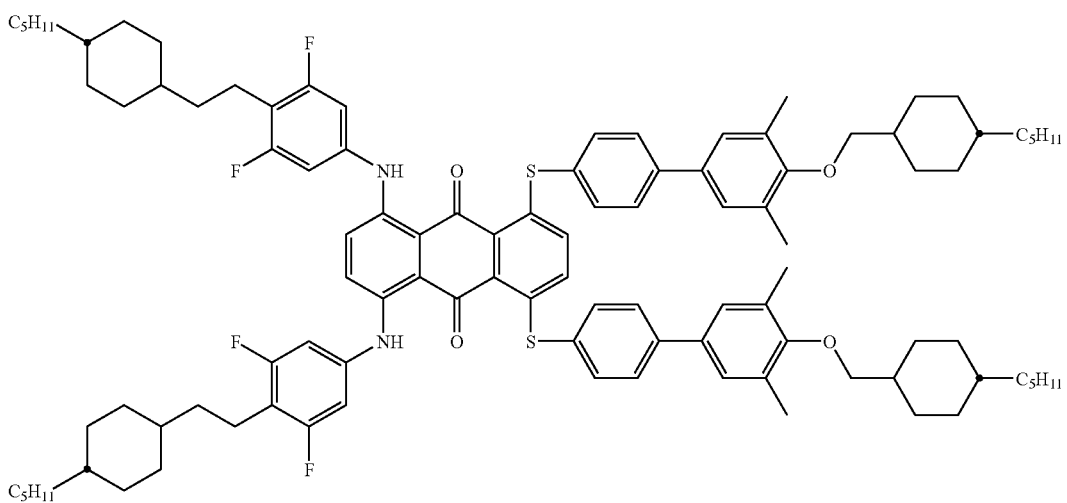
(D-18)
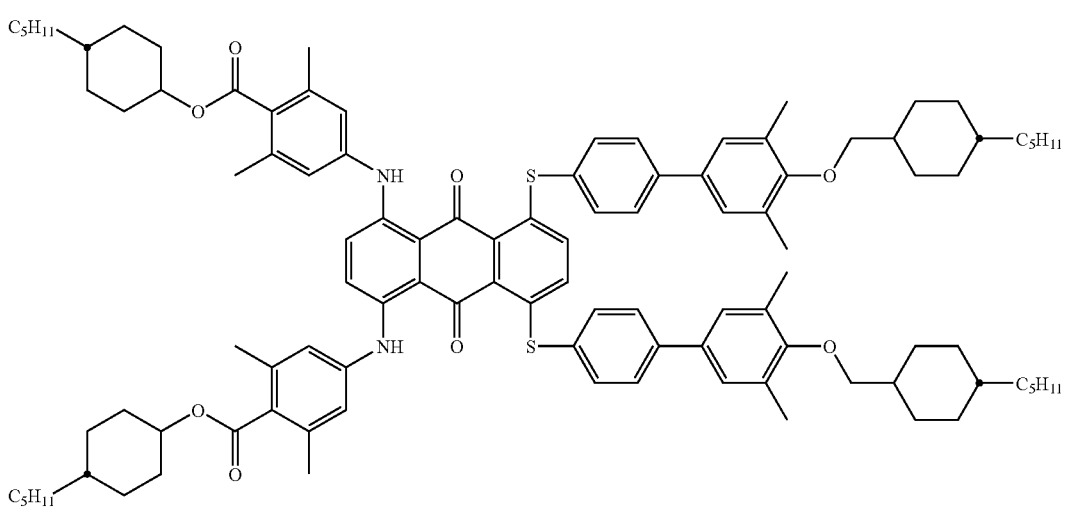
(D-19)

-continued
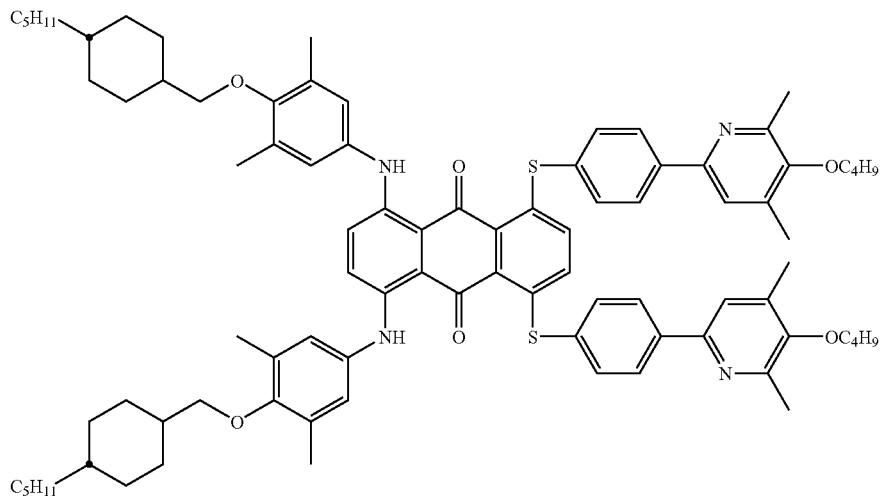
(D-20)
Other Dyes
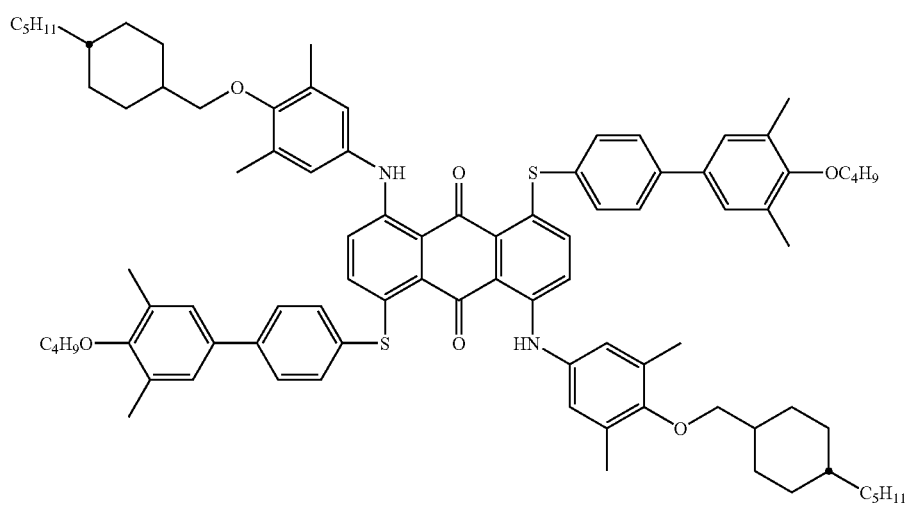
(E-1)
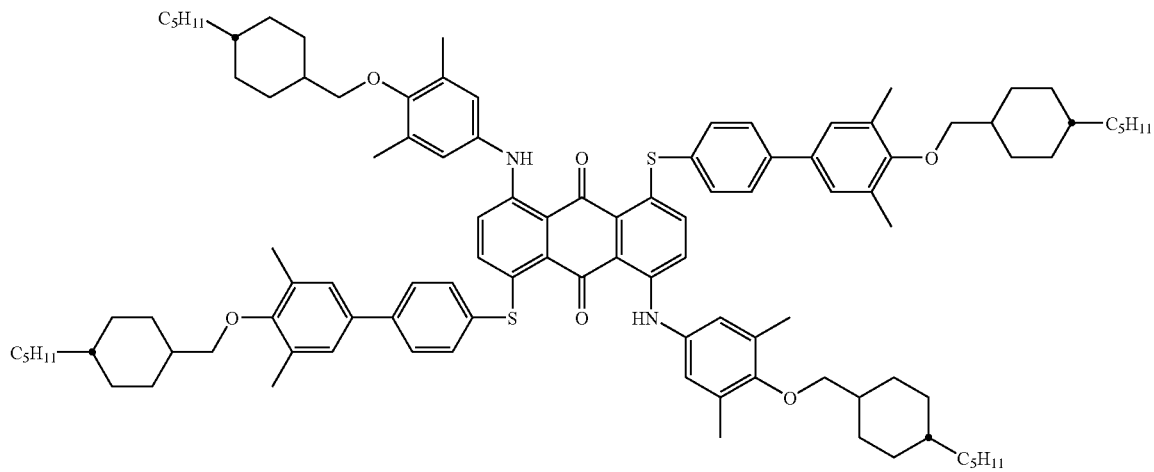
(E-2)

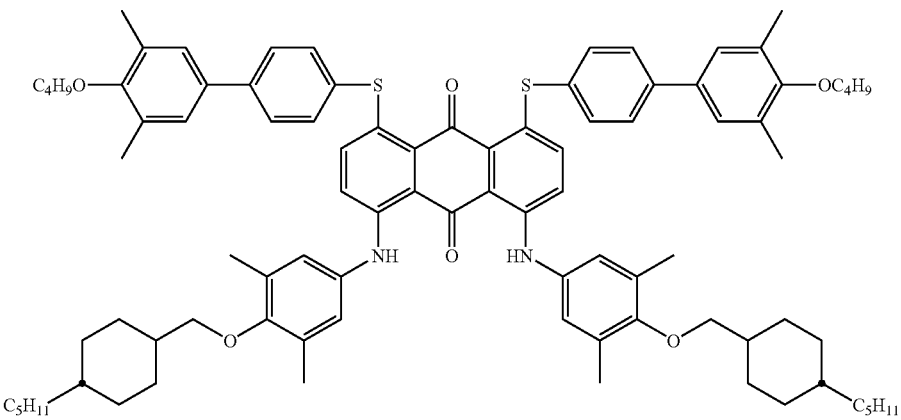

(E-3)

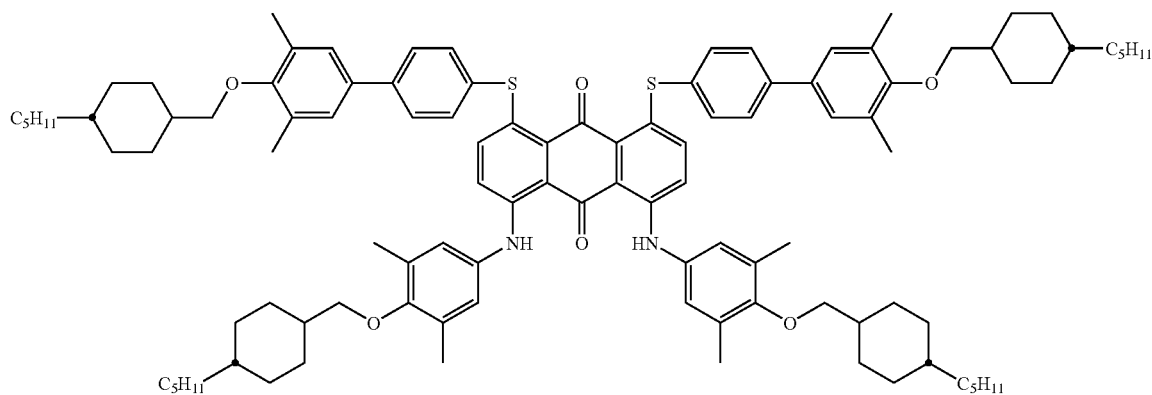

(E-4)

The anthraquinone dyes having a substituent represented by Formula (I) may be synthesized by known methods, such as those disclosed in Alexander V. Ivashchenko, Dichroic Dyes For Liquid Crystal Display, CRC Press, and JP-A No. 2003-192664. The above-described exemplary compounds (A-1) to (E-4) may also be synthesized with reference to those documents.

<Liquid Crystal Composition>

The liquid crystal composition of the present invention contains a liquid crystal and at least two anthraquinone dyes having a substitutent represented by Formula (I). The anthraquinone dyes having a substituent represented by Formula (I) may function as a dichroic dye when dissolved in a liquid crystal (hereinafter, may be referred to as a host liquid crystal). The liquid crystal that may be used in the liquid crystal composition according to the present invention is defined as a compound having a function of controlling a state of orientation of a dichroic dye by changing the state of orientation thereof by the action of an electric field.

The dichroic dye (including the anthraquinone dyes according to the present invention) may be dissolved in a host liquid crystal by a method such as mechanical stirring, heating, ultrasonic wave, or a combination thereof. Other known methods may also be employed in preparing the liquid crystal composition of the present invention.

The host liquid crystal used in the liquid crystal composition of the present invention is not particularly limited as long as it can co-exist with the aforementioned anthraquinone dye, and examples thereof include liquid crystal compounds that exhibit a nematic phase or a smectic phase.

The liquid crystal according to the present invention preferably exhibits a nematic phase. The liquid crystal compound that exhibits a nematic phase (nematic liquid crystal) here refers to a liquid crystal that exhibits a nematic phase at 25° C.

When a nematic liquid crystal is used, a degree of voltage that is necessary for changing a state of orientation can be lowered, as compared with the case in which a cholesteric liquid crystal or a smectic liquid crystal is used. Moreover, there is such an advantage that a helical structure can be readily formed when a nematic liquid crystal is used in combination with a chiral agent, thereby improving display characteristics.

The larger the dielectric anisotropy of the liquid crystal ($\Delta\epsilon$) is, the smaller the threshold voltage is, which is advantageous for reducing the amount of electric power consumption. Therefore, the dielectric anisotropy ($\Delta\epsilon$) is preferably 10 or more, and more preferably 20 or more.

The dielectric anisotropy ($\Delta\epsilon$) is defined as a difference between a dielectric constant in a longitudinal direction of a liquid crystal molecule ($\epsilon_\parallel$) and a dielectric constant in a minor axis direction of the liquid crystal moledule ($\epsilon_\perp$).

$$\Delta\epsilon = \epsilon_\parallel - \epsilon_\perp$$

In a scattered state based on a random focal conic state, the larger the refraction anisotropy ($\Delta n$) of the nematic liquid crystal is, the higher the scattering intensity is, thereby improving display characteristics. Accordingly, the refraction anisotropy ($\Delta n$) of the nematic liquid crystal of the present invention is preferably large.

The refraction anisotropy (Δn) is defined as a difference between a refraction index in a longitudinal direction of a liquid crystal molecule (n∥) and a refraction index in a minor axis direction of the liquid crystal molecule (n⊥).

$$\Delta n = n\| - n\perp$$

The range of the refraction anisotropy (Δn) in a practical sense is from about 0.05 to 0.4, and from about 0.08 to 0.25, considering durability of the liquid crystal.

Specific examples of the nematic liquid crystal compounds include azomethine compounds, cyanobiphenyl compounds, cyanophenyl esters, phenyl esters, cyclohexane carboxylic acid phenyl esters, phenylcyclohexane, phenyl pyrimidine, phenyl dioxane, tolan compounds, alkenylcyclohexylbenzonitrile, and the like. For example, liquid crystal compounds described in pages 154 to 192 and pages 715 to 722 of Liquid Crystal Device Handbook, edited by Japan Society for the Promotion of Science, the 142$^{nd}$ Committee, published by Nikkan Kogyo Shimbun, Ltd., 1989, may be used.

Commercially available products include liquid crystals from Merck Ltd. Japan (E7, E100, ZLI-1132, 1565, 3700, 3926, 4792, MLC-6067-000, 6267, 6284, 6287, 6288, 6406, 6422, 6423, 6425, 6435, 6437, 6481, 6486, 6492, 6499, 6629, 6633, 6657-000, 6828, 6844-000, 6848-000, 6873-000, 6873-100, 6893-000, 6893-100, 7001, 7003, 7018, 7020, 7021-000, 7021-100, 7022-000, 7022-100, 7023, 7700, 7800, 9000-000, 9300-000, 12000-000, 13800-000, 13800-100, 13900-000, 13900-100, 15900-000, 15900-100, 16000-000, 16000-100, 114000-000, 114000-100, 116000-000, 116000-100 and the like), liquid crystals from Chisso Corporation (LIXON5036xx, 5037xx, 5039xx, 5040xx, 5041xx, and the like), and liquid crystals from Adeka Corporation (HA-11757, CA-32150 and the like).

In the liquid crystal composition according to the present invention, it is preferable to use a liquid crystal compound having four rings (four-ring liquid crystal) from the viewpoint of making it easy to maintain a state of scattering by intensifying the scattering by increasing the refraction anisotropy (Δn) or by increasing the viscosity. Moreover, a high degree of transition temperature at which the composition exhibits liquid crirtallinity can be obtained when a liquid crystal having four rings is used.

The liquid crystal compound having four rings is preferably represented by the following Formula (1).

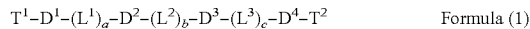

Formula (1)

In Formula (1), $D^1$ to $D^4$ each independently represent an arylene group, a heteroarylene group or a divalent alicyclic hydrocarbon group; $L^1$ to $L^3$ each independently represent a divalent linkage group; $T^1$ represents an alkyl group or an alkoxy group; $T^2$ represents an alkyl group, a cyano group, a halogen atom, a nitro group, a perfluoroalkoxy group, or a perfluoroalkyl group; and a, b and c each independently are an integer of from 0 to 3.

The arylene group represented by $D^1$ to $D^4$ preferably has carbon atoms of 6 to 20, more preferably carbon atoms of 6 to 10. Specific examples of the preferable arylene group include phenylene groups and naphthalene groups, such as 1,4-phenylene group, naphthalene-2,6-diyl group, and tetrahydronaphthalene-2,6-diyl group.

The heteroarylene group represented by $D^1$ to $D^4$ preferably has carbon atoms of 1 to 20, more preferably 2 to 9. Specific examples of the heteroarylene group include a group formed from a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, and a triazole ring; and heteroarylene groups obtained by removing a hydrogen atom each from two carbon atoms of a condensed ring formed by condensation of the above ring.

The divalent alicyclic hydrocarbon group represented by $D^1$ to $D^4$ preferably has carbon atoms of 3 to 20, more preferably carbon atoms of 4 to 12. Specific examples of the divalent alicyclic hydrocarbon group include cyclohexanediyl group and decahydronaphthalenediyl group, more preferably cyclohexane-1,4-diyl group and decahydronaphthalene-2,6-diyl group.

$D^1$ to $D^4$ may have a substituent which may be the same or different from each other. Examples of the substituent include those described in the following Substituent Group V.

(Substituent Group V)

Halogen atoms (such as a chlorine atom, a bromine atom, an iodine atom and a fluorine atom), a mercapto group, a cyano group, a carboxyl group, a phosphoric acid group, a sulfo group, a hydroxyl group, a carbamoyl group having 1 to 10 carbon atoms, preferably 2 to 8 carbon atoms and more preferably 2 to 5 carbon atoms (such as a methylcarbamoyl group, an ethylcarbamoyl group and a morpholinocarbonyl group), a sulfamoyl group having 0 to 10 carbon atoms, preferably 2 to 8 carbon atoms and more preferably 2 to 5 carbon atoms (such as a methylsulfamoyl group, an ethylsulfamoyl group and a piperidinosulfonyl group), a nitro group, an alkoxy group having 1 to 20 carbon atoms, preferably 1 to 10 carbon atoms and more preferably 1 to 8 carbon atoms (such as a methoxy group, an ethoxy group, a 2-methoxyethoxy group, a 2-methoxyethoxy group, and a 2-phenylethoxy group), an aryloxy group having 6 to 20 carbon atoms, preferably 6 to 12 carbon atoms and more preferably 6 to 10 carbon atoms (such as a phenoxy group, a p-methylphenoxy group, a p-chlorophenoxy group and a naphthoxy group), an acyl group having 1 to 20 carbon atoms, preferably 2 to 12 carbon atoms and more preferably 2 to 8 carbon atoms (such as an acetyl group, a benzoyl group and a trichloroacetyl group), an acyloxy group having 1 to 20 carbon atoms, preferably 2 to 12 carbon atoms and more preferably 2 to 8 carbon atoms (such as an acetyloxy group and a benzoyloxy group), an acylamino group having 1 to 20 carbon atoms, preferably 2 to 12 carbon atoms and more preferably 2 to 8 carbon atoms (such as an acetylamino group), a sulfonyl group having 1 to 20 carbon atoms, preferably 1 to 10 carbon atoms and more preferably 1 to 8 carbon atoms (such as a methanesulfonyl group, an ethanesulfonyl group and a benzenesulfonyl group), a sulfinyl group having 1 to 20 carbon atoms, preferably 1 to 10 carbon atoms and more preferably 1 to 8 carbon atoms (such as a methanesulfinyl group, an ethanesulfinyl group and a benzenesulfinyl group), a substituted or non-substituted amino group having 1 to 20 carbon atoms, preferably 1 to 12 carbon atoms and more preferably 1 to 8 carbon atoms (such as an amino group, a methylamino group, a dimethylamino group, a benzylamino group, an anilino group, a diphenylamino group, a 4-methylphenylamino group, a 4-ethylphenylamino group, a 3-n-propylphenylamino group, a 4-n-propylphenylamino group, a 3-n-butylphenylamino group, a 4-n-butylphenylamino group, a 3-n-pentylphenylamino group, a 4-n-pentylphenylamino group, a 3-trifluoromethylphenylamino group, a 4-trifluoromethylphenylamino group, a 2-pyridylamino group, a 3-pyridylamino group, a 2-thiazolylamino group, a 2-oxazolylamino group, a N,N-methylphenylamino group and a N,N-ethylphenylamino group), an ammonium group having 0 to 15 carbon atoms, preferably 3 to 10 carbon atoms and more preferably 3 to 6 carbon atoms (such as a trimethylammonium group and a triethylammonium group), a hydrazino group having 0 to 15 carbon atoms, preferably 1 to 10 carbon atoms and more preferably 1 to 6 carbon atoms (such as a trimethylhydrazino group), a ureido group having 1 to 15 carbon atoms, preferably 1 to 10 carbon atoms and more preferably 1 to 6 carbon atoms (such as a ureido group and a N,N-dimethylureido group), an imide group having 1 to 15 carbon atoms, preferably 1 to 10 carbon atoms and more preferably 1 to 6 carbon atoms (such as a succinimide group), an alkylthio group having 1 to 20 carbon atoms, preferably 1 to 12 carbon atoms and more preferably 1 to 8 carbon atoms (such as a methylthio group, an ethylthio group and a propylthio group), an arylthio group having 6 to 80 carbon atoms, preferably 6 to 40 carbon atoms and more preferably 6 to 30 carbon atoms (such as a phenylthio group, a p-methylphenylthio group, a p-chlorophenylthio group, a 2-pyridylthio group, a 1-naphthylthio group, a 2-naphtylthio group, a 4-propylcyclohexyl-4'-biphenylthio group, a 4-butylcyclohexyl-4'-biphenylthio group, a 4-pentylcyclohexyl-4'-biphenylthio group and a 4-propylphenyl-2-ethynyl-4'-biphenylthio group), a heteroarylthio group having 1 to 80 carbon atoms, preferably 1 to 40 carbon atoms and more preferably 1 to 30 carbon atoms (such as a 2-pyridylthio group, a 3-pyridylthio group, a 4-pyridylthio group, a 2-quinolylthio group, a 2-furylthio group and a 2-pyrrolylthio group), an alkoxycarbonyl group having 2 to 20 carbon atoms, preferably 2 to 12 carbon atoms and more preferably 2 to 8 carbon atoms (such as a methoxycarbonyl group, an ethoxycarbonyl group and a 2-benzylcarbonyl group), an aryloxycarbonyl group having 6 to 20 carbon atoms, preferably 6 to 12 carbon atoms and more preferably 6 to 10 carbon atoms (such as a phenoxycarbonyl group), a non-substituted alkyl group having 1 to 18 carbon atoms, preferably 1 to 10 carbon atoms and more preferably 1 to 5 carbon atoms (such as a methyl group, an ethyl group, a propyl group and a butyl group), a substituted alkyl group having 1 to 18 carbon atoms, preferably 1 to 10 carbon atoms and more preferably 1 to 5 carbon atoms (such as a hydroxymethyl group, a trifluoromethyl group, a benzyl group, a carboxyethyl group, an ethoxycarbonylmethyl group and an acetylaminomethyl group), wherein the substituted alkyl groups include an unsaturated hydrocarbon group having 2 to 18 carbon atoms, preferably 3 to 10 carbon atoms and more preferably 3 to 5 carbon atoms (such as a vinyl group, an ethynyl group, a 1-cyclohexenyl group, a benzylidyne group and a benzylidene group), a substituted or non-substituted aryl group having 6 to 20 carbon atoms, preferably 6 to 15 carbon atoms and more preferably 6 to 10 carbon atoms (such as a phenyl group, a naphthyl group, a p-carboxyphenyl group, a p-nitrophenyl group, a 3,5-dichlorophenyl group, a p-cyanophenyl group, a m-fluorophenyl group, a p-tolyl group, a 4-propylcyclohexyl-4'-biphenyl group, a 4-butylcyclohexyl-4'-biphenyl group, a 4-pentylcyclohexyl-4'-biphenyl group, and a 4-propylphenyl-2-ethynyl-4'-biphenyl group), and a substituted or non-substituted heteroaryl group having 1 to 20 carbon atoms, preferably 2 to 10 carbon atoms and more preferably 4 to 6 carbon atoms (such as a pyridyl group, a 5-methylpyridyl group, a thienyl group, a furyl group, a morpholino group, a tetrahydrofurfuryl group).

The substituents mentioned above may have a structure in which a benzene ring or a naphthalene group is condensed. Moreover, these substitutents may further have a substitutent such as those as mentioned above.

Among the substitutents described in Substituent Group V, preferable substituents for a divalent arylene group, a divalent heteroarylene group and a divalent alicyclic hydrocarbon group represented by $D^1$ to $D^4$ are an alkyl group, an alkoxy group, a halogen atom, a cyano group and a nitro group.

In Formula (1), $L^1$ to $L^3$ each independently represent a divalent linking group, preferably an alkanediyl group, an alkenylene group, an alkinylene group, an ether group and an ester group (—COO—, —OCO—), a carbonyl group, an azomethine group (—C=N—, —N=C—), an azo group, an azoxy group, and an alkyleneoxy group, and more preferably an ester group and an azomethine group.

In Formula (1), $T^1$ represents an alkyl group or an alkoxy group, preferably an alkyl group having 1 to 30 carbon atoms, more preferably 3 to 20 carbon atoms and further preferably 3 to 10 carbon atoms (such as an n-propyl group, an n-butyl group, an n-pentyl group, an n-hexyl group, and an n-nonyl group); and an alkoxy group having 1 to 30 carbon atoms, more preferably 1 to 20 carbon atoms, and further preferably 1 to 10 carbon atoms (such as a methoxy group, an ethoxy group, an n-propyloxy group, an n-butyloxy group, an n-pentyloxy group, an n-hexyloxy group, and an n-octyloxy group).

In Formula (1), the substituent represented by $T^1$ may further have a substituent, such as those described in Substitutent Group V.

In Formula (1), $T^2$ represents an alkyl group, a cyano group, a halogen atom, a nitro group, a perfluoroalkoxy group, or a perfluoroalkyl group, and preferably an alkyl group, a cyano group, or a halogen atom.

In Formula (1), the substituent represented by $T^2$ may further have a substituent, such as those described in Substitutent Group V.

In Formula (1), a, b and c each independently represent an integer of 0 to 3, preferably 0 or 1.

In the following, specific examples of the nematic liquid crystal compound that is applicable in the present invention will be shown. However, the present invention is not limited thereto.

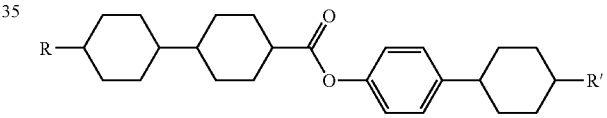

In the above exemplary compound, R and R' each independently represent a functional group that may be arbitrarily selected, and preferably represent $T^1$ and $T^2$, respectively.

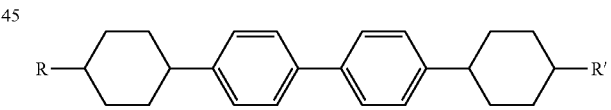

In the above exemplary compound, R and R' each independently represent a functional group that may be arbitrarily selected, and preferably represent $T^1$ and $T^2$, respectively.

Specific examples of the liquid crystal compound having four rings include NKV-3-159-3, NKV-3-162-3, NKV-3-162-4 and NKV-3-162-5 (trade name, manufactured by Kanto Chemical Co., Inc.)

In order to maintain a colored scattering state even when a perpendicularly oriented film is used, it is preferable to mix a four-ring liquid crystal compound with a cyano group-containing liquid (such as cyanobiphenyl) or the like.

In the liquid crystal composition of the present invention, the content of the dichroic dye (including the anthraquinone dye according to the present invention) with respect to a host liquid crystal is not particularly limited since the molecular weight and the absorption constant of the dye may differ depending on the type thereof, but preferably 1 to 15% by mass, more preferably 3 to 10% by mass, and particularly preferably 4 to 7% by mass, from the viewpoint of the viscosity of the liquid crystal composition.

(Additives)

The liquid crystal composition of the present invention may include an additive that does not exhibit liquid crystal characteristics for the purpose of changing the properties of the host liquid crystal (for example, the temperature range of the liquid crystal phase). Compounds such as a chiral agent, an UV absorbent, an antioxidant or the like may also be included.

The chiral agents that can be used in the present invention include chiral compounds for TN or STN, such as those described in pages 199 to 202 of the aforementioned Liquid Crystal Device Handbook.

When a chiral agent is added to the liquid crystal composition, a cholesteric liquid crystal phase is formed and the dichroic dye dissolved in the nematic liquid crystal is oriented in a helical manner. Accordingly, the amount of light to be absorbed in a colored state can be increased since both directions of polarized light that cross each other in a perpendicular manner can be absorbed. On the other hand, when a uniaxially oriented nematic liquid crystal phase is used, the amount of light to be absorbed in theory will be only half of the case of the cholesteric liquid crystal phase.

The amount of the chiral agent is preferably 0.1 to 30% by mass, more preferably 0.5 to 20% by mass, and further preferably 1 to 10% by mass. When the amount of the chiral agent is more than 30% by mass, selective reflection may occur in a visible range and thus deteriorate light modulating properties, or the chiral agent may separate out from the host liquid crystal.

The chiral agent may be used in combination of two or more kinds. In particular, it is preferable to use a chiral agent having a positive temperature dependency of chiral pitch and a chiral agent having a negative temperature dependency of chiral pitch in combination, in order to decrease the temperature dependency of chiral pitch.

In the following, specific examples of the chiral agent that can be used in the present invention will be shown.

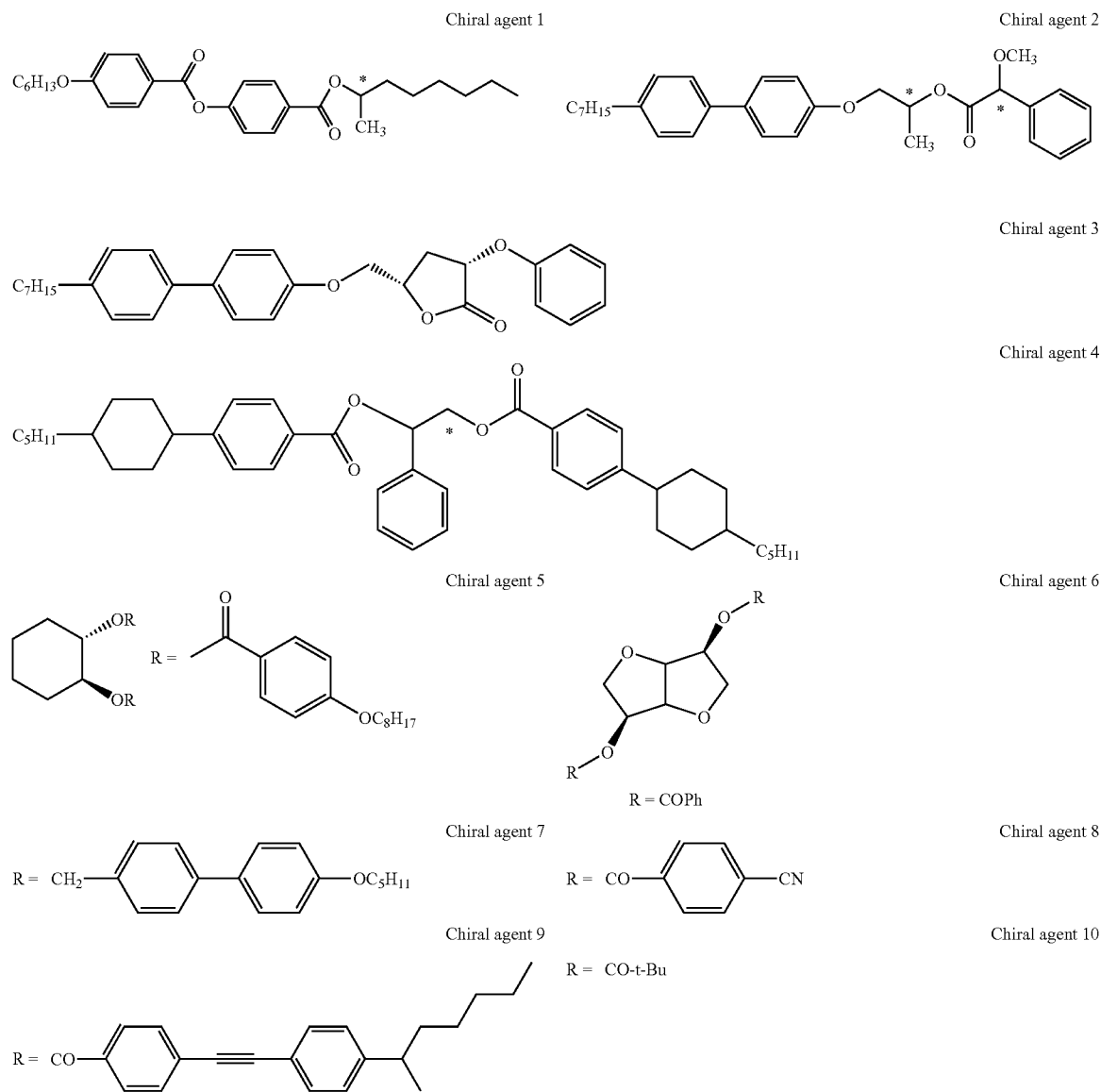

-continued

Chiral agent 11
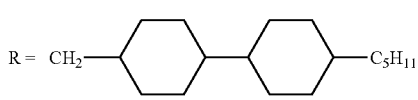

Chiral agent 12
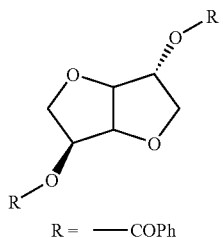
R = —COPh

Chiral agent 13
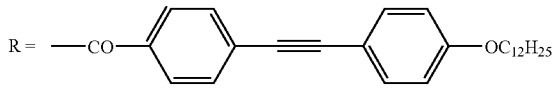

Chiral agent 14
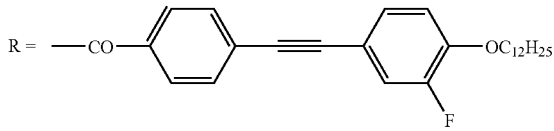

Chiral agent 15
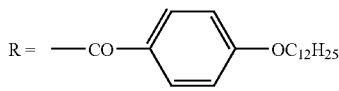

Chiral agent 16
R = —CO-t-Bu

Chiral agent 17
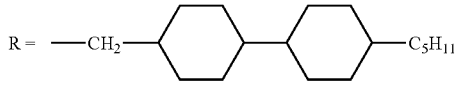

Chiral agent 18
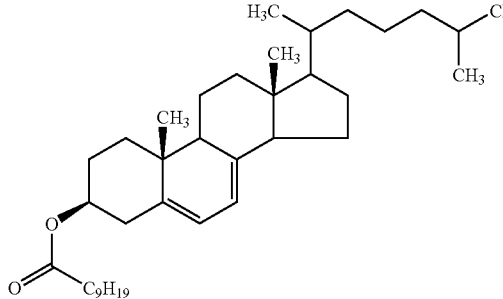

In the present invention, preferable chiral compounds among the above are chiral compound Nos. 1, 4 and 18. Alternatively, commercial products such as R-1011, S-1011, R-2011, S-2011, R-811, S-811 and CB-15 (manufactured by Merck Ltd.), CNL-611L, CNL-617L, CNL-659R (manufactured by Adeka Corporation) may also be used.

Further, in order to control a color phase, a dichroic dye that is different from the anthraquinone dye according to the present invention may be added. The content of the anthraquinone dye according to the present invention with respect to the total content of the dichroic dye in the liquid crystal composition is preferably 50% by mass to 100% by mass, and more preferably 65% by mass to 100% by mass.

The chromophore of the dichroic dye that may be used in combination is not particularly limited, and may be an azo dye, a perylene dye, a merocyanine dye, an azomethine dye, a phthaloperylene dye, an indigo dye, an azulene dye, a dioxyazine dye, a polythiophene dye, a phenoxazine dye, or the like. Among these, an azo dye and a phenoxazine dye are preferable.

<Liquid Crystal Device>

The liquid crystal device of the present invention includes a liquid crystal layer between a pair of electrodes in which at least one electrode is transparent, and the liquid crystal layer contains the liquid crystal composition as described above. In the liquid crystal device of the present invention, members or materials as described later may be used as appropriate, such as a white reflecting plate, an anti-reflection film, a brightness-improving film.

FIG. 1 shows an exemplary embodiment of the transmissive liquid crystal device. In the transmissive liquid crystal device of the present invention 20, supports 15, each having a transparent electrode 12 provided on a substrate 10, are positioned via a space formed by a spacer 16 or the like. The liquid crystal composition 18 is contained in the space. In FIG. 1, an oriented film 14 is provided on a surface of the transparent electrode 12 to be in contact with the liquid crystal composition 18. The oriented film 14 may be omitted, for example, when the liquid crystal composition 18 includes a dual frequency driven-type liquid crystal. The inlet from which the liquid crystal composition 18 is injected into the liquid crystal device 20 is preferably sealed with a sealant 22. Although not shown in the drawing, other members or materials as described later may be used as appropriate.

Figure 2:
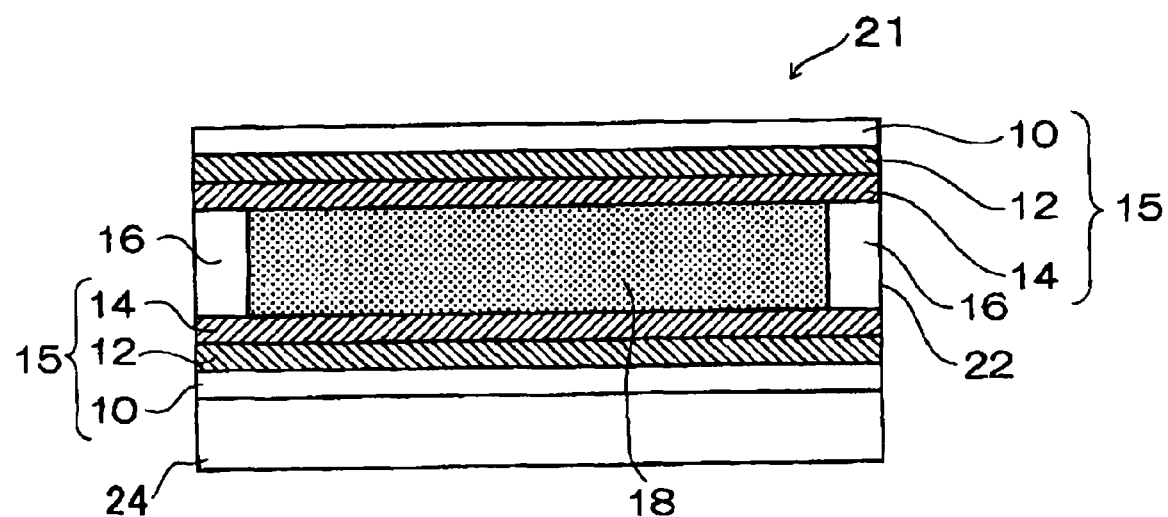
FIG. 2 is a schematic drawing showing an example of a reflective liquid crystal device according the present invention.

As shown in FIG. 2, the liquid crystal device may be formed into a reflective display device 21 by providing a reflection layer 24 on one of the supports 10. In the reflective display device 21 of the present invention, the reflection layer 24 is provided on one side of the substrate 10 opposite to the transparent electrode 12. The thickness of the reflection layer 24 is preferably from 10 to 200 µm, more preferably from 50 to 200 µm. In FIG. 2, an optional oriented film 14 is provided on a surface of a transparent electrode 12 to be in contact with the liquid crystal composition 18. The oriented film 14 may be omitted, for example, when the liquid crystal composition 18 includes a dual frequency driven-type liquid crystal.

The liquid crystal device of the present invention may be formed by sandwiching the liquid crystal composition of the present invention by a pair of electrode substrates. The electrode substrate that may be used in the liquid crystal device of the present invention is normally formed from glass or plastics, and a plastic substrate is preferable. Examples of the plastics usable for the substrate in the present invention include acrylic resins, polycarbonate resins and epoxy resins, more specifically triacetylcellulose (TAC), polyethyleneterephthalate (PET), polyethylenenaphthalate (PEN), syndiotactic polystyrene (SPS), polyphenylenesulfide (PPS), polycarbonate (PC), polyarylate (PAr), polysulfone (PSF), polyestersulfone (PES), polyetherimide (PEI), cyclic polyolefine, polyimide (PI), and the like. Among these, polyethyleneterephthalate (PET) is most preferable.

The thickness of the plastic substrate is not particularly limited, but preferably from 30 µm to 700 µm, more preferably from 40 µm to 200 µm, and further preferably from 50 µm to 150 µm. Moreover, in each case, the haze is preferably 3% or less, more preferably 2% or less, and further preferably 1% or less. The total light transmittance is preferably 70% or more, more preferably 80% or more, and further preferably 90% or more.

The plastic substrate may further contain a resin modifier such as a plasticizer, a dye or a pigment, an antistatic agent, a UV absorbing agent, an antioxidant, inorganic particles, an exfoliation promotor, a leveling agent, and a lubricant, as long as the effect of the present invention is not impaired.

The plastic substrate may be transparent or not transparent. In the case in which a substrate that is not transparent is used, a white substrate having light reflectivity may be used as the substrate, and examples thereof include plastic substrates to which inorganic pigment such as titanium oxide or zinc oxide is added. When the above-described substrate is used as a display surface, the substrate needs to have transparency at least for light in a visible range.

Details of the substrate are described, for example, on pages 218 to 231 of the aforementioned Liquid Crystal Device Handbook.

An electrode layer, preferably a transparent electrode layer, is formed on a surface of at least one of the substrates. Materials usable for the electrode layer include indium oxide, indium tin oxide (ITO), tin oxide, PEDOT-PSS, silver nanorods, carbon nanotubes, and the like. The transparent electrode may be, for example, those described on pages 232 to 239 of the aforementioned Liquid Crystal Device Handbook. The transparent electrode may be formed by a sputtering method, a sol-gel method, a printing method, or the like.

The liquid crystal device of the present invention preferably has a layer which has been subjected to an orientation treatment on a surface of the substrate to be in contact with the liquid crystal composition. Examples of the orientation treatment include a method of applying quaternary ammonium salt of the substrate, a method of applying polyimide and performing a rubbing treatment, a method of vapor-depositing SiOx in an oblique manner, and a method of causing photoisomerization by irradiating with light. Among these, a method using polyimide, a silane coupling agent, polyvinylalcohol, gelatin or the like is preferable, more preferably using polyimide or silane coupling agent, from the viewpoints of orientation properties, durability, insulation properties, and cost efficiency. The method may include a rubbing treatment or may not. The state of the orientation may be either horizontal or perpendicular. The oriented film may be, for example, those described on pages 240 to 256 of the aforementioned Liquid Crystal Device Handbook.

The liquid crystal device of the present invention may be formed by injecting the liquid crystal composition of the present invention into a space of from 1 to 50 µm in thickness formed between the pair of substrates by a spacer or the like.

The spacer may be, for example, those described on pages 257 to 262 of the aforementioned Liquid Crystal Device Handbook. The liquid crystal composition of the present invention may be placed in the space between the substrates by applying or printing the composition onto the substrate.

<Other Members>

The liquid crystal device of the present invention may further include other members such as a barrier film, a UV absorbing layer, an antireflection layer, a hard coat layer, an antifouling layer, an organic interlayer insulation film, a metal reflective plate, a retardation film, and an oriented film. These members may be used singly or in combination of two or more kinds.

The barrier film may be formed from any one of organic polymers, inorganic materials, organic-inorganic composites, and the like. Organic polymer materials include ethylene-vinyl alcohol (EVOH), polyvinyl alcohol (PVA/PVOH), nylon MXD6 (N-MXD), and nano-composite nylon. Inorganic materials include silica, alumina and binary materials. Details of these materials are described in, for example, "Development of High-Barrier Materials, Film Formation Technology, and Method of Measurement and Evaluation of Barrier Properties", Technical Information Institute Co., Ltd., (2004).

In the light modulating material of the present invention, the barrier layer is preferably provided on a surface of the substrate opposite to the side on which the transparent electrode is formed, from the viewpoint of facilitating production of the light modulating material.

The UV absorbing layer preferably contains an antioxidant such as 2,2-thiobis(4-methyl-6-t-butylphenol) and 2,6-di-t-butylphenol, and a UV absorbing agent such as 2-(3-t-butyl-5-methyl-2-hydroxyphenyl)-5-chlorobenzotriazole and alkoxybenzophenone.

In the light modulating material of the present invention, the UV absorbing layer is preferably formed on a surface of the substrate opposite to the side on which the transparent electrode is formed, from the viewpoint of facilitating production of the light modulating material.

The antireflection film may be formed from either an inorganic material or an organic material, and may have a single-layer structure or a multilayer structure. Further, the antireflection film may be comprised of a film made from an inorganic material and a film made from organic material. The antireflection layer may be formed on one surface or on both surfaces of the light modulating material. When the antireflection films are formed on both sides of the light modulating material, the composition of the films may be the same or different from each other. For example, it is possible that while the antireflection film on one side has a multilayer structure, the antireflection film on the other side has a single-layer structure for simplification. The antireflection film may also be formed directly on the transparent electrode or the support.

The inorganic material for the antireflection film include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$ and $WO_3$, which may be used singly or in combination of two or more kinds. When the substrate is made of plastic, materials that can be vacuum-deposited at low temperature such as $SiO_2$, $ZrO_2$, $TiO_2$ and $Ta_2O_5$ are preferable.

The multilayer film formed from inorganic materials may have, for example, a structure in which a layer of a material having a high refractive index and a layer of a material having a low refractive index are alternately laminated, wherein from the substrate side, the total optical thickness of a $ZrO_2$ layer and a $SiO_2$ layer is $\lambda/4$, the optical thickness of the $ZrO_2$ layer is $\lambda/4$, and the optical thickness of the outermost SiO$_2$ layer is $\lambda/4$. Here, $\lambda$ refers to a design wavelength and is normally 520 nm. The outermost layer is preferably formed from SiO$_2$, having a low refractive index and an ability of imparting mechanical strength to the antireflection film. Methods of forming an antireflection layer from an inorganic material include vacuum deposition, ion plating, sputtering, CVD, and precipitating the material in a saturated solution by a chemical reaction.

Organic materials that can be used for the antireflection film include FFP (tetrafluoroethylene-hexafluoropropylene copolymer), PTFE (polytetrafluoroethylene), ETFE (ethylene-tetrafluoroethylene copolymer), which may be selected in view of the refractive index of the material for the lens or an optional hard coat film. Method of forming the antireflection film from an organic material include those compatible with mass-production, such as spin coating and dip coating, in addition to vacuum deposition and the like.

The hard coat layer may be formed from known acrylic or epoxy materials that are curable by UV rays or electron beams.

The antifouling film may be formed from known materials having an ability of repelling water or oil, such as fluorine-containing organic polymers.

Resins for forming the reflective layer 24 include known resins such as acrylic resins, methacrylic resins such as polymethylmethacrylate, polystyrene, polyester, polyethylene, polypropylene, polycarbonate, polyacrylonitrile, polyethyleneoxide, polyvinylpyrolidone, polysulfone, polydimethylsiloxane, polyvinylalcohol, gelatin, cellulose, and copolymers or mixtures thereof. In view of transparency of the resin or dispersibility of titanium dioxide, it is preferable to use a mixture of an acrylic resin or a methacrylic resin such as polymethylmethacrylate, and polyvinylpyrolidone or cyanoethylated cellulose (manufactured by Shin-Etsu Chemical Co., Ltd.).

The reflection layer 24 is preferably formed by dispersing a white pigment in the above-mentioned resin by mixing. Examples of the white pigments include inorganic pigments such as silicon dioxide, titanium dioxide, barium sulfate, barium titanate, lithopone, aluminum oxide, calcium carbonate, silicon oxide, antimony trioxide, titanium phosphate, zinc oxide, white lead and zirconium oxide, and organic fine particles of styrene, styrene-divinylbenzene copolymer, and the like.

Among these pigments, titanium dioxide, aluminum oxide and barium titanate are preferable, and titanium dioxide is particularly preferable. Titanium dioxide may be either rutile-type or anatase-type, but the rutile-type titanium dioxide is preferable in view of whiteness, and the anatase-type titanium dioxide is preferable in view of concealing properties. Taking both of whiteness and sharpness into consideration, the rutile-type titanium dioxide and the anatase-type titanium dioxide may be used in combination. These titanium dioxides may be produced by a sulfate method or a chloride method.

Specific examples of the commercially available titanium dioxide include JR, JRNC, JR-301, 403, 405, 600A, 605, 600E, 603, 701, 800, 805, 806, JA-1, C, 3, 4, 5, MT-01, 02, 03, 04, 05, 100AQ, 100SA, 100SAK, 100SAS, 100TV, 100Z, 100ZR, 150W, 500B, 500H, 500SA, 500SAK, 500SAS, 500T, SMT-100SAM, 100SAS, 500SAM, 500SAS (manufactured by TAYCA Corporation), CR-50, 50-2, 57, 58, 58-2, 60, 60-2, 63, 67, 80, 85, 90, 90-2, 93, 95, 97, 953, SUPER 70, PC-3, PF-690, 691, 711, 736, 737, 739, 740, 742, R-550, 580, 630, 670, 680, 780, 780-2, 820, 830, 850, 855, 930, 980, S-305, UT771, TTO-51(A), 51(C), 55(A), 55(B), 55(C), 55(D), S-1, S-2, S-3, S-4, V-3, V-4, MPT-136, FTL-100, 110, 200, 300 (manufactured by Ishihara Sangyo Kaisha Ltd.), KA-10, 15, 20, 30, KR-310, 380, KV-200, STT-30EHJ, 65C-S, 455, 485SA15, 495M, 495MC (manufactured by Titan Kogyo K.K.), TA-100, 200, 300, 400, 500, TR-600, 700, 750, 840, 900 (manufactured by Fuji Titanium Industry Co., Ltd.). These materials may be used singly or in combination.

Further, in order to improve dispersibility of the titanium dioxide in a resin, the titanium dioxide may be treated with known materials such as a silane coupling agent having a functional group such as an amino group, a glicydil group, a ureido group, an isocyanate group, a mercapto group, a vinyl group, an allyl group, an acryloxy group, a methacryloxy group, or a styryl group.

The mixing ratio of the resin and the white pigment (resin/white pigment) is preferably from 90/10 to 30/70 by mass, more preferably from 80/20 to 40/60 by mass, and further preferably from 70/30 to 40/60 by mass.

Further, the reflection layer 24 preferably contains a fluorescent brightener such as benzoxazole-based, coumalin-based, pyrazoline-based, and styrenebiphenyl derivatives, more preferably benzoxazolylnaphthalene-based, benzoxazolylstilbene-based, and benzoxazolylthiophene-based fluorescent brighteners.

The content of the fluorescent brightner in the reflection layer 24 is from 0.1 to 10% by mass, preferably from 0.1 to 5% by mass, and more preferably from 0.1 to 3.0% by mass.

The reflection layer 24 may be formed by applying a resin solution in which a white pigment and a fluorescent brightner are dispersed by mixing. The application methods include known methods employing a blade coater, an air doctor coater, a lot coater, a knife coater, a squeeze coater, an impregnation coater, a reverse roll coater, a transfer roll coater, a gravure coater, a kiss roll coater, a cast coater, a spray coater, a curtain coater, and an extrusion coater. Details of the application methods are described, for example, in "Coating Technology", Yuji Harasaki, (1978).

Solvents that can be used for the resin solution include water, methanol, ethanol, isopropylalcohol, acetone, methylethylketone, tetrahydrofuran, ethyl acetate, butyl acetate, hexane, toluene, acetonitrile, γ-butyl lactone, N-methylpyrolidone, N-dimethylacetoamide, and dimethylsulfoxide. Among these, butyl acetate, N-methylpyrolidone and N-dimethylacetoamide are preferable from the viewpoints of low volatility and high solubility in a resin.

Dispersion of the resin solution may be performed using a vibration mill, a roll mill, a ball mill, a bead mill, a paint shaker, a homogenizer or the like. Among these, a roll mill, a ball mill and a bead mill are preferable from the viewpoint of an ability of dispersing the pigment to a high degree.

After applying the resin solution on to the substrate 10 according to the aforementioned method, heating and drying are performed for removing the solvent. The temperature and time of the heating may be determined as appropriate according to the type or amount of the solvent.

The resin solution may be applied directly onto the substrate 10, or onto a film (such as a PET film or the like) to be attached to the substrate 10.

Alternatively, the reflection layer may be formed by preparing a colored resin composition by mixing a thermoplastic resin, white pigment and a fluorescent brightner by a roll mill or a kneader (extruder), and heating the mixture to a glass transition temperature of the resin or higher, and then applying the mixture by a melt-casting method. In this melt-casting method, the reflection layer may be formed on a base film. The method of forming the reflection layer of the present invention is not limited to the above method.

Further, the reflection layer of the present invention may be formed from synthetic paper such as ULTRA YUPO, SUPER YUPO, NEW YUPO, ALPHA YUPO (manufactured by Yupo Corporation).

Moreover, a metal film, a film to which a metal foil is laminated, or a film to which metal is deposited may be attached to a lower side of the reflection layer containing a white pigment, in order to enhance the reflectivity. Examples of the metals that may be used for the reflection layer include aluminum, silver, silver alloys, platinum, chromium, and stainless steel, either in a single layer or a laminate of two ore more layers. In view of achieving a high degree of reflectivity, aluminum, silver and silver alloys are preferably used.

The visible reflectivity (Y value) of the reflection layer 24 is preferably from 60% to 100%, more preferably from 70% to 100%, and further preferably from 80% to 90%, from the viewpoint of improving reflectivity of the display apparatus. The visible reflectivity (Y value) refers to a reflectivity with respect to a standard white plate (100%), as measured by an integrating sphere measurement including no specular reflexion, using a spectrophotometric analyser.

The reflection layer 24 preferably has a whiteness as measured by ASTM E 313 of from 60 to 120, more preferably from 80 to 120, and further preferably from 90 to 120.

The visible reflectivity (Y value) of the reflective display apparatus is preferably from 10% to 100%, more preferably from 20% to 100% and further preferably from 40% to 100%, from the viewpoint of improving contrast of the display apparatus.

The whiteness of the reflective display apparatus is preferably from 10 to 120, more preferably from 20 to 120, and further preferably from 30 to 120.

The liquid crystal device of the present invention may be driven by a simple matrix driving method or an active matrix driving method using a thin film transistor (TFT). The driving method may be, for example, those described on pages 387 to 460 of the aforementioned Liquid Crystal Device Handbook.

The liquid crystal device utilizing the liquid crystal of the present invention may be driven by any known methods, and examples thereof include guest-host methods described on page 309 of the aforementioned Liquid Crystal Device Handbook, such as (1) homogeneous alignment, (2) homeotropic alignment, White-Taylor (phase transition) methods such as (3) focal conic alignment and (4) homeotropic alignment, (5) combination with Super Twisted Nematics (STN), (6) combination with ferroelectric liquid crystal (FLC); and those described on pages 15, Chapter 2-1 (GH mode reflective color LCD) of "General Techniques of Reflective Color LCD", edited by Tatsuo Uchida, published by CMC (1999), such as (1) Heilmerier GH mode, (2) ¼ wavelength plate GH mode, (3) bilayer GH mode, (4) phase transition GH mode, and (5) polymer dispersed liquid crystal (PDLC) GH mode.

The liquid crystal device of the present invention may also be used in multilayer GH mode methods described in JP-A Nos. 10-67990, 10-239702, 10-133223, 10-339881, 11-52411, 11-64880 and 2000-221538; and GH mode methods using microcapsules described in JP-A No. 11-24090.

Further, the liquid crystal device of the present invention may be used in reflective liquid crystal displays described in JP-A Nos. 6-235931, 6-235940, 6-265859, 7-56174, 9-146124, 9-197388, 10-20346, 10-31207, 10-31216, 10-31231, 10-31232, 10-31233, 10-31234, 10-82986, 10-90674, 10-111513, 10-111523, 10-123509, 10-123510, 10-206851, 10-253993, 10-268300, 11-149252, and 2000-2874.

Moreover, the liquid crystal device of the present invention may be used in polymer dispersed liquid crystal GH mode methods described in JP-A Nos. 5-61025, 5-265053, 6-3691, 6-23061, 5-203940, 6-242423, 6-289376, 8-278490, and 9-813174.

The liquid crystal composition of the present invention may also be suitably used in optical devices including: functional films such as a circularly-polarized emission film, an optical film, a retardation film, a ferroelectric film, an antiferroelectric film, and a piezoelectric film; and functional devices such as a (circularly) polarized emission device, a laser oscillation device that is excited by light or an electric field (based on a primary photonic liquid crystal effect), a backlight for LCD, a nonlinear optical device, an electric optical device, a pyroelectric device, a piezoelectric device, and a light modulation device.

The optical device according to the present invention may be produced by: (1) applying the liquid crystal compound (or composition) of the present invention onto a substrate or a pair of substrates (such as a cell) and then crosslinking; or (2) by injecting the compound (or composition) in a direct manner.

<Application>

The liquid crystal device of the present invention, having an ability of maintaining a colored and scattered state without applying a voltage, may exhibit such advantages that (1) the amount of power consumption can be reduced and is thus environment friendly; and (2) deterioration of the liquid crystal device can be suppressed to obtain a longer operating life. Accordingly, the amount of consumption of a battery can be reduced, thereby enabling applications in digital cameras, watches, main or sub displays for mobile devices such as music players, and the like.

Moreover, the liquid crystal device of the present invention, having excellent light modulating properties, may also be suitably used in such application as light modulating devices, security, car accessories, interior accessories, advertisement, information display, and the like.

Methods of driving the liquid crystal device may be known methods such as (1) segment driving utilizing seven-segments or dot matrix, (2) passive matrix driving utilizing a striped electrode, and (3) active matrix driving utilizing a TFT element or a TFD element. Methods of displaying gradation may be known modulation methods such as a pulse width modulation method and a frame rate control method, and an overdriving method may be optionally combined with these methods.

The liquid crystal device of the present invention may be utilized in a main display or a sub display of electronic tags, electronic music instruments, watches, electronic books, electronic dictionaries, and the like.

The following are preferable embodiment of the present invention. However, the present invention will not be limited by these embodiments.

1. A liquid crystal composition comprising a liquid crystal and at least three anthraquinone dyes, at least two of the anthraquinone dyes having a substituent represented by the following Formula (I):

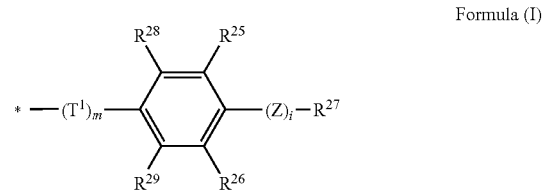

Formula (I)

wherein in Formula (I), * represents a linking position; $R^{25}$ and $R^{26}$ each independently represent an alkyl group, a halogen atom or an alkoxy group; $R^{27}$ represents an alkyl group, an acyl group or an alkoxy group; $R^{28}$ and $R^{29}$ each independently represent a hydrogen atom or a substitutent; $T^1$ represents an arylene group or a heteroarylene group; Z represents an oxygen atom, a sulfur atom or a carbonyl group; m represents an integer of 0 to 2; and i represents 0 or 1, wherein when i is 1 and Z is an oxygen atom or a sulfur atom, $R^{27}$ is not an alkoxy group, and when i is 1 and Z is a carbonyl group, $R^{27}$ is not an acyl group.

2. The liquid crystal composition according to <1>, comprising at least four anthraquinone dyes including at least one anthraquinone dye selected from each of the following dye groups A to D, respectively, wherein at least two of the at least four anthraquinone dyes have a substituent represented by Formula (I):

Dye Group A

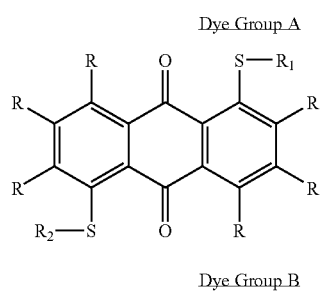

Formula (II)

Dye Group B

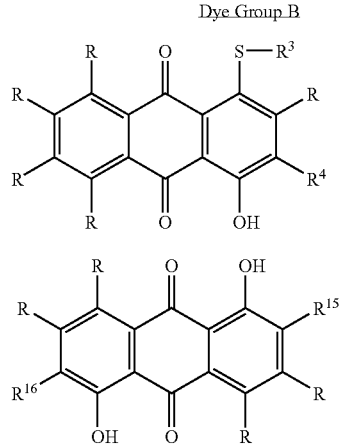

Formula (III)

Formula (IV)

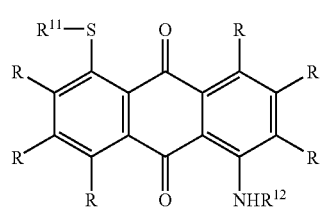

Formula (V)

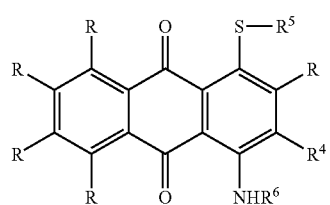

Formula (VI)

Dye Group C

Dye Group D

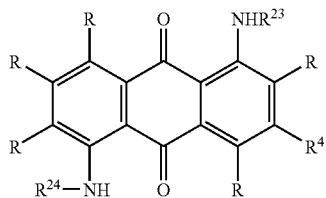

Formula (VII)

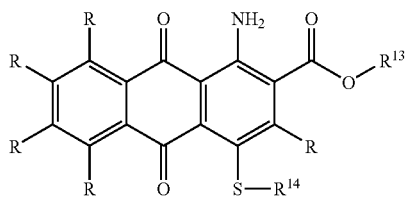

Formula (VIII)

Formula (IX)

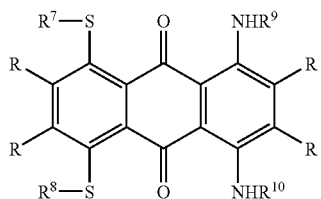

Formula (X)

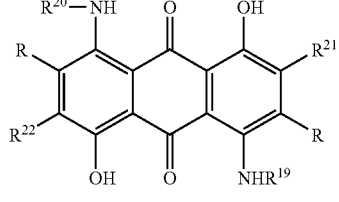

Formula (XI)

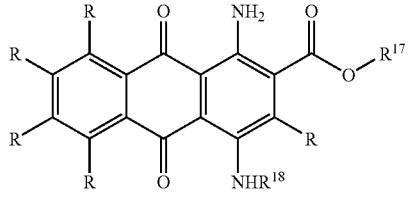

wherein in Formulae (II) to (XI), $R^1$ to $R^3$, $R^5$ to $R^{12}$, $R^{14}$ to $R^{16}$, $R^{19}$, $R^{23}$ and $R^{24}$ each independently represent an aryl group or a heteroaryl group; $R^{18}$ and $R^{20}$ each independently represent a hydrogen atom, an alkyl group, an aryl group or a heteroaryl group; $R^{13}$ and $R^{17}$ each independently represent an alkyl group or an aryl group; $R^4$, $R^{21}$ and $R^{22}$ each independently represent a hydrogen atom, an alkyl group, an alkoxy group, an aryl group, an aryloxy group or a heteroaryl group; and each R independently represent a hydrogen atom or a substituent, and wherein the aryl group or the heteroaryl group represented by $R^1$ to $R^2$, $R^{14}$ to $R^{16}$ and $R^{18}$ to $R^{24}$, and the aryl group represented by $R^{13}$ and $R^{17}$ may further have a substitutent which may be the substituent represented by Formula (I) or a mesogenic group.

3. The liquid crystal composition according to <2>, wherein the anthraquinone dyes comprise at least one anthraquinone dye represented by Formula (II); at least one anthraquinone dye represented by Formula (III), (IV) or (V); at least one anthraquinone dye represented by Formula (VI) or (VII); and at least one anthraquinone dye represented by Formula (IX).

4. The liquid crystal composition according to <2>, wherein the anthraquinone dyes comprise anthraquinone dyes represented by Formulae (II), (III), (VI) and (IX).
5. The liquid crystal composition according to <2>, wherein the anthraquinone dyes comprise anthraquinone dyes represented by Formulae (II), (IV), (VI) and (IX).
6. The liquid crystal composition according to <2>, wherein the anthraquinone dyes comprise anthraquinone dyes represented by Formulae (II), (V), (VI) and (IX).
7. The liquid crystal composition according to <1>, comprising at least three anthraquinone dyes having a substitutent represented by Formula (I).
8. The liquid crystal composition according to <1>, comprising at least four anthraquinone dyes having a substitutent represented by Formula (I).
9. The liquid crystal composition according to <1>, wherein the liquid crystal composition can exhibit a black color.
10. A liquid crystal device comprising a pair of electrodes, at least one of the electrodes being transparent, and a liquid crystal layer containing the liquid crystal composition according to <1>, the liquid crystal layer being positioned between the pair of electrodes.
11. The liquid crystal device according to <10>, wherein the liquid crystal layer is a polymeric medium layer in which the liquid crystal composition is dispersed in a polymeric medium.
12. The liquid crystal device according to <11>, wherein the polymeric medium comprises gelatin or polyvinyl alcohol.
13. The liquid crystal device according to <10>, wherein the liquid crystal layer contains the liquid crystal composition in microcapsules.
14. A reflective display material including the liquid crystal device according to <10>.
15. A light modulating material including the liquid crystal device according to <10>.

EXAMPLES

Hereinafter, the present invention will be further explained with reference to the Examples, but the present invention will not be limited thereto.

Example 1

The anthraquinone dyes according to the present invention (A-1, A-3, B-1, B-2, B-12, B-19, C-2, C-3, C-9, C-10, C-11, D-1 and D-2) were synthesized in accordance with a known method described in, for example, Alexander V. Ivashchenko, Dichroic Dyes for Liquid Crystal Displays (CRC Press)). The structure of the anthraquinone dyes was determined based on $H^1$-NMR and MASS.

Example 2

(Preparation of Anthraquinone Dye Composition)
At least one kind of anthraquinone dye were selected from each of the Dye Group A to D (i.e., at least four kinds in total) and mixed, then dissolved in chloroform. The solvent was distilled away under reduced pressure, and the anthraquinone dye compositions 1 to 6 shown in Table 1 were prepared.

TABLE 1

| Anthraquinone Dye Composition | Composition Ratio |
| --- | --- |
| 1 | A-1: 21% by mass |
| | B-1: 20% by mass |

TABLE 1-continued

| Anthraquinone Dye Composition | Composition Ratio |
| --- | --- |
| | C-2: 25% by mass |
| | D-1: 34% by mass |
| 2 | A-1: 10% by mass |
| | B-12: 16% by mass |
| | C-2: 37% by mass |
| | D-1: 37% by mass |
| 3 | A-3: 20% by mass |
| | B-2: 21% by mass |
| | C-3: 24% by mass |
| | D-1: 35% by mass |
| 4 | A-3: 27% by mass |
| | B-2: 9% by mass |
| | C-10: 22% by mass |
| | D-1: 42% by mass |
| 5 | A-1: 21.6% by mass |
| | B-12: 3.7% by mass |
| | B-4: 9.6% by mass |
| | C-11: 19.7% by mass |
| | D-2: 45.4% by mass |
| 6 | A-3: 16% by mass |
| | B-19: 33% by mass |
| | C-3: 16% by mass |
| | D-1: 35% by mass |

Example 3

(Preparation of Liquid Crystal Composition)
In 100 mg of a host liquid crystal ZLI-2806 (manufactured by E. Merck) was dissolved 3 mg of each of the above anthraquinone dye compositions 1 to 3, respectively, or 3 mg of the comparative dye composition 1 composed of the dyes having the following structures, and liquid crystal compositions were prepared.

The obtained liquid crystal compositions were injected to a liquid crystal cell (manufactured by E.H.C.) to produce an evaluation cell. The cell manufactured by E.H.C. was a liquid crystal cell with a cell gap of 25 μm, formed by providing a polyimide film (horizontally oriented by a rubbing treatment) onto a 0.7 mm-thick glass plate with an ITO transparent electrode, and having an epoxy resin seal.

(Measurement of Order Parameter)
The liquid crystal cell was irradiated with polarized light parallel to a rubbing direction and polarized light perpendicular to the rubbing direction, respectively, and an absorption spectrum in each case (A∥ and A⊥) were measured using an ultraviolet visible spectrophotometer (UV2400PC). The order parameters were calculated according to the following Expression 1 from the values of A∥ and A⊥ at the maximum absorption wavelength. The results are shown in Table 2.

Expression 1
$$1: S = (A\| - A\bot) / (A\| + 2 \cdot A\bot)$$

Comparative Dye Composition 1
Dyes described in JP-A No. 2000-336366

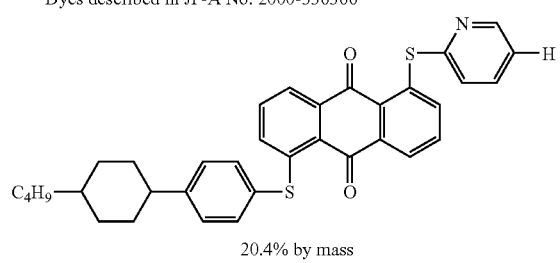

20.4% by mass

-continued

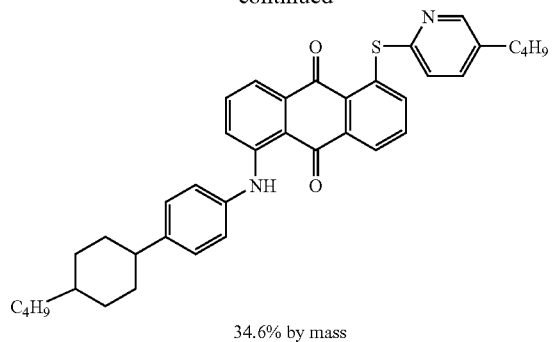

34.6% by mass 9.2% by mass 35.7% by mass

TABLE 2

| Dye | Order Parameter | | | | Notes |
|---|---|---|---|---|---|
| | 500 nm | 550 nm | 600 nm | 650 nm | |
| Anthraquinone Dye Composition 1 | 0.77 | 0.78 | 0.77 | 0.79 | The invention |
| Anthraquinone Dye Composition 2 | 0.77 | 0.78 | 0.77 | 0.79 | The invention |
| Anthraquinone Dye Composition 3 | 0.77 | 0.79 | 0.78 | 0.79 | The invention |
| Comparative Dye Composition 1 | 0.77 | 0.77 | 0.75 | 0.75 | Comparative Example |

As is clear from the result of Table 2, the anthraquinone dye composition 1 to 3 exhibit a high degree of order parameter.

The order parameter given by the above Expression 1 represents a ratio of $(A\|+2\cdot A\bot)$ to $(A\|-A\bot)$. Accordingly, even if the order parameters are 0.77 and 0.79 with a difference of only 0.02, the dichroic ratios $(A\|/A\bot)$ are 11.0 and 12.3, respectively. Accordingly, the dichroic ratio is increased by an amount of more than 10%, and such a difference may be considered to be significant.

Example 4

(Comparative Experiment with Single Color Dye)

In 100 mg of a host liquid crystal MLC-7700-000 or MLC-12000-000 (manufactured by E. Merck) was dissolved 1 mg of the above anthraquinone dye composition 3 to prepare a liquid crystal composition. Further, 1 mg of the dyes A-3, B-2, C-3 and D-1 were dissolved in the above host liquid crystal, respectively, thereby preparing liquid crystal compositions for Comparative Examples.

Moreover, in 100 mg of a host liquid crystal ZLI-2806 (manufactured by E. Merck) was dissolved 1 mg of the dye 1 having the following structure, 1 mg of a mixture of the dye 1 and dye 2 at a mass ratio of 6:1, and 1 mg of dye 2 having the following structure, respectively, thereby preparing liquid crystal compositions for Comparative Examples.

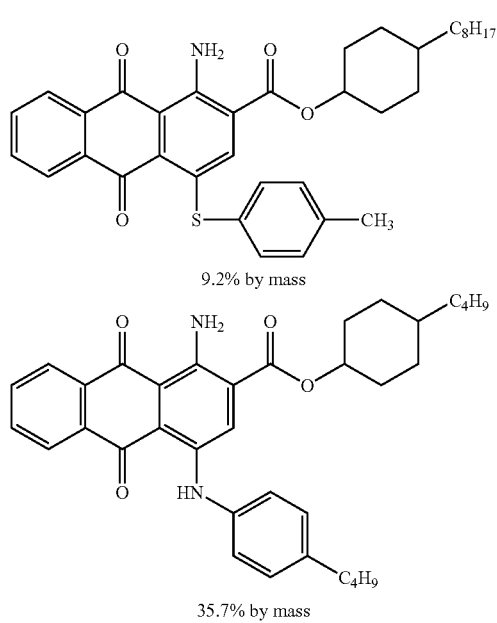

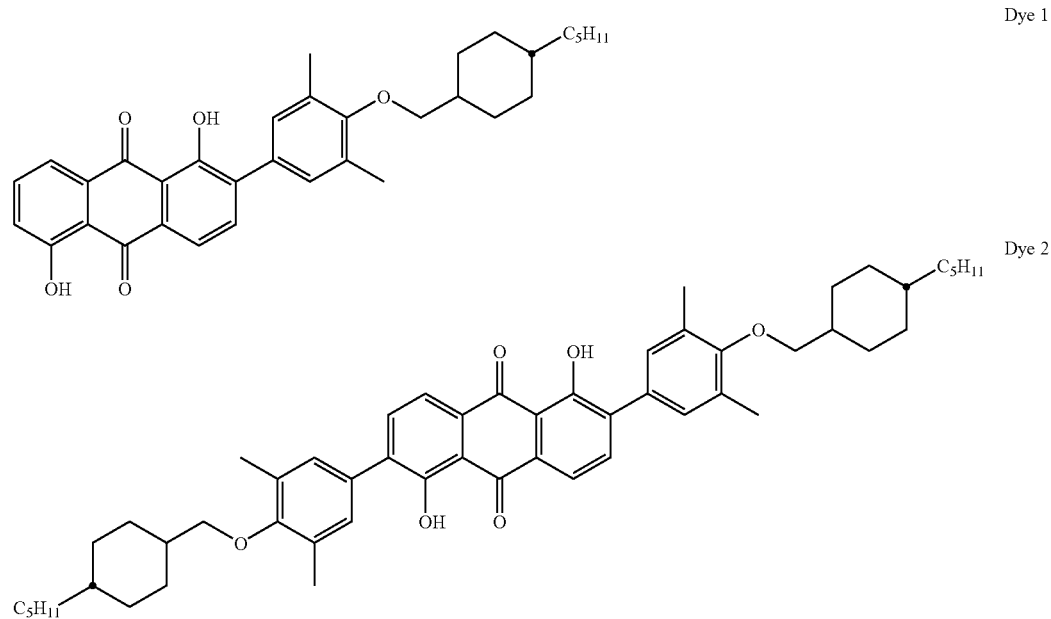

The order parameter of the above compositions was measured in a similar manner to Example 3, and the results are shown in Tables 3 and 4. Since the comparative liquid crystal compositions include only a single kind of dye, measurement was conducted at a maximum absorption wavelength thereof. In FIGS. 3 and 4, columns that do not correspond to the maximum absorption wavelength of each example are indicated by "-".

above-described comparative dye composition 1, thereby preparing liquid crystal compositions.

One week after the preparation of the liquid crystal compositions, a liquid crystal cell was formed in a similar manner to Example 4 using the obtained liquid crystal compositions. The cell was irradiated with polarized light parallel to a rubbing direction and polarized light perpendicular to a rubbing direction, respectively, and an absorption spectrum in each

TABLE 3

| Dye | 470 nm | 542 nm | 587 nm | 687 nm | Host Liquid Crystal | Notes |
|---|---|---|---|---|---|---|
| Anthraquinone Dye Composition 3 | 0.77 | 0.78 | 0.77 | 0.80 | MLC-7700-000 | The invention |
| A-3 alone | 0.79 | — | — | — | MLC-7700-000 | Comparative Example |
| B-2 alone | — | 0.77 | — | — | MLC-7700-000 | Comparative Example |
| C-3 alone | — | — | 0.75 | — | MLC-7700-000 | Comparative Example |
| D-1 alone | — | — | — | 0.79 | MLC-7700-000 | Comparative Example |
| Anthraquinone Dye Composition 3 | 0.77 | 0.79 | 0.78 | 0.80 | MLC-12000-000 | The invention |
| A-3 alone | 0.79 | — | — | — | MLC-12000-000 | Comparative Example |
| B-2 alone | — | 0.78 | — | — | MLC-12000-000 | Comparative Example |
| C-3 alone | — | — | 0.76 | — | MLC-12000-000 | Comparative Example |
| D-1 alone | — | — | — | 0.79 | MLC-12000-000 | Comparative Example |

TABLE 4

| Dye | 461 nm | 487 nm | Host Liquid Crystal | Notes |
|---|---|---|---|---|
| Mixture of Dyes 1 and 2 | 0.74 | 0.76 | ZLI-2806 | Comparative Example |
| Dye 1 | 0.74 | — | ZLI-2806 | Comparative Example |
| Dye 2 | — | 0.80 | ZLI-2806 | Comparative Example |

As is clear from Tables 3 and 4, the anthraquinone dye composition of the present invention, in which three or more kinds of anthraquinone dyes are used in combination, exhibited such an unexpected results as improvement in the order parameter, as compared with the cases in which only a single kind of dye was used. In the above results, decrease in the order parameter at a wavelength of 470 nm was due to an effect of sub-absorption of dye D-1 exhibiting a negative order parameter.

Further, when the anthraquinone dyes 1 and 2 are used in combination (Comparative Example which is similar to Example 1 described in JP-A No. 58-187454), the order parameter was not improved. Accordingly, it was found that using at least three kinds of dyes in combination was necessary in order to attain the effect of the present invention.

Example 5

(Evaluation of Solubility)

In 100 mg of a host liquid crystal ZLI-2806 (manufactured by E. Merck) was dissolved 10 mg of the anthraquinone dyes 1 to 3 of the present invention, respectively, or 10 mg of the case (A∥ and A⊥) was measured using a ultraviolet visible spectrophotometer (UV 2400 PC, manufactured by Shimadzu Corporation). As an index of solubility, concentration of the dye dissolving in the host liquid crystal was calculated from A∥ and A⊥ at a maximum absorption wavelength at which the dye was completely dissolved.

The concentration of the dye was measured using a liquid crystal composition in which 1 mg of the dye was completely dissolved. If the dye was not completely dissolved, the amount of the dye was reduced until the dye was completely dissolved in the sample, and then the measurement was conducted. The results are shown in Table 5.

TABLE 5

| Dye | Solubility | Notes |
|---|---|---|
| Anthraquinone Dye Composition 1 | 10 wt % or more | The invention |
| Anthraquinone Dye Composition 2 | 10 wt % or more | The invention |
| Anthraquinone Dye Composition 3 | 10 wt % or more | The invention |
| Comparative Dye Composition 1 | 6.5 wt % | Comparative Example |

As is clear from Table 5, solubility of anthraquinone dye compositions 1 to 3, having a substituent represented by formula (I), is remarkably high as compared with the case of comparative dye composition 1, having no substituent represented by formula (I).

Example 6

(Preparation of Black Liquid Crystal Composition and Liquid Crystal Device)

In 93.05 mg of a host liquid crystal MLC-12000-000 (manufactured by E. Merck) were dissolved 6.6 mg of the anthraquinone dye compositions 1 to 4, respectively, and 0.35 mg of a chiral agent R-1011 (manufactured by E. Merck), thereby preparing liquid crystal compositions 1 to 4.

For Comparative Examples, similar liquid crystal compositions 5 and 6 were prepared using black dyes S-435 and S-441, manufactured by Mitsui Chemicals, Inc., respectively.

The obtained liquid crystal compositions are injected into a liquid crystal cell (manufactured by Nippo Electric Co., Lrd.) having an oriented film SE-130 (manufactured by Nissan Chemical Industries, Ltd.), with a cell gap of 15 μm and an epoxy resin seal, thereby preparing evaluation cells 1 to 6.

(Evaluation of Light Fastness)

The obtained liquid crystal devices are placed in a merry-go-round xenon discoloration tester (manufactured by Eagle Engineering), and aging was conducted using a UV filter L-37 (manufactured by Kenko). The absorbance of the samples after conducting aging for 500 hours was measured by a spectrophotometer, UV-2400 (manufactured by Shimadzu Corporation), and the residual ratio was calculated by comparing with the sample before the aging. The results are shown in Table 6.

TABLE 6

| Evaluation Cell | Dye | 470 nm | 540 nm | 585 nm | 630 nm | Notes |
|---|---|---|---|---|---|---|
| 1 | Anthraquinone Dye Composition 1 | 100% | 99.6% | 100% | 99.8% | The invention |
| 2 | Anthraquinone Dye Composition 2 | 100% | 99.3% | 100% | 99.7% | The invention |
| 3 | Anthraquinone Dye Composition 3 | 100% | 99.7% | 100% | 99.9% | The invention |
| 4 | Anthraquinone Dye Composition 4 | 100% | 99.8% | 100% | 100% | The invention |
| 5 | S-435 | 95.4% | 95.6% | 99.7% | 99.5% | Comparative Example |
| 6 | S-441 | 71.4% | 96.3% | 93.2% | 92.9% | Comparative Example |

As is clear from Table 6, the evaluation cells 1 to 4 using anthraquinone dye compositions 1 to 4 exhibit extremely high light fastness.

Example 7

The evaluation cells (liquid crystal devices) 1 to 4 obtained in Example 6 exhibited a color when no voltage was applied. When a voltage (20V, 100 Hz) was applied by a signal generator (manufactured by Tektronix, Inc.), the liquid crystal layer turned to be transparent with no color.

Using the evaluation cell (liquid crystal device) 3, the transmittance was measured in a state of exhibiting a color and in a state of exhibiting no color, at a maximum absorption wavelength of the dye, using a UV/vis absorption spectrum tester (UV 2400, manufactured by Shimadzu Corporation). The result obtained at the state of exhibiting a color was 15% and the result obtained at the state of exhibiting no color was 60%. Accordingly, the ratio of the transmittance in a state of exhibiting a color (T (colored)) to the transmittance in a state of exhibiting no color (T (transparent)) was 4 (T(transparent)/T(colored)), indicating that the evaluation cell (liquid crystal) 3 of the present invention exhibits a high degree of contrast ratio, and is suitably used in light modulating materials, electronic paper or the like.

Example 8

The liquid crystal compositions 1 to 4 obtained in Example 6 were dispersed in a PVA aqueous solution to form microcapsules, respectively, and a liquid crystal device was prepared by sandwiching the microcapsules by a pair of glass plates having a transparent electrode. It was confirmed that the liquid crystal layer was transparent with no color when a voltage (50V, 100 Hz) was applied, and exhibited a color when no voltage was applied.

Example 9

The liquid crystal compositions 1 to 4 obtained in Example 6 were mixed with a siloxane polymer having liquid crystallinity to prepare polymer dispersed liquid crystals (PDLCs), respectively, and a liquid crystal device was prepared by sandwiching the PDLC by a pair of glass plates having a transparent electrode. It was confirmed that the liquid crystal layer was transparent with no color when a voltage (50V, 100 Hz) was applied, and exhibited a color when no voltage was applied.

Example 10

(Preparation of Anthraquinone Dye Composition)

8.7 mg of anthraquinone dye (A-1), 20.9 mg of anthraquinone dye (C-9) and 70.5 mg of anthraquinone dye (D-2) were mixed and dissolved in chloroform. The solvent was dissolved away under reduced pressure, thereby preparing anthraquinone dye composition 7.

Example 11

(Comparative Experiment with Single Color Dye)

In 100 mg of a host liquid crystal MLC-7700-000 or MLC-12000-000 (manufactured by E. Merck) was dissolved 1 mg of the anthraquinone dye composition 7, or 1 mg of dyes A-1, C-9 and D-2, respectively, thereby preparing liquid crystal compositions.

The order parameter of the liquid crystal compositions was measured in accordance with a similar method to Example 3, and the results are shown in Table 7. Since the comparative liquid crystal compositions include only one kind of dye, the measurement was conducted at a maximum absorption wavelength thereof. Columns in FIG. 7 that do not correspond to the maximum absorption wavelength of the liquid crystal composition are indicated by "-".

TABLE 7

| Dye | 483 nm | 548 nm | 687 nm | Host Liquid Crystal | Notes |
|---|---|---|---|---|---|
| Anthraquinone Dye Composition 7 | 0.76 | 0.77 | 0.81 | MLC-7700-000 | The invention |
| A-1 alone | 0.79 | — | — | MLC-7700-000 | Comparative Example |

TABLE 7-continued

| Dye | 483 nm | 548 nm | 687 nm | Host Liquid Crystal | Notes |
|---|---|---|---|---|---|
| C-9 alone | — | 0.74 | — | MLC-7700-000 | Comparative Example |
| D-2 alone | — | — | 0.79 | MLC-7700-000 | Comparative Example |
| Anthraquinone Dye Composition 7 | 0.77 | 0.77 | 0.80 | MLC-12000-000 | The invention |
| A-1 alone | 0.79 | — | — | MLC-12000-000 | Comparative Example |
| C-9 alone | — | 0.75 | — | MLC-12000-000 | Comparative Example |
| D-2 alone | — | — | 0.79 | MLC-12000-000 | Comparative Example |

As is clear from Table 7, the anthraquinone dye composition of the present invention, using three kinds of anthraquinone dyes in combination, exhibits such an unexpected effect of improving the order parameter, as compared with the cases in which only a single kind of dye is used. The result that the order parameter at a wavelength of 483 nm was low was due to an effect of sub-absorption of dye D-2 exhibiting a negative order parameter.

Example 12

(Reflective Display)
(Preparation of Liquid Crystal Composition)

In 93.05 mg of a host liquid crystal MLC-9300-000 (manufactured by E. Merck) were dissolved 6.6 mg of the anthraquinone dye composition 3 and 0.35 mg of a chiral agent R-1011 (manufactured by E. Merck), thereby preparing a liquid crystal composition 8.

(Preparation of Liquid Crystal Device for Reflective Display)

Between a pair of ITO glass substrates (manufactured by EHC), onto which a perpendicularly oriented film SE-5300 (manufactured by Nissan Chemical Industries, Ltd.) had been applied and baking had been performed, was inserted a polystyrene spacer (manufactured by Sekisui Chemical Co., Ltd.) to form a cell gap of 15 μm, thereby preparing a cell. Into the obtained cell was injected the liquid crystal composition 8, and a white scatter plate (manufactured by Yupo Corporation) was attached to the rear side of the glass substrate which was opposite to a display-side, thereby forming a liquid crystal device.

(Evaluation of Reflectance and Contrast)

The obtained liquid crystal device exhibited a white color when no voltage was applied. In this state, a visible reflectance with respect to the reflectance of a standard white plate (100%) was measured by a spectrophotometer (UV-3100PC, manufactured by Shimadzu Corporation), using an integrating sphere measurement including no specular reflection. The result was 60%.

Further, the obtained liquid crystal device exhibited a black color upon application of a rectangular alternating voltage (10V, 80 Hz) using a signal generator (manufactured by Tektronix Inc.). The visible reflectance measured at this point was 10%. Accordingly, the ratio of the visible reflectance in a state of exhibiting a black color to the visible reflectance in a state of exhibiting a white color was 6, indicating that a high degree of contrast ratio was attained.

Example 13

(Three-Layer Display)

Two glass substrates having an ITO transparent electrode on one side, and one glass substrate having ITO transparent electrodes on both sides were prepared. Onto the ITO transparent electrode of these three glass substrates was applied a perpendicularly oriented film made from a soluble polyimide (JALS-682-R3, manufactured by JSR). Subsequently, baking and a rubbing treatment were conducted. The glass substrate having the ITO transparent electrodes on both sides was sandwiched via a spacer with a thickness of 8 μm by the glass substrates having the ITO transparent substrate on one side, such that the oriented films are positioned to face each other, thereby forming a cell having a multilayer structure having three space layers. The direction of the substrates was adjusted such that the rubbing direction of each oriented film was antiparallel to the rubbing direction of the oriented film positioned on the opposite side.

To the uppermost space of the obtained multilayer structure was vacuum-injected a guest-host liquid crystal composition prepared by dissolving 0.2 to 1.0% by mass of yellow dyes A-2, A-3 and A-8, and 0.2% by mass/0.2% by mass of chiral agents R-811/R-1011 (manufactured by E. Merck) in a host liquid MLC-6608 (manufactured by E. Merck).

To the middle space of the obtained multilayer structure was vacuum-injected a guest-host liquid crystal composition prepared by dissolving 0.2 to 1.0% by mass of cyan dyes D-2, D-14 and E-4, and 0.2% by mass/0.2% by mass of chiral agents R-811I/R-1011 (manufactured by E. Merck) in a host liquid MLC-6608 (manufactured by E. Merck).

To the bottom space of the obtained multilayer structure was vacuum-injected a guest-host liquid crystal composition prepared by dissolving 0.2 to 1.0% by mass of magenta dyes C-15, C-16 and C-17, and 0.2% by mass/0.2% by mass of chiral agents R-811I/R-1011 (manufactured by E. Merck) in a host liquid MLC-6608 (manufactured by E. Merck).

Thereafter, a mat was attached to a polyethylene terephthalate film and a white scatter plate (manufactured by Yupo Corporation) was provided on the mat, and the obtained cell was adhered on to the white scatter plate with an adhesive. Further, a low-reflection layer (an optical interference film having a three-layer structure) was attached to the main surface of the uppermost transparent substrate of a side from which light comes in (the front surface seen from the image display side), thereby preparing a three-layer guest-host reflective liquid crystal device (GH1).

(Evaluation of Reflectance and Contrast)

The visible reflectance and contrast ratio were measured in a similar manner to Example 12. The visible reflectance measured at a state of exhibiting a white color (the liquid crystal was transparent) was 50% and the visible reflectance measured at a state of exhibiting a black color (the liquid crystal was colored) was 5%. Accordingly, the contrast ratio of visible reflectance (visible reflectance when displaying white/visible reflectance when displaying black) was 10.

Example 14

(Preparation of Dual-Frequency Driven Liquid Crystal Composition)

A mixture of 5 mg of anthraquinone dye composition 3 prepared in Example 2, 100 mg of a dual-frequency driven liquid crystal (H-1), having the following structure, as a host liquid crystal, and 1.1 mg of a chiral agent R-811 (manufactured by E. Merck) was heated for an hour at 150° C. on a hot plate, then cooled to room temperature and left to stand overnight, thereby preparing a liquid crystal composition 9.

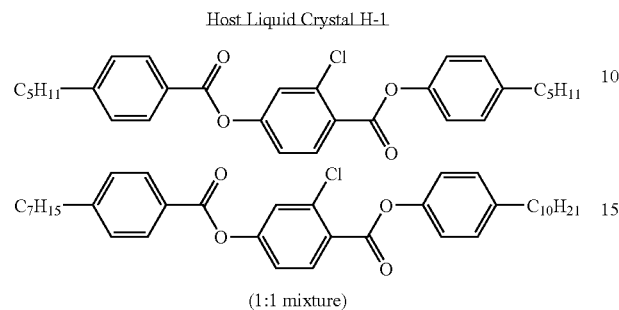

(1:1 mixture)

(Preparation of Dual-Frequency Driven Liquid Crystal Device

The obtained liquid crystal composition 9 was injected into a commercially available liquid crystal cell (with ITO transparent electrode, glass substrate: 0.7 mm thick, cell gap: 8 μm, with an epoxy resin seal, manufactured by E.H.C.), thereby preparing a liquid crystal device. In this liquid crystal device, an oriented film was not provided on the ITO transparent electrode.

(Measurement of Transmittance upon Modulation of Frequency)

A low-frequency rectangular alternating voltage (20V, 100 Hz) was applied to the obtained liquid crystal device and a transmittance was measured using a spectrophotometer (UV-2400PC, manufactured by Shimadzu Corporation). Subsequently, a high-frequency rectangular alternating voltage (20V, 5 kHz) was applied to the liquid crystal device and a transmittance was also measured.

The ratio of the transmittance upon application of a high-frequency alternating voltage/the transmittance upon application of a low-frequency alternating voltage was 7.5, indicating that switching of the liquid crystal can be performed by the frequency of the applied voltage alone. Moreover, it was confirmed that provision of an oriented film was not essential for the liquid crystal device of the present invention.

(Measurement of Response Speed)

To the above liquid crystal device were applied a high-frequency rectangular alternating voltage (20V, 10 kHz) and a low-frequency rectangular alternating voltage (20V, 100 Hz) in an alternating manner, and changes in transmittance was measured by an LCD measurement device (LCD-5200, manufactured by Otsuka Electronics Co., Ltd.). The time period for the difference in transmittance to reach 80% upon changing the frequency was not more than 20 msec. From this result, it was confirmed that the response speed of the liquid crystal device of the present invention can be improved by employing a dual-frequency driving system, in which switching-off can be actively performed.

In view of the above, the present invention can provide a liquid crystal composition that can achieve high levels of liquid crystal solubility, order parameter and light fastness, even when three or more of dyes are used in combination. The present invention can also provide a liquid crystal device, a reflective display material and a light modulating material that achieve a high degree of light fastness and a high degree of contrast.

All publications, patent applications, and technical standards mentioned in this specification are herein incorporated by reference to the same extent as if each individual publication, patent application, or technical standard was specifically and individually indicated to be incorporated by reference.

What is claimed is:

1. A liquid crystal composition comprising a liquid crystal and at least three anthraquinone dyes, at least two of the anthraquinone dyes having a substituent represented by the following Formula (I):

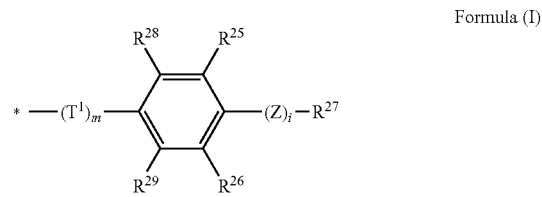

Formula (I)

wherein in Formula (I), * represents a linking position; $R^{25}$ and $R^{26}$ each independently represent an alkyl group, a halogen atom or an alkoxy group; $R^{27}$ represents an alkyl group, an acyl group or an alkoxy group; $R^{28}$ and $R^{29}$ each independently represent a hydrogen atom or a substitutent; $T^1$ represents an arylene group or a heteroarylene group; Z represents an oxygen atom, a sulfur atom or a carbonyl group; m represents an integer of 0 to 2; and i represents 0 or 1, wherein when i is 1 and Z is an oxygen atom or a sulfur atom, $R^{27}$ is not an alkoxy group, and when i is 1 and Z is a carbonyl group, $R^{27}$ is not an acyl group.

2. The liquid crystal composition according to claim 1, comprising at least four anthraquinone dyes including at least one anthraquinone dye selected from each of the following dye groups A to D, respectively, wherein at least two of the at least four anthraquinone dyes have a substituent represented by Formula (I):

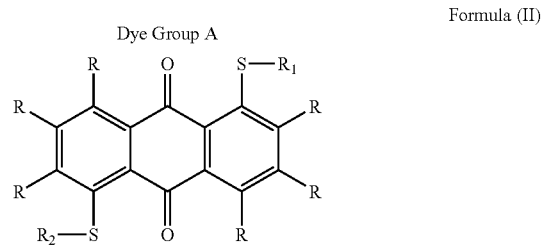

Formula (II)
Dye Group A

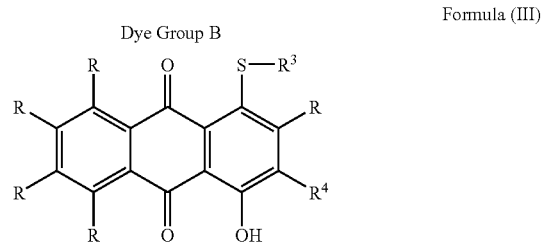

Formula (III)
Dye Group B wherein in Formulae (II) to (XI), $R^1$ to $R^3$, $R^5$ to $R^{12}$, $R^{14}$ to $R^{16}$, $R^{19}$, $R^{23}$ and $R^{24}$ each independently represent an aryl group or a heteroaryl group; $R^{18}$ and $R^{20}$ each independently represent a hydrogen atom, an alkyl group, an aryl group or a heteroaryl group; $R^{13}$ and $R^{17}$ each independently represent an alkyl group or an aryl group; $R^4$, $R^{21}$ and $R^{22}$ each independently represent a hydrogen atom, an alkyl group, an alkoxy group, an aryl group, an aryloxy group or a heteroaryl group; and each R independently represent a hydrogen atom or a substituent, and wherein the aryl group or the heteroaryl group represented by $R^1$ to $R^{12}$, $R^{14}$ to $R^{16}$ and $R^{18}$ to $R^{24}$, and the aryl group represented by $R^{13}$ and $R^{17}$ may further have a substituent which may be the substituent represented by Formula (I) or a mesogenic group.

3. The liquid crystal composition according to claim 2, wherein the anthraquinone dyes comprise at least one anthraquinone dye represented by Formula (II); at least one anthraquinone dye represented by Formula (III), (IV) or (V); at least one anthraquinone dye represented by Formula (VI) or (VII); and at least one anthraquinone dye represented by Formula (IX).

4. The liquid crystal composition according to claim 2, wherein the anthraquinone dyes comprise anthraquinone dyes represented by Formulae (II), (III), (VI) and (IX).

5. The liquid crystal composition according to claim 2, wherein the anthraquinone dyes comprise anthraquinone dyes represented by Formulae (II), (IV), (VI) and (IX).

6. The liquid crystal composition according to claim 2, wherein the anthraquinone dyes comprise anthraquinone dyes represented by Formulae (II), (V), (VI) and (IX).

7. The liquid crystal composition according to claim 1, comprising at least three anthraquinone dyes having a substitutent represented by Formula (I).

8. The liquid crystal composition according to claim 1, comprising at least four anthraquinone dyes having a substitutent represented by Formula (I).

9. The liquid crystal composition according to claim 1, wherein the liquid crystal composition can exhibit a black color.

10. A liquid crystal device comprising a pair of electrodes, at least one of the electrodes being transparent, and a liquid crystal layer containing the liquid crystal composition according to claim 1, the liquid crystal layer being positioned between the pair of electrodes.

11. The liquid crystal device according to claim 10, wherein the liquid crystal layer is a polymeric medium layer in which the liquid crystal composition is dispersed in a polymeric medium.

12. The liquid crystal device according to claim 11, wherein the polymeric medium comprises gelatin or polyvinyl alcohol.

13. The liquid crystal device according to claim 10, wherein the liquid crystal layer contains the liquid crystal composition in microcapsules.

14. A reflective display material including the liquid crystal device according to claim 10.

15. A light modulating material including the liquid crystal device according to claim 10.

16. The liquid crystal composition according to claim 1, wherein, in Formula (I), Z represents an oxygen atom.

* * * * *